(12) United States Patent  (10) Patent No.: US 7,468,824 B2
Nakajima  (45) Date of Patent: Dec. 23, 2008

(54) IMAGING APPARATUS INCLUDING OPTICAL SCANNING DEVICE WITH DEFLECTING MIRROR MODULE, AND METHOD OF DEFLECTING WITH THE MIRROR MODULE

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 11/037,132

(22) Filed: Jan. 19, 2005

(65) Prior Publication Data

US 2005/0185237 A1    Aug. 25, 2005

(30) Foreign Application Priority Data

Jan. 19, 2004   (JP)   ............................. 2004-010972
Jun. 4, 2004    (JP)   ............................. 2004-166960

(51) Int. Cl.
G02B 26/08    (2006.01)
(52) U.S. Cl. .................... 359/224; 359/199; 359/213
(58) Field of Classification Search ............... 359/199, 359/224
See application file for complete search history.

(56) References Cited

U.S. PATENT DOCUMENTS

| 5,606,447 | A | 2/1997 | Asada et al. |
| 5,959,760 | A | 9/1999 | Yamada et al. |
| 6,657,765 | B2 | 12/2003 | Hayashi et al. |
| 6,765,711 | B2 | 7/2004 | Min et al. |
| 2002/0122217 | A1 | 9/2002 | Nakajima |
| 2004/0263937 | A1* | 12/2004 | Fujii et al. .................. 359/212 |
| 2005/0030606 | A1 | 2/2005 | Nakajima |
| 2005/0088715 | A1* | 4/2005 | Yoda ........................... 359/196 |
| 2007/0146851 | A1 | 6/2007 | Nakajima |

FOREIGN PATENT DOCUMENTS

| JP | 4-211218 | 8/1992 |
| JP | 5-257075 | 10/1993 |
| JP | 08-075475 | 3/1996 |
| JP | 09-197334 | 7/1997 |
| JP | 2002-040355 | 2/2002 |

OTHER PUBLICATIONS

U.S. Appl. No. 11/765,166, filed Jun. 19, 2007, Nakajima.
U.S. Appl. No. 12/028,446, filed Feb. 8, 2008, Nakamura, et al.
U.S. Appl. No. 12/051,404, filed Mar. 19, 2008, Amada, et al.

* cited by examiner

Primary Examiner—James Phan
(74) Attorney, Agent, or Firm—Oblon, Spivak, McClelland, Maier & Neustadt, P.C.

(57) ABSTRACT

A module configured to deflect light in an image forming apparatus. A torsion bar supports a mirror and defines a rotational axis of the mirror. A controller is configured to apply electronic pulses to at least one driving device to oscillate the mirror in the module around the rotational axis at a scanning frequency different than a resonance frequency of the mirror.

17 Claims, 37 Drawing Sheets

FIG. 18
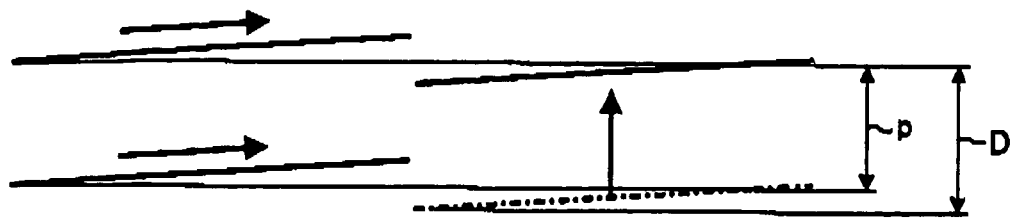
FIG. 19A    FIG. 19B
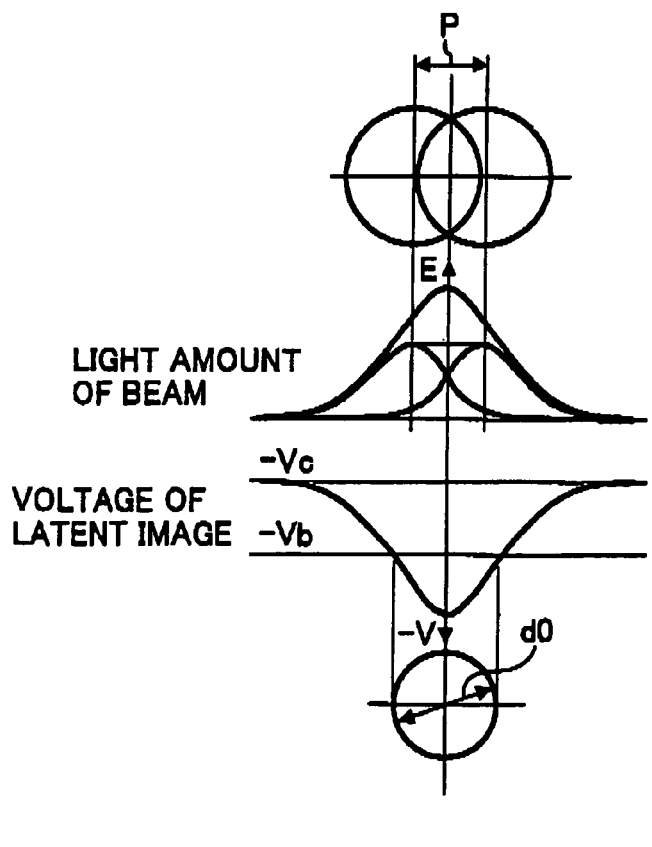
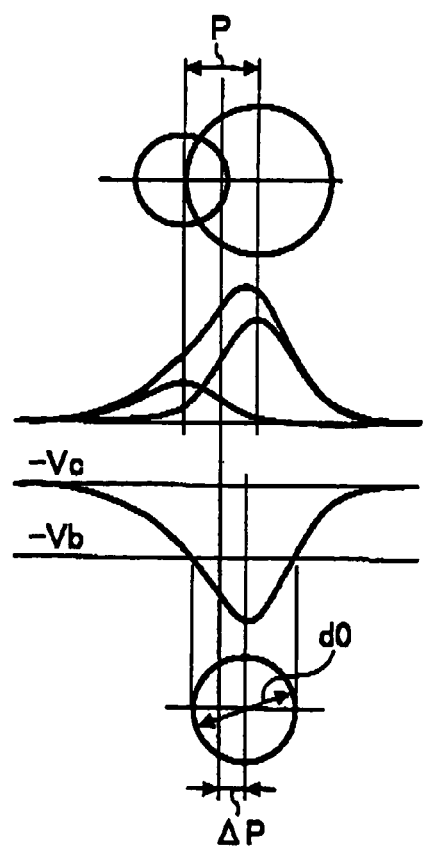

FIG. 42
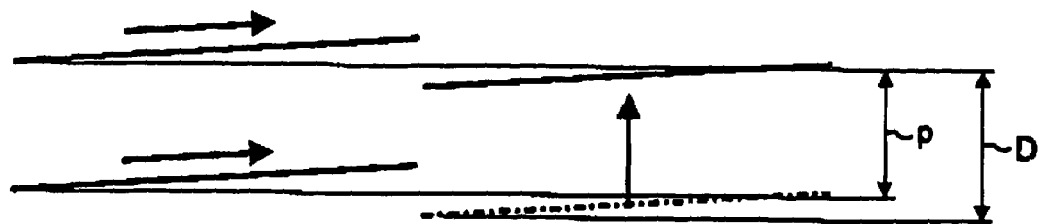
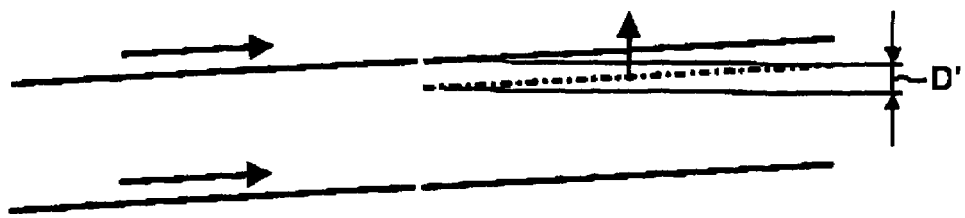
FIG. 43A    FIG. 43B
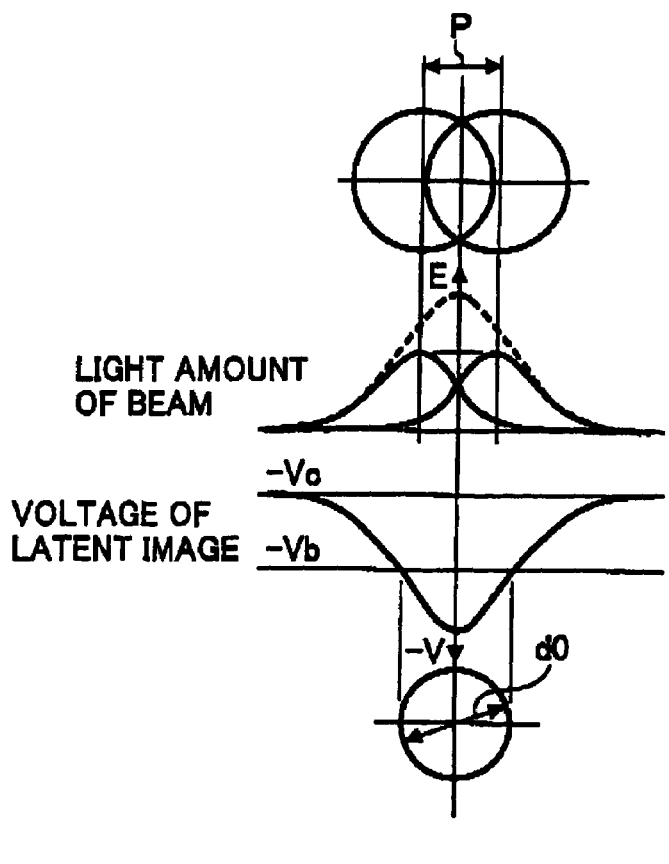
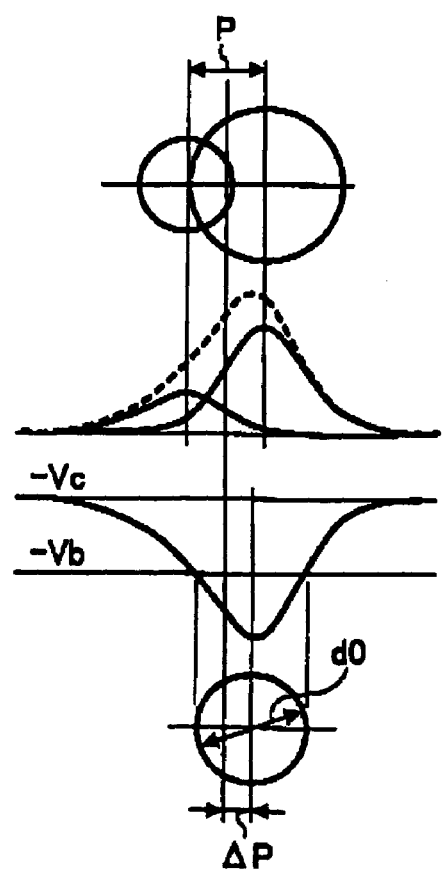

IMAGING APPARATUS INCLUDING OPTICAL SCANNING DEVICE WITH DEFLECTING MIRROR MODULE, AND METHOD OF DEFLECTING WITH THE MIRROR MODULE

BACKGROUND OF THE INVENTION (1) Field of the Invention

The present invention relates to an imaging apparatus, such as a digital copier, a laser printer, an optical scanning type display device, a laser radar device mounted on an automobile, and the like, including an optical scanning device with a deflecting mirror module.

(2) Discussion of the Related Art

A conventional optical scanning device uses a deflector to deflect a light beam emitted from a laser emission source, and scans the deflected beam to a scanned surface, such as a photosensitive body, to record an image on the scanned surface. The conventional optical scanning device uses a polygon mirror or a galvano mirror as a deflector.

An image forming apparatus, such as a copier, may be required to form an image at a relatively high resolution or speed. To achieve this result, it may be necessary to rotate the deflector at a relatively high speed. Rotation of the deflector at the high speed may result in disadvantages including bearing damage, heat generation, or wind noise. Thus, these disadvantages limit the scanning speed.

In an attempt to overcome these disadvantages, it is known to use a deflector formed from micromachining silicon. Such a deflector is provided by integrally forming from a single silicon substrate torsion bars that support an oscillating mirror, as disclosed in Japanese patent laid open no. 04-211218 or U.S. Pat. No. 5,959,760. The deflector disclosed in these patents, which oscillates back and forth by resonance, is operable at a relatively high speed as compared to the conventional polygon mirror. Further, as compared to the conventional polygon mirror, use of the resonance oscillated deflector results in advantages including extremely small power consumption and reduced noise.

However, the oscillating mirror described above may scan a relatively narrow area as compared to the conventional polygon mirror. Therefore, United States publication no. 2002/122217 discloses plural optical scanning devices, which use oscillating mirrors as deflectors, to divide an image recording area in a primary scanning direction for recording images in a single line. In an image recording apparatus using the plural oscillating mirrors, driving of the mirrors at different scanning frequencies may not result in recording good quality images.

Conversely, a swing angle of the oscillating mirror can become extremely small when the scanning frequency is outside of the resonance frequency of the mirror. Therefore, the mirrors are usually driven such that the scanning frequency is the same as the resonance frequency. This results in disadvantages, in that each of the oscillating mirrors in the image forming apparatus should have exactly the same resonance frequency as one another. To eliminate difference between resonance frequencies of the oscillating mirrors, Japanese patent laid open no. 8-75475 or no. 2002-40355 discloses that weights are added to certain oscillating mirrors, for example. The additional weight adjusts the resonance frequency of the oscillating mirror. It is also known to choose the oscillating mirrors that have resonance frequencies near a specified frequency. Unfortunately, these measures increase production times for assembly of the image forming apparatuses. Additionally, changes in temperature can vary the resonance frequency of an oscillating mirror.

SUMMARY OF THE INVENTION

To address the above-described and other problems, it is an object of the present invention to provide a module configured to deflect light in an image forming apparatus. A torsion bar supports a mirror and defines a rotational axis of the mirror. A controller is configured to apply electronic pulses to at least one driving device to oscillate the mirror in the module around the rotational axis at a scanning frequency different than a resonance frequency of the mirror.

The present invention further provides an optical scanning device for an image forming apparatus, including a light source configured to emit light and the deflecting module configured to deflect the emitted light to scan an image.

The present invention further provides an optical scanning unit for an image forming apparatus, including a light source configured to emit light and first and second deflecting modules configured to deflect the emitted light to scan an image.

The present invention further provides an image forming apparatus including a developer configured to develop an image on a recording medium, a light source configured to emit light, and first and second light deflecting modules configured to deflect the emitted light to scan an image.

The present invention further provides a module configured to deflect light in an image forming apparatus including means for deflecting light, means for supporting the means for deflecting to rotate about a rotational axis, and means for applying electronic pulses to at least one driving device to oscillate the means for deflecting in the module around the rotational axis at a scanning frequency different than a resonance frequency of the means for deflecting.

The present invention further provides a method for oscillating a mirror, including applying a driving pulse corresponding to an angle of the mirror, applying a torque on the mirror over a first angular range, and applying a torque on the mirror over a second angular range to oscillate the mirror at a scanning frequency different than a resonance frequency of the mirror.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18 is an explanatory view showing adjustment of line images from two adjacent optical scanning devices of FIG. 13.

FIGS. 19A and 19B are graphs showing intensity distribution of beam spots in a secondary scanning direction, voltage distributions of electrostatic latent image formed by beams, and a plane and a cross sectional view corresponding to one pixel dot, with a leftmost circle showing a beam from a first light source and a rightmost circle showing a beam from a second light source.

FIG. 42 is an explanatory view showing adjustment of line images of two adjacent optical scanning devices of FIG. 37.

FIGS. 43A and 43B are graphs showing intensity distribution of beam spots in a secondary scanning direction, voltage distributions of electrostatic latent image formed by beams, and a plane and a cross sectional view corresponding to one pixel dot, with a leftmost circle showing a beam from a first light source and a rightmost circle showing a beam from a second light source.

DETAILED DESCRIPTION OF THE INVENTION

Figure 1B:
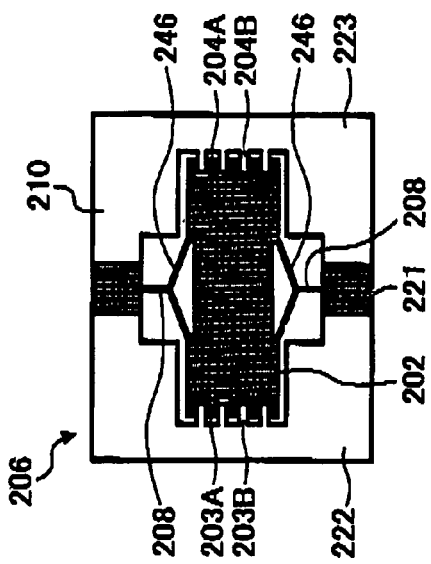
FIG. 1B is a top view of a first oscillating mirror substrate of the oscillating mirror module of FIG. 1A.

In describing preferred embodiments illustrated in the drawings, specific terminology is used for the sake of clarity. However, the disclosure of this patent specification is not intended to be limited to the specific terminology used, and it is to be understood that each specific element includes all equivalents that operate in a similar manner.

Figure 1C:
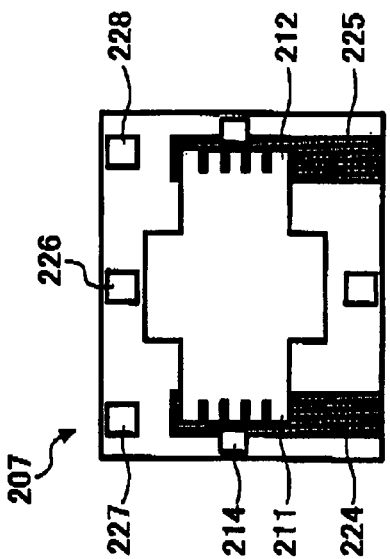
FIG. 1C is a top view of a second oscillating mirror substrate of the oscillating mirror module of FIG. 1A.
Figure 1A:
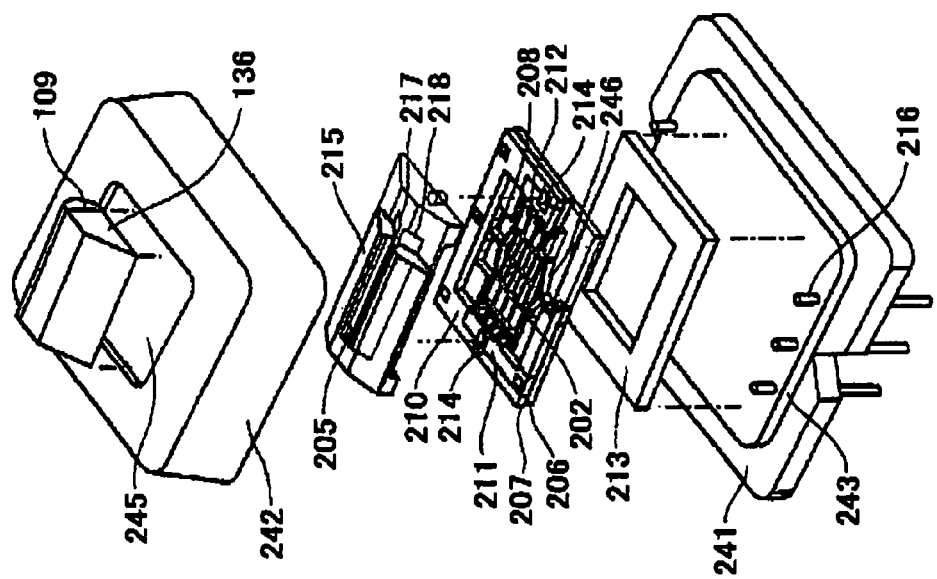
FIG. 1A is an isometric view of an oscillating mirror module according to an embodiment of the present invention.

FIG. 1A is an isometric view of an oscillating mirror module of an optical scanning device according to an embodiment of the present invention. FIGS. 1B and 1C are detail views of a first silicon substrate 206 and a second silicon substrate 207, which are disposed in the oscillating mirror module and form an oscillating mirror, the oscillating mirror working as a deflector. The first silicon substrate 206 and the second silicon substrate 207 are joined by an insulating layer, such as silicon oxide, disposed as an intermediate layer.

The first silicon substrate 206 preferably has a thickness of 60 μm. As shown in FIG. 1B, an oscillating mirror 202 and torsion bars 208 that collinearly support the oscillating mirror 202 are formed by etching through the first silicon substrate 206. The torsion bars 208 preferably have a "Y"-like shape. The torsion bars 208 include branches 246 joined to the oscillating mirror 202 at two points off center from a rotation axis of the oscillating mirror 202. Side edge portions of the oscillating mirror 202 extending along the torsion bars 208 are formed of convex and concave portions arranged like comb teeth. The convex and concave portions engage with a fixed frame 210 having gaps, the gaps being of a size in the order of microns. The oscillating mirror 202 has a reflective surface made of a metal layer. Preferably, the metal layer is formed by sputtering a metal, such as gold, on a surface of the mirror 202.

A first movable electrode 203A and a second movable electrode 204A are formed on convex and concave portions of both edges of the oscillating mirror 202. The first movable electrode 203A and the second movable electrode 204A have a same electric potential. A first fixed electrode 203B and a second fixed electrode 204B are formed on convex and concave portions, opposite to the first movable electrode 203A and the second movable electrode 203B, of the fixed frame 210 by etching both sides of the fixed frame 210 down to the insulating layer, which acts as etch-stop layer, around the electrodes and separated one another. The oscillating mirror 202, the torsion bars 208, torsion bar bases 221 and islands 222, 223 are separated by a separating trench gap of about 5 μm.

The second substrate 207 preferably has a thickness of 80 μm. As shown in FIG. 1C, convex and concave portions arranged like comb teeth on the inner periphery as a third fixed electrode 211 and a fourth fixed electrode 212 and island separated from the fixed frame 210 are formed by etching a center portion of the second substrate 207. The convex and concave portions of the second substrate 207 overlap and correspond to the convex and concave portions of the fixed frame 210. At this time, separating trenches of the second substrate 207 are formed to prevent overlapping of the trenches of the first substrate 206. The first movable electrode 203A and the second movable electrode 203B pass through the aperture of the third and fourth fixed electrodes 211, 212 during oscillation of the oscillating mirror 202.

According to an embodiment of the present invention, voltage pulses applied to the first fixed electrode 203A and the second fixed electrode 204A, which generate a first torque, have a same phase. Voltage pulses applied to the fourth fixed electrode 212 have a phase in front of the phase of the first fixed electrode 203A and the second fixed electrode 204B. Voltage pulses applied to the third fixed electrode 212 have a phase in behind of the phase of the first fixed electrode 203 and the second fixed electrode 204.

Figure 2:
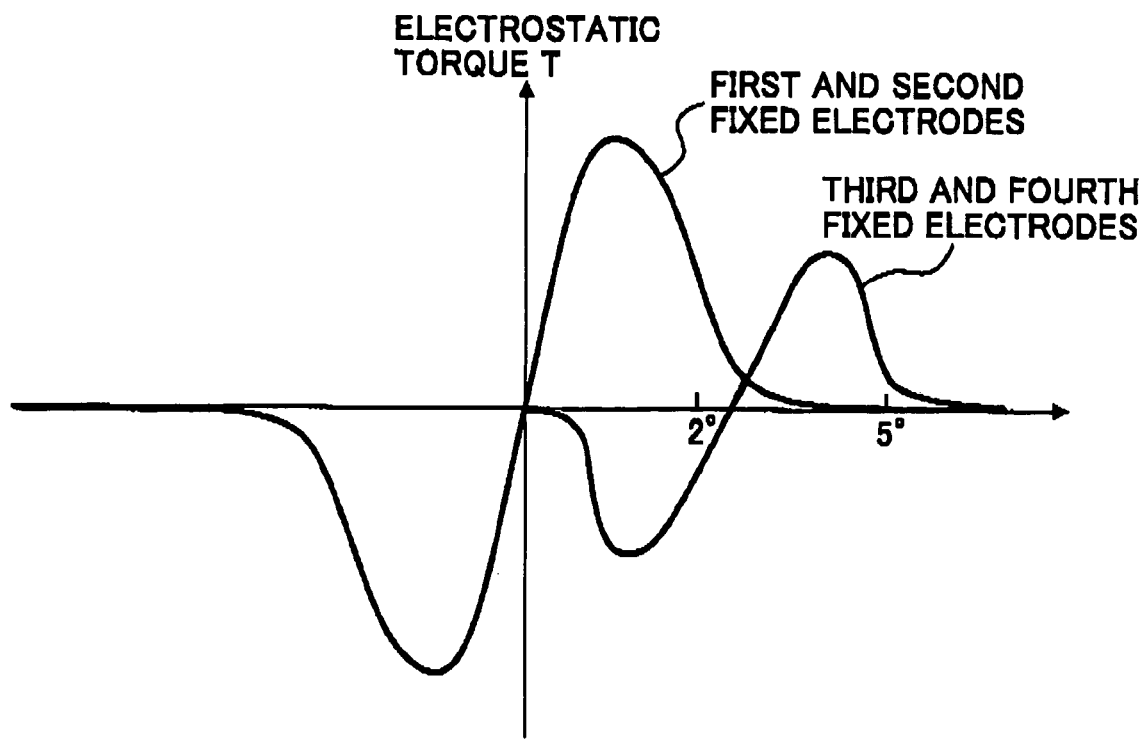
FIG. 2 is a graph showing variations in electrostatic torques generated between electrodes as a function of swing angles of the oscillating mirror of FIGS. 1A-1C.

FIG. 2 is a graph showing variations in electrostatic torques generated between electrodes as a function of swing angles of the oscillating mirror 202. Since the distribution of electrostatic torques changes based on whether the fixed electrodes are in front of or behind the oscillating mirror 202 along the rotation axis, voltage pulses are applied based on an oscillation timing of the oscillating mirror 202. An overlapping area occurs at certain swing angles generated by electrostatic torque. A thickness of the second substrate 207 is determined to gain torque during an entire range of movement of the oscillating mirror 202 from an initial horizontal condition, with a swing angle of 0°, to almost maximum swing angle θ. Voltage pulses are applied to the first fixed electrode 203 and second fixed electrode 204 to generate the first torque and to the third fixed electrode 211 and the fourth fixed electrode 212 to generate the second torque for certain swing angles to generate electrostatic torque. These torques drive or oscillate the oscillating mirror 202.

Figure 3:
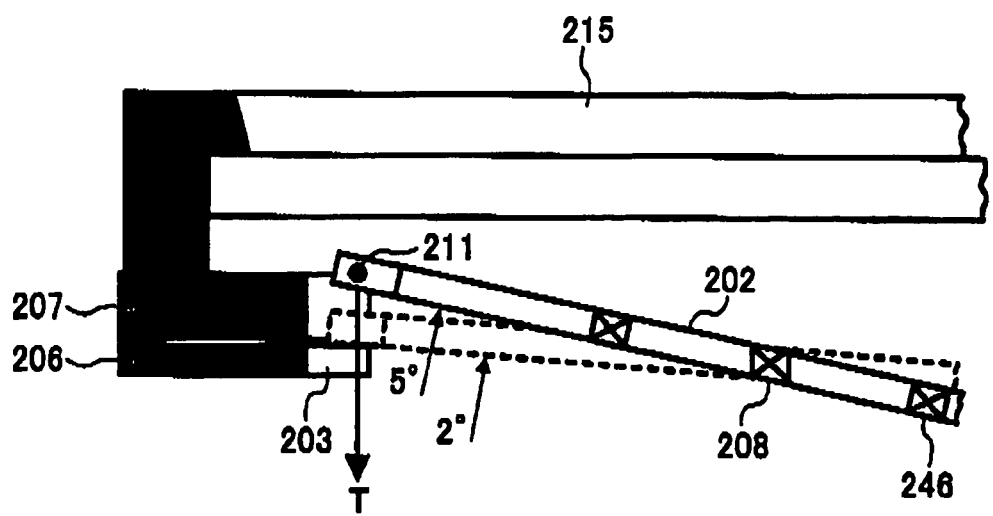
FIG. 3 is a cross sectional view of electrodes of the oscillating mirror module of FIG. 1A.

FIG. 3 shows a cross sectional view of the electrodes. In FIG. 3, an electrostatic torque that rotates the oscillating mirror 202 in a counterclockwise direction has positive value. The oscillating mirror 202 is initially set horizontally. When voltage pulses are applied to the third fixed electrode 211 or the fourth fixed electrode 212, electrostatic force is generated between fixed electrodes and movable electrodes opposite the fixed electrodes. The electrostatic force torques the torsion bars 208 and rotates the oscillating mirror 202 until the electrostatic force and the force of the torsion bars 208 balance. When the voltage pulse is turned off, the force of the torsion bars 208 rotates the oscillating mirror 202 back to the horizontal position. However, because of an inertial force the oscillating mirror 202 continues to rotate past the horizontal position. Eventually, the oscillating mirror 202 returns to its initial position. If a voltage pulse is applied to the first fixed electrode 203B and the second fixed electrode 204B before the oscillating mirror 202 returns to the initial position, such that electrostatic forces are generated continuously, the oscillating mirror 202 continues to rotate back and forth.

If an inertia moment of the oscillating mirror 202 and a length of the torsion bars 208 are set as in range of first order resonance mode near a desired scanning frequency and a frequency of the voltage pulse is set to a resonance frequency, an amplitude of oscillation of the oscillating mirror 202 increases to an angle in which the oscillating mirror 202 is acted upon by the third fixed electrode 211 and the fourth fixed electrode 212 facing the movable electrodes on both edge of the oscillating mirror 202.

A phase of a voltage pulse applied to the third fixed electrode 211 and the fourth fixed electrode 212 is adjusted to generate positive and negative force to the third fixed electrode 211 and the fourth fixed electrode 212, respectively at the time the oscillating mirror passes through the maximum angle and passes through the initial position. The voltage pulses are applied to the electrodes to generate electrostatic in a specified order: to generate a positive force with the third fixed electrode 211; to generate a positive force with the first fixed electrode 203 and the second fixed electrode 204; to generate a negative force with the fourth electrode 212; and to generate a negative force with the first fixed electrode 203 and the second fixed electrode 204. The application of these forces act to continuously swing the oscillating mirror 202 between the maximum swing angle θ and 0. Therefore, even if the resonance frequency shifts, the swing angle of the oscillating mirror 202 can be maintained by the third fixed electrode 211 and the fourth fixed electrode 212.

Figure 4:
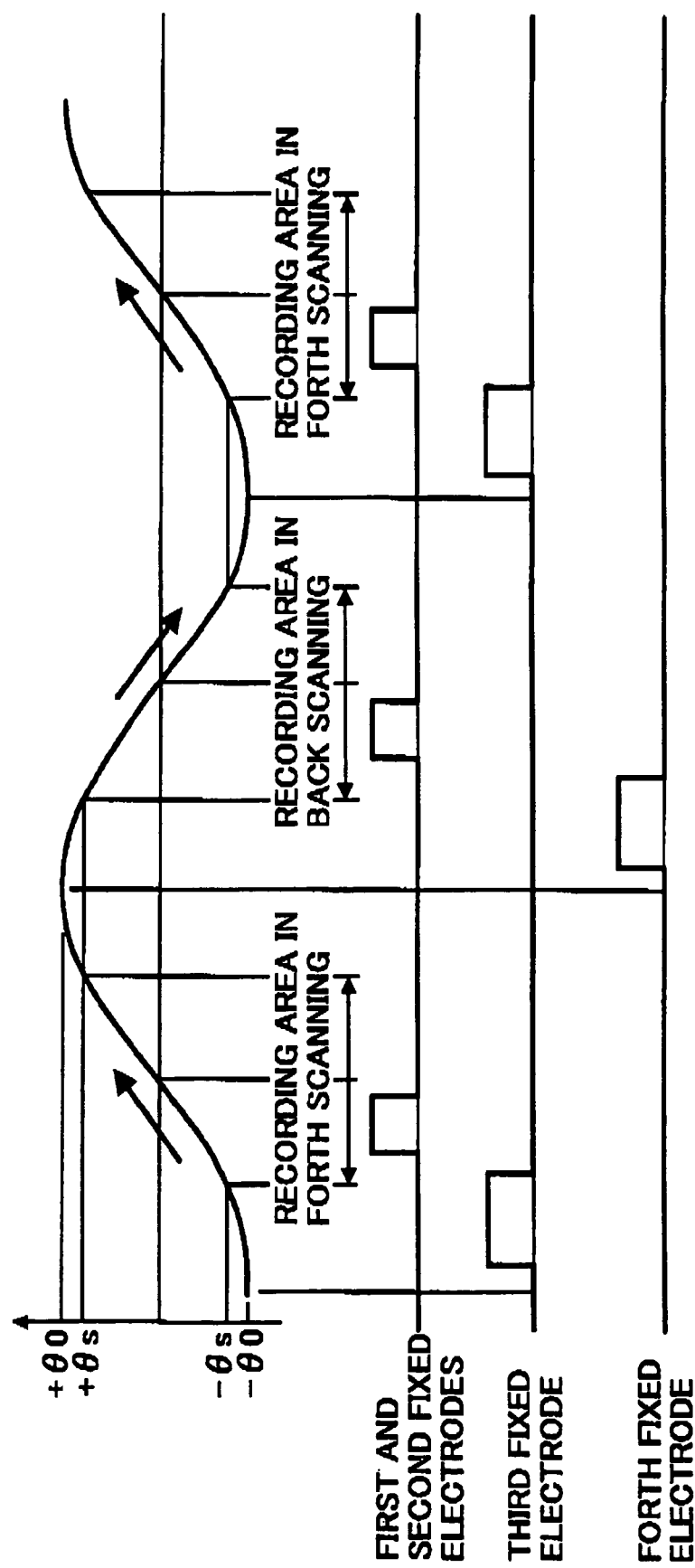
FIG. 4 is a chart showing application of voltage pulses to fixed electrode as a function of amplitudes of the oscillating mirror of FIGS. 1A-1C.

FIG. 4 is a chart showing application of voltage pulses to the fixed electrode as a function of amplitudes of the oscillating mirror 202. According to an embodiment of the present invention, recording is performed in one of scanning back and forth. Phases of voltage pulses are adjusted such that electrostatic torques effectively control the amplitude of the swing. The conditions are expressed as:

$$t0 < t < L \cdot \sin \theta,$$

$$\theta 0 = \arcsin((t0+t)/L),$$

$$-\theta 0 < \alpha 1 < \theta 0,$$

$$\theta 0 < \alpha 2 < \theta, \text{ and}$$

$$-\theta < \alpha 3 < -\theta 0$$

where t is the thickness of the third fixed electrode 211 and the fourth fixed electrode 212, θ is the maximum swing angle of the oscillating mirror 202 plus five degrees, 2L is the width of the oscillating mirror 202 plus four millimeter, t0 is the thickness of the first substrate 206 within sixty micrometer, α1 is the angle in which voltage pulses are applied to the first and second fixed electrode 203, 204, α2 is the angle in which voltage pulses are applied to the third fixed electrode 211, and α3 is the angle in which voltage pulses are applied to the fourth fixed electrode 212. As described above, the application of appropriate voltage amplitude electrostatic forces near the maximum swing angle permits the oscillating mirror 202 to continue to achieve maximum swing amplitude and remain oscillating by preserving its momentum. The scanning frequency is adjusted to a desired frequency by gradually changing frequency from voltage resonance frequency during pulse applied to each fixed electrode is kept the timing.

Additionally, as will be described below, the gain of voltage pulse is adjusted such that the amplitude achieves the desired maximum amplitude by detecting the amplitude by measuring scanning time of a light beam between start and end points of scanning. Gain adjustment may be desired at, for example, the third and fourth fixed electrodes 211, 212, but may or may not be required for all fixed electrodes.

Figure 5:
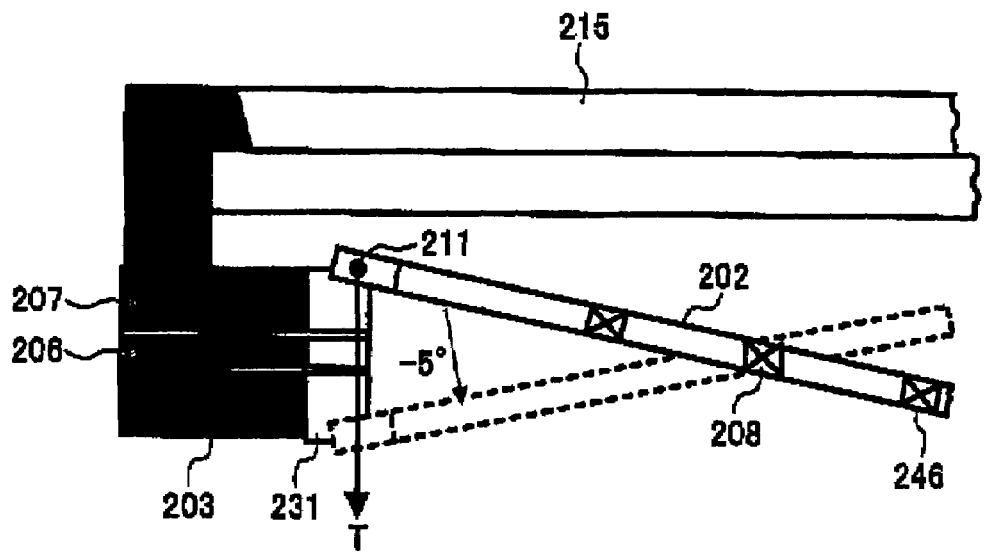
FIG. 5 is a cross sectional view of electrodes of the oscillating mirror module of FIGS. 1A-1C.
Figure 6:
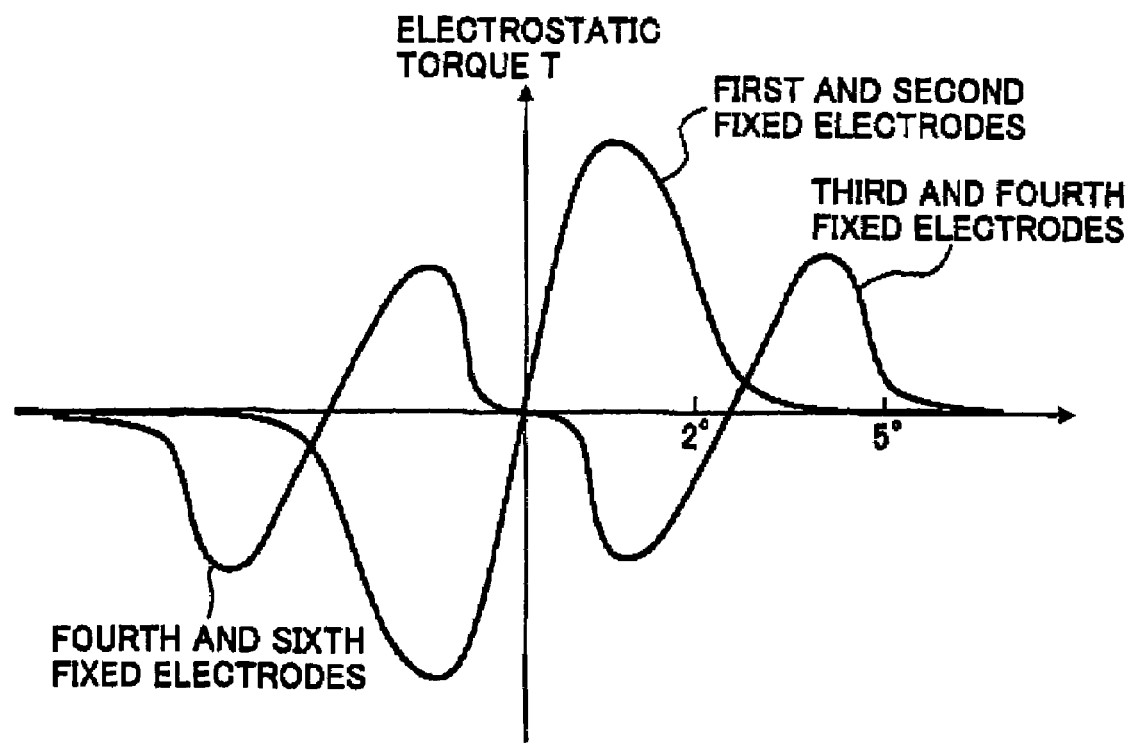
FIG. 6 is a graph showing variations in electrostatic torques between electrodes of the oscillating mirror module as a function of swing angles of the oscillating mirror of FIGS. 1A-1C.

FIG. 5 shows an oscillating mirror module including a fifth fixed electrodes 231 and a sixth fixed electrodes 232 aligned with the third fixed electrodes 211 and the fourth fixed electrodes 212 symmetrically with respect to the first fixed electrode 203B and second fixed electrode 204B. Such a fixed electrode structure, which has three layers, generates electrostatic torque sufficient to keep a swing angle at a scanning frequency much different from a resonance frequency of the oscillating mirror 202. Voltage pulses are applied to generate electrostatic force in a specified order, similar to that discussed above with respect to FIG. 3: to generate a positive force with the third fixed electrode 211 and the sixth fixed electrode 232; to generate a positive force with the first fixed electrode 203B and the second fixed electrode 204B; to generate a negative force with the fourth fixed electrode 212 and fifth fixed electrode 231; and to generate a negative force by the first fixed electrode 203 and the second fixed electrode 204. FIG. 6 is a graph showing variations in electrostatic torques between electrodes as a function of the swing angles of the oscillating mirror 202. The silicon substrate having the fifth fixed electrodes 231 and sixth fixed electrodes 232 can have a same shape and thickness as the second substrate 207, and can be joined to the first substrate 206 opposite the second substrate 207 with the insulating layer disposed therebetween.

Figure 7:
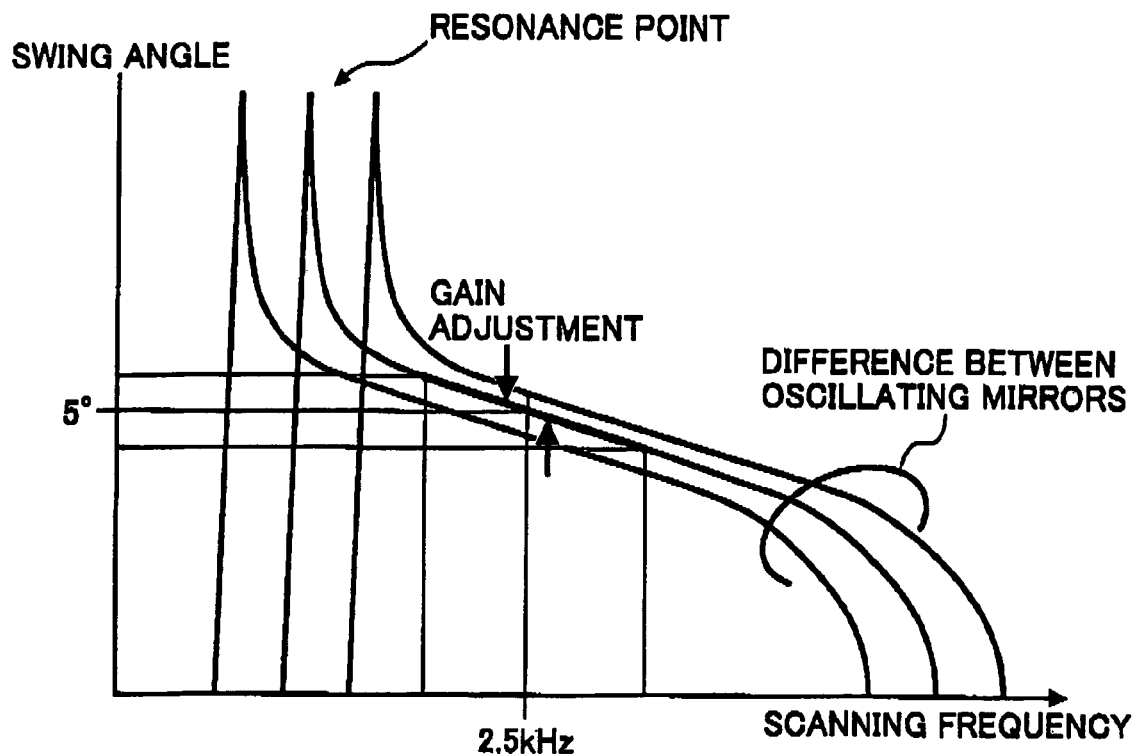
FIG. 7 is a graph showing variations in swing angle responses of the oscillating mirror as a function of driving frequencies.

FIG. 7 is a graph showing variations in the swing angle responses of the oscillating mirror 202 as a function of driving frequencies. At a point where a scanning frequency corresponds to a resonance frequency, the swing angle is a maximum, but the response can vary widely. Therefore, it may be difficult to adjust a scanning frequency for a fixed electrode of an oscillating mirror driver to the resonance frequency, since a resonance frequency may vary in response with temperature or other factors.

Figure 8:
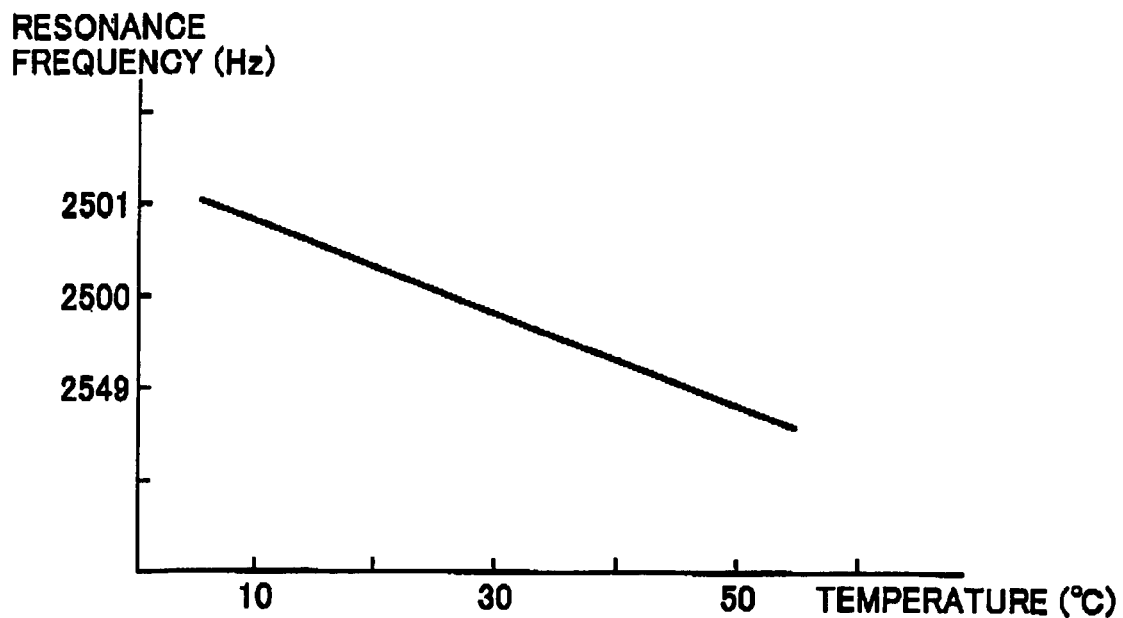
FIG. 8 is a graph showing resonance frequency responses as a function of temperature.

FIG. 8 shows resonance frequency responses as a function of temperature. As described above, a plurality of oscillating mirrors in an image forming apparatus should be driven at a common scanning frequency to produce high quality images. According to an embodiment of the present invention, a drive frequency is set near a proper resonance frequency of an oscillating unit including the oscillating mirror and the torsion bars, but just beyond the resonance frequency. For example, the scanning frequency can be set to 2.5 kHz for a corresponding resonance frequency of 2 kHz. The maximum swing angle is adjusted ±5° by adjusting a gain of the applied voltage. In this case, because of fluctuations of the resonance frequency caused by imperfections in the oscillating mirror and because of temperature, it is desirable to set the frequency range at a value high enough to account for the fluctuations. For example, if fluctuations by caused by imperfections may be as much as 300 Hz and fluctuations caused temperatures may be up to 3 Hz, it is desirable to set the scanning frequency to at least 2.303 Hz.

The inertia moment I, the spring constant K and the resonance frequency f are expressed as:

$$I = (4ab\rho d/3) \cdot a^2,$$

$$K = (G/2L) \cdot (cd(c^2 + d^2)/12), \text{ and}$$

$$f = (1/2\pi) \cdot (K/I)^{1/2} = (1/2\pi) \cdot (Gcd(c^2 + d^2)/24LI)^{1/2}$$

where the dimensions of the oscillating mirror are 2a×2b× d, the length and width of the torsion bars are L and c, and density and material constant of silicon are ρ and G. The swing angle θ is proportional to the length of torsion bar L and expressed as $$\theta = A/If^2$$

where A is a constant. Therefore, the swing angle θ is inversely proportional to the inertia moment I. It the inertia moment may be reduced to increase the resonance frequency f, or the swing angle θ may be reduced. Consequently, according to an embodiment of the present invention, the oscillating mirror 202 is relieved for reducing inertia moment to ⅕ by etching the opposite side of reflection surface 219 to a thickness less than d/10 except for ribbed locations. These parameters affecting the inertia moment and dimension error of a torsion bar 208 can be factors generating fluctuations in the resonance frequency.

Conversely, electrostatic force between electrodes is described as $$F = \in HV^2/2\delta$$

where ∈, H, V, and δ are the air permittivity, the electrode length, the applied voltage and the distance between electrodes, respectively. The swing angle θ is also expressed as $$\theta = B \cdot F / I$$

where B is a constant. The longer the electrode length H, the greater the swing angle θ. Further, 2n times driving torque acts on the comb-like electrode, where n is the number of comb teeth.

The air viscosity resistance is expressed as:

$$P = C \cdot \eta \cdot v^2 \cdot E^3$$

where v, E, η, and C are the oscillating mirror velocity, the area, the air density and a constant, respectively. The viscosity resistance η is opposite to the rotation direction of the oscillating mirror 202. Therefore, it is preferable to dispose the oscillating mirror 202 in an airtight vacuum sealed case.

According to an embodiment of the present invention, as shown in FIGS. 1A-1C, the oscillating mirror substrate including first and second substrates 206, 207 is joined to ceramic plate 213, which defines a hole in a center area, and attached on CAN package base 241, which is set with a reflection surface up and a rotation axis corresponding to line connecting a pair of V trenches 233 formed on outer edges of the base 241.

A lead terminal 216 is formed and penetrates the base 241. Electrode pads are formed on upper surface of the second substrate 207 by etching insulating layer at islands 224, 225 and filling metallic paste through holes 226, 227, 228 through the insulating layer to the surface of the second substrate 207. The electrode pads and tops of the lead terminals 216 are connected by wire bonding. A bump 243 of the CAN package base 241 is covered by a cap 242. The bump 243 and the cap 242 are connected via a sealing material in a vacuum condition (e.g., in which an air pressure in the cap is less than about 1 torr). It also can be achieved that non-evaporation type getter, which can absorb air and gas, is packaged in a cap and activated by heat from outside after sealing. Light beam pass through a transparent window 245 joined on inner surface at upper aperture of the cap 242.

According to an embodiment of the present invention, facing mirrors 215 are integrated on an upper surface of the second substrate 207 and face the oscillating mirror 202 in a direction perpendicular to the torsion bars 208. The facing mirrors 215 are preferably made by depositing metal on plastic. The facing mirrors 215 are aligned on a pair of surfaces sandwiching a slit and slanted 9° and 26.3° to surfaces of substrates, respectively, with an angle of 144.7° between a pair of the facing mirrors 215. Bottom surfaces of the facing mirrors 215 are formed in a direction parallel to the oscillating mirror 202 and joined on a frame portion of the second substrate 207. The second substrate 207 has locating holes 217 on both sides, which are preferably made by etching. Positioning pins 240, which project from lower surface of the facing mirrors 215, are inserted into the positioning holes 217 to precisely align the facing mirrors 215 in a direction perpendicular to the rotation axis.

Figure 9A:
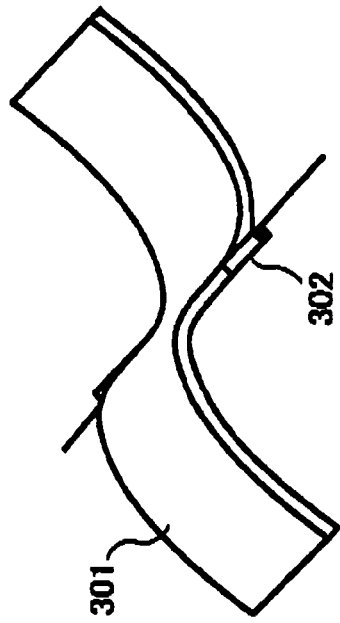
FIG. 9A is an explanatory view showing bending stresses in a conventional oscillating mirror of a conventional oscillating mirror module.
Figure 9B:
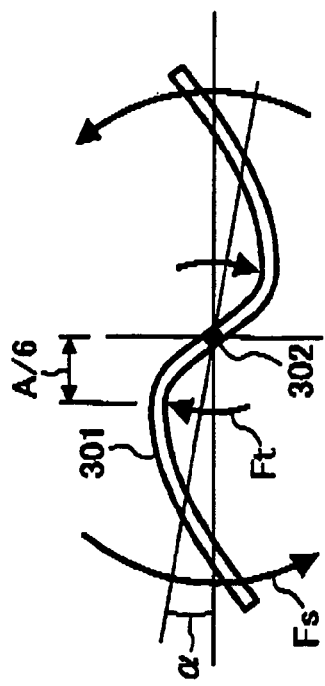
FIG. 9B is an isometric view of the conventional oscillating mirror of FIG. 9A.

Previously, in oscillating mirror modules, torsion bars are formed so that the torsion bars extend along a rotation axis of an oscillating mirror 301 and are directly connected to points on the rotation axis, as shown in FIGS. 9A and 9B. The wave shape shown in the figures is exaggerated for purposed of explanation. As described above, inertial force Fs of the oscillating mirror 301 varies depending on a distance from the rotation axis and is opposite to the torsion bar 302, while torsion force Ft effecting points adjacent to the rotation axis. This arrangement results in a distribution of bending stresses having peaks at intermediate point between the rotation axis of the oscillating mirror and edge of the oscillating mirror. As a result, the oscillating mirror takes on a sinusoidal shape. For example, for an oscillating mirror having width A, a point disposed about A/6 from the rotation axis has maximum displacement. Thus, a surface is displaced about 0.5 μm in PV.

Conversely, according to an embodiment of the present invention, the torsion bars 208 are formed in a "Y"-like shape and are joined to the oscillating mirror 202 at both ends of the branches 246. The branches 246 and a trunk of the torsion bars 208 have the same width. By connecting the torsion bars 208 nearer ends of the oscillating mirror 202, the torsion force Ft is dispersed, and the bending stress on the mirror is reduced such that the mirror is flatter during oscillation.

Figure 10:
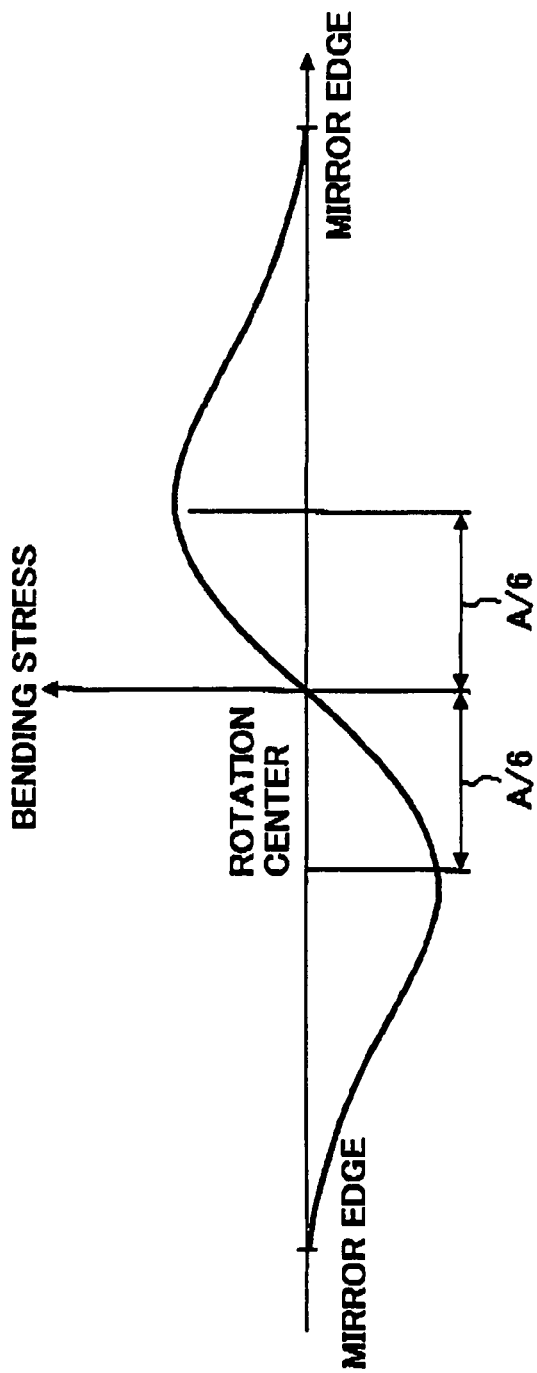
FIG. 10 is a graph showing distributions of bending stresses of the conventional oscillating mirror of FIG. 9A.
Figure 11:
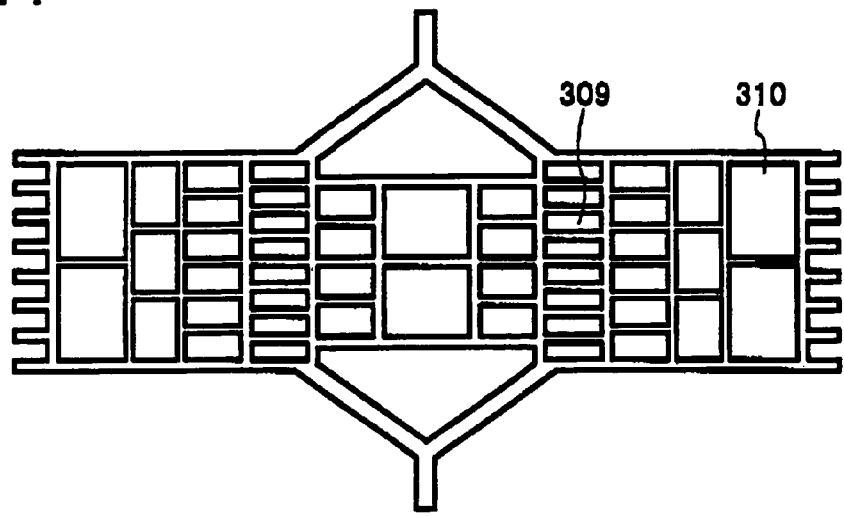
FIG. 11 is a top view of relieved structure formed on a back surface of a mirror substrate of the oscillating mirror of FIGS. 1A-1C.

FIG. 10 is a graph showing distributions of bending stresses of the conventional oscillating mirror. FIG. 11 is a top view of relieved structure formed on a back surface of the oscillating mirror 202, which includes relieved areas 310 with small areas at large bending stress locations and with large areas at small bending stress location so as to counter the bending stresses and to achieve an optimal balance between rigidity and the inertia force F2. A number of ribs 309 formed on the opposite side of reflection surface 219 in a direction perpendicular to the rotation axis varies from a center to the edges of the oscillating mirror 202. The number of the ribs 309 in an area disposed a length from the rotation axis equal to about one sixth of the mirror width is larger than at a position adjacent the rotation axis and is larger than peripheral areas of the oscillating mirror 202, because these areas are subject to less bending stresses. The relieved structure can includes pits or relieved portions having a same area and different depths or other arrangements, in addition to or in place of the ribs 309.

Figure 12:
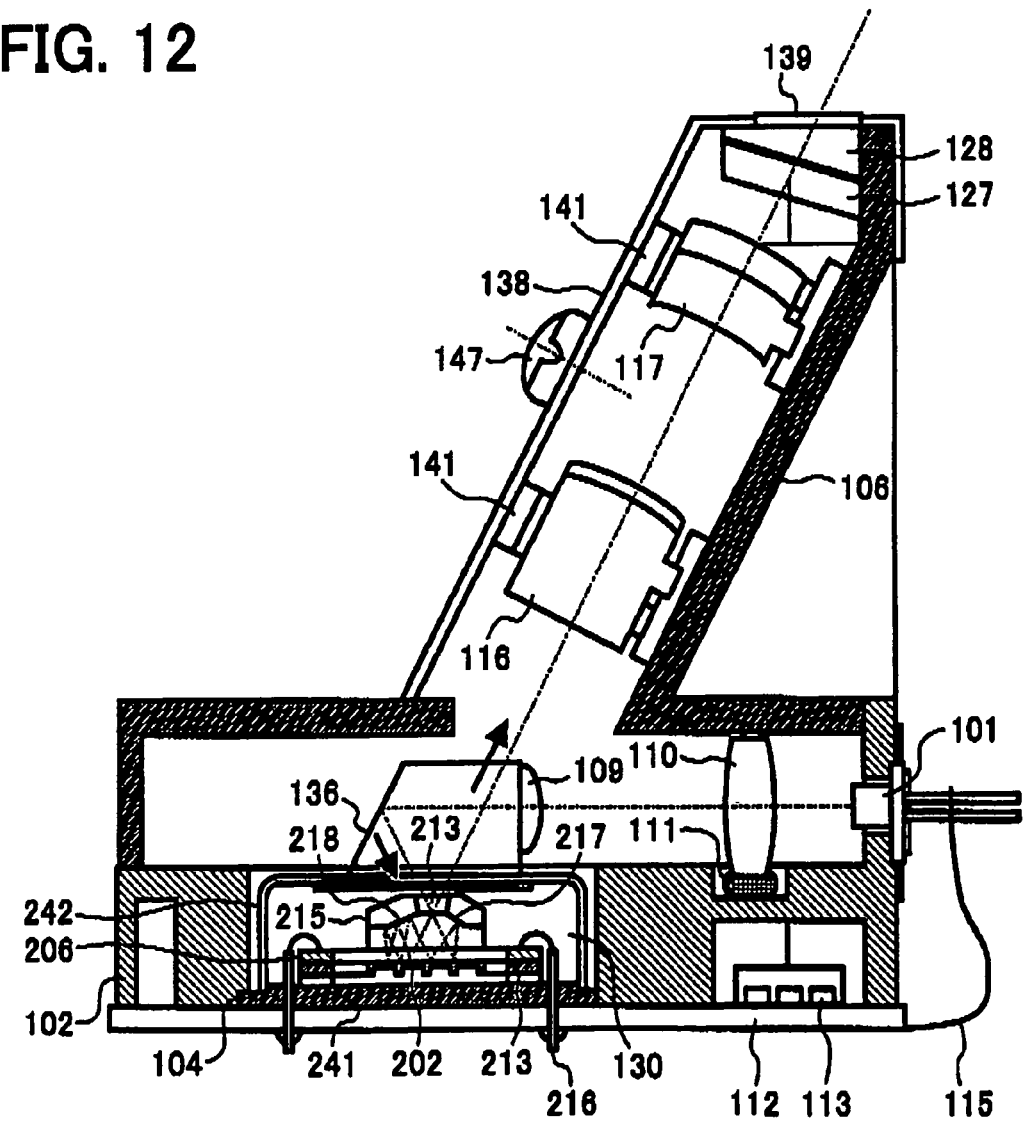
FIG. 12 is a cross sectional view in a secondary scanning direction of an optical scanning device using the oscillating mirror module of FIG. 1A.

FIG. 12 is a cross sectional view in a secondary scanning direction of the optical scanning device. Light beam emitted by a semiconductor laser device 101 enters an oscillating mirror module 130 through a coupling lens, a prism 136 and the transparent window 245 in the upper portion of the cap 242. The light beam made incident on the oscillating mirror 202 at a given angle (at 20°, for example) through the slit of facing mirror 215 is reflected from a first reflection surface 217 of the facing mirror 215 to be reflected again from the second reflection surface 202 of the facing mirror 215 over the slit. Then, the light beam is reflected a plurality of times (three times, for example) between the oscillating mirror 202 and the facing mirror 215 with its reflection point moving in a secondary or sub scanning direction. Thereafter, the light beam is emitted through the slit.

Thus, by repeating reflection a plurality of times, a greater scanning angle can be obtained with a smaller swing angle of the oscillating mirror 202. A scanning angle θ is given by $$\theta = 2N\alpha$$

where N is the number of reflections on the oscillating mirror 202 and a is a swing angle. In a preferred embodiment N is five and α is five degrees. Therefore, the maximum scanning angle is 50°. The optical scanning device in this embodiment uses 35° as the maximum scanning angle for recording the image. By using resonance, the oscillating mirror 202 is permitted to oscillate with a minute applied voltage, resulting in reduced heat generation. However, as the recording rate becomes higher, the stiffness of the torsion bars 208 increases, so that the swing angle α is prevented from being obtained. Therefore, the scanning angle is increased by providing the facing mirrors 215 so that desired scanning angle may be obtained irrespective of the recording rate. Aligning the reflection surfaces 217, 218 of the facing mirror at opposite tilt angles changes incidence angles of the light beam in a secondary scanning direction to in opposite directions at each incidence, in other words, between right and left angle. This arrangement minimizes curved scan lines caused by slanted incidence angles on scanned surface, aligns rotational positions of beam in a plane perpendicular to a beam axis back to an emitting point, and prevents degradation of focusing ability.

Figure 13:
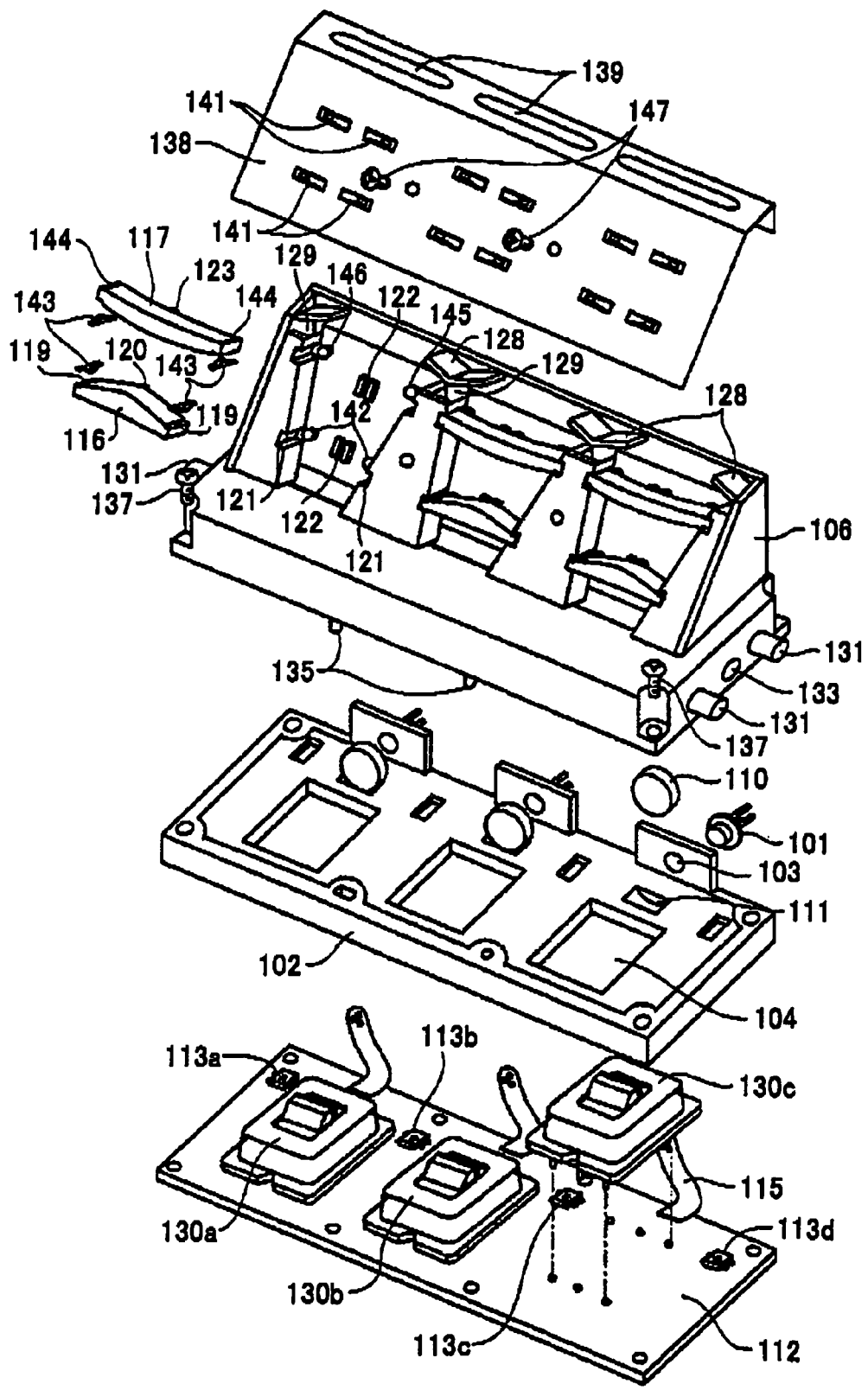
FIG. 13 is an isometric view of the optical scanning device of FIG. 12.
Figure 14:
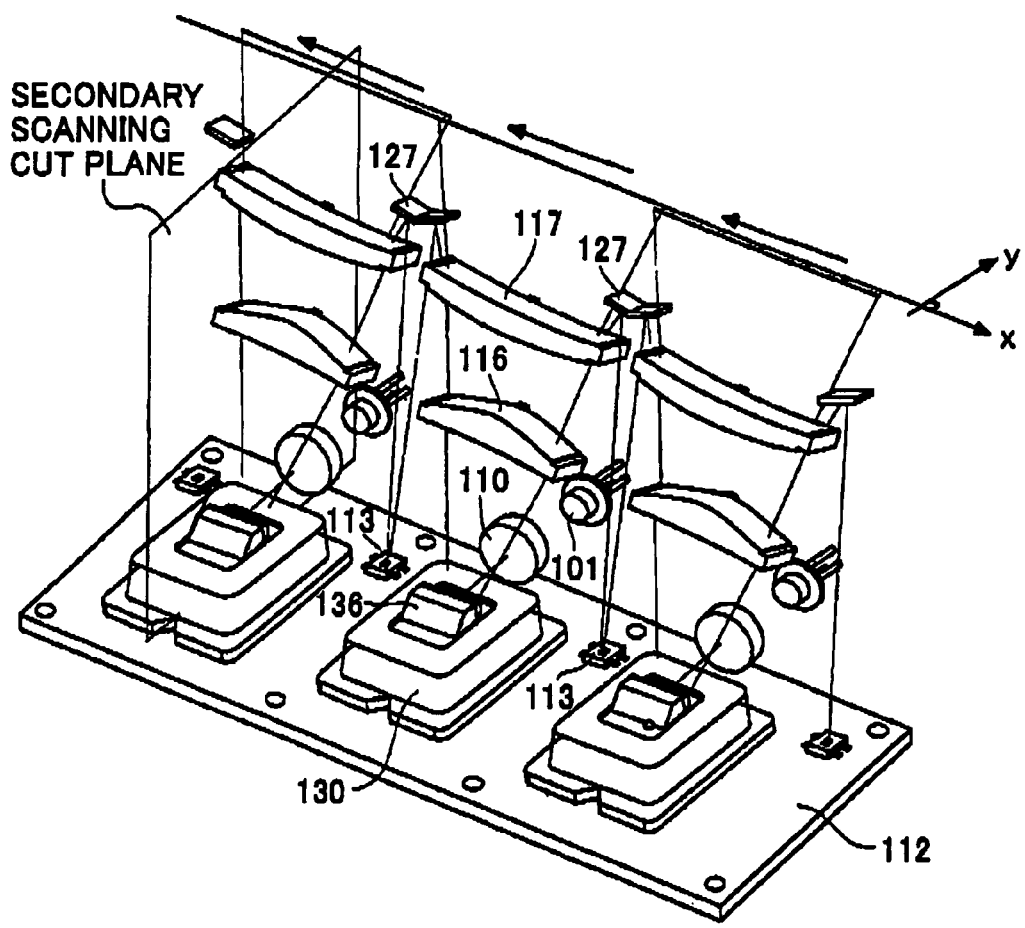
FIG. 14 is an isometric view of alignment of optical devices of the optical scanning device of FIG. 13.

FIG. 13 is an isometric view of the optical scanning device according to an embodiment of the present invention. FIG. 14 is an isometric view of alignment of optical devices in the optical scanning device of FIG. 13. The semiconductor laser device 101, as a light source, includes two light sources disposed at a pitch of 50 μm in a secondary scanning direction. The semiconductor laser device 101 is disposed in a stepped through hole 103 in a wall 105 standing on a frame portion 102. A fringe of the device 101 contacts a step of the hole 103 to position the device, and is pressed by retainer plate 107 to fix a position of the device, as shown in FIG. 15.

Figure 15:
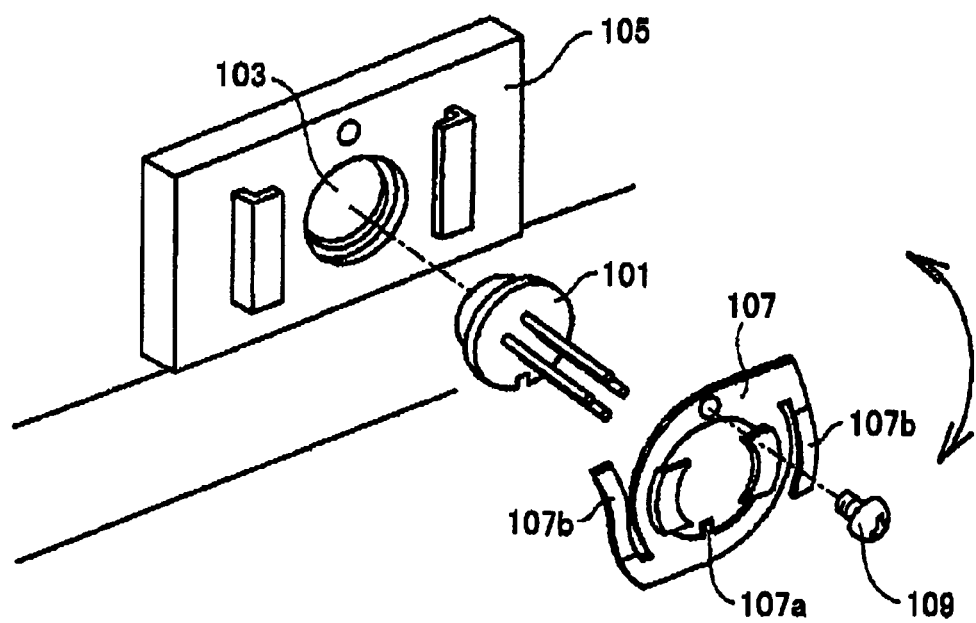
FIG. 15 is an isometric view of alignment relative to a semiconductor laser device of the optical scanning device of FIG. 13.

FIG. 15 is an isometric view of alignment relative to the semiconductor laser device 101. The retainer plate 107 has a projection 107a engaging a cutout of the fringe of the semiconductor laser device 101 for setting a relative rotate position between the retainer plate 107 and the semiconductor laser device 101. The retainer plate is rotated to engage a pair of blade spring 107b, formed by cutting peripheral portions of the retainer plate, to peaked projections 105a and fixes the semiconductor laser device 101 with screw 109. An alignment direction of light source is adjusted to slant a certain degree from the primary scanning direction. The coupling lens 110 is set on "U"-like shaped dents 111 so that its axis corresponds with a light axis of the semiconductor laser 101 and so that emitted beams are parallel to one another. The coupling lens 110 is fixed by UV-adhesive.

Alignment of the coupling lens 110 can also be adjusted after setting the oscillating mirror module 130 and cylinder lens described below. Adjusting the coupling lens 110 accounts for dimensional errors caused by imperfections of the oscillating mirror 202 and positional errors in the location of the focusing line of the cylinder lens. All three light sources in this embodiment can have the same structure.

As shown in FIG. 12, two parallel beams, emitted by the semiconductor laser device 101 and passing through the coupling lenses 110, are incident into the prism 136, engaged on the window of the oscillating mirror module 130 and attached the cylinder lens 109 having positive curvature in a secondary scanning direction on a incident surface, and are reflected downward to a slanted surface, and incident into the oscillating mirror module 130 so that the beams are focused on a surface of the oscillating mirror 202 in a secondary scanning direction. Then, as describe above, the beams incident through the slit of facing mirror 215 are reflected a number of times between the oscillating mirror 202 and the facing mirror 215 and are emitted through the slit.

Figure 16:
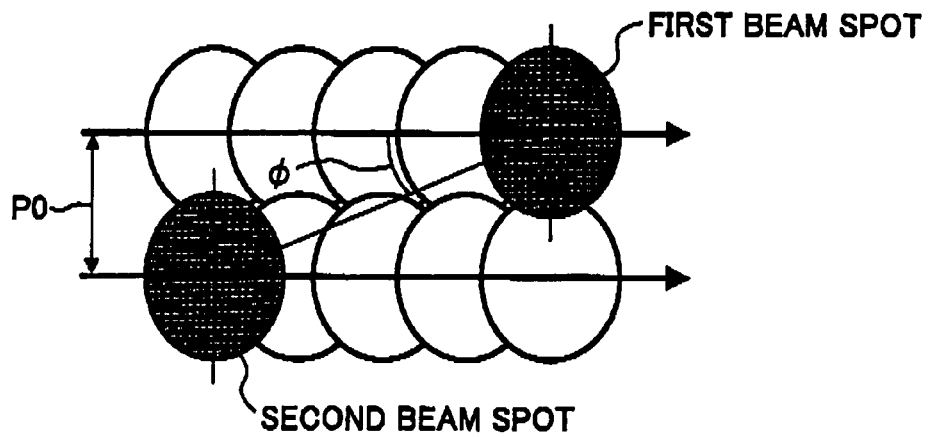
FIG. 16 is an explanatory view showing beam spots, emitted from the optical scanning device of FIG. 13, on a scanned surface.

FIG. 16 is an explanatory view showing alignment of beam spots on the scanned surface. As described above, the attachment of the semiconductor laser devices 101 in an inclined direction determines the beam spot pitch P. The beam spot P is described as:

$$P = \beta \cdot p \cdot \sin \phi$$

where β is secondary scanning magnification in whole system from a light source to scanned surface including first scanning lenses 116 and second scanning lenses 117, described below, and p is a pitch between two light sources. The pitch P is adjusted according to tilt compensation amount of a line formed on a transfer belt.

The oscillating mirror module 130 is set into a stepped square hole 104 in the frame 102 along outer edge of the base 241 such that the torsion bar extends in a direction corresponding with the light axis. A fringe of the oscillating mirror module 130 contacts a step of the hole 104 for positioning a surface of the oscillating mirror 202. Three oscillating mirror modules 130 according to the above-described configuration are arranged in the primary scanning direction on a printed board 112, on which electronic components forming the driving circuits of the semiconductor laser devices 101 and the oscillating mirrors 202 of the oscillating mirror modules 130, are mounted. In mounting the oscillating mirror modules 130 on the printed board 112, the frame 102 has its bottom surface contacting the printed board 112. Cables 115 protruding downward from the bottom surface are inserted into corresponding through holes formed in the printed board 112. The oscillating mirror modules 130 are positioned on the printed board 112 with respect to one another within the clearances of the through holes, and are temporarily fixed to the printed board 112. Thereafter, like the other electronic components, the oscillating mirror modules 130 are soldered and fixed to the printed board 112 at one time. The cables 115 connected its one end to the printed board 112 is connected to lead terminals of the semiconductor laser devices 101.

The printed board 112 supporting the oscillating mirror modules 130 contacts a housing 106 so as to close a lower opening thereof, and is held between pairs of projections 135 formed integrally with the housing 202. The printed board 201 has indentations that engage the widths of the projections 135 so that the printed board 201 is positioned in the primary scanning direction. Further, screws fix four angles of the oscillating mirror module 130 to the printed board through holes in the frame 102 so that the oscillating mirror module 102 and the printed board 112 sandwich the frame 102.

The housing 106 holds first scanning lenses 116 and second scanning lenses 117, which are arranged and fixed in the primary scanning direction as that each scanning areas overlap a slight bit one another. The first scanning lenses 116 have positioning projections 120 formed on the center portion of their secondary scanning direction reference plane. The positioning projections 120 engage concave portions 122 formed on the housing. The first scanning lenses have also pushed planes 119 formed on their both edges of both optical surfaces. The pushed planes 119 engage grooves 121 formed on the housing 106 and are pushed in an incoming surface direction by wavy blade springs 143 for keeping positions of the first scanning lenses 116 in a same plane perpendicular to the light axis. The first scanning lenses 116 contact pairs of projections 142 on the housing 106 and are supported by plate spring 141 formed on a cover 138.

Conversely, the second scanning lenses also have positioning projections 123 formed on the center portion of their secondary scanning direction reference plane. The positioning projections 123 engage concave portions 122 formed on the housing. The second scanning lenses also have pushed planes 144 formed on both edges of both optical surfaces. The pushed planes 144 engage grooves 121 formed on the housing 106 and are pushed in an incoming surface direction by wavy blade springs 143 for keeping positions of the second scanning lenses 117 in a same plane perpendicular to the light axis. The second scanning lenses 117 contact on pairs of projections 142 on the housing 106 and are supported by plate spring 141 formed on the cover 138. Screws 147 fixed the cover 138 to the housing 106.

PIN (p-intrinsic-n) photo diodes are used as first through fourth synchronization detection sensors 113a-d. The second and third synchronization detection sensor 113b and 113c are mounted between the oscillating mirror modules 130a and 130b, and 130b and 130c on the printed board 112 so as to be shared by the oscillating mirror modules 130a and 130b, and 130b and 130c, respectively. Mirror accepters 128 having "V"-like shapes are formed on the housing 106 at a emitting surface side of the second scanning lenses 117 for attaching high reflective aluminum films 127 thereon. The mirror accepters 128 lead light beams, reflected on the high reflective aluminum film 127 at start and end points of a scanning area, to each synchronization detection sensor 113 through openings between scanning areas and through square hole in the frame 102. The cover 138 has plural holes for light beams to pass therethrough.

Figure 17:
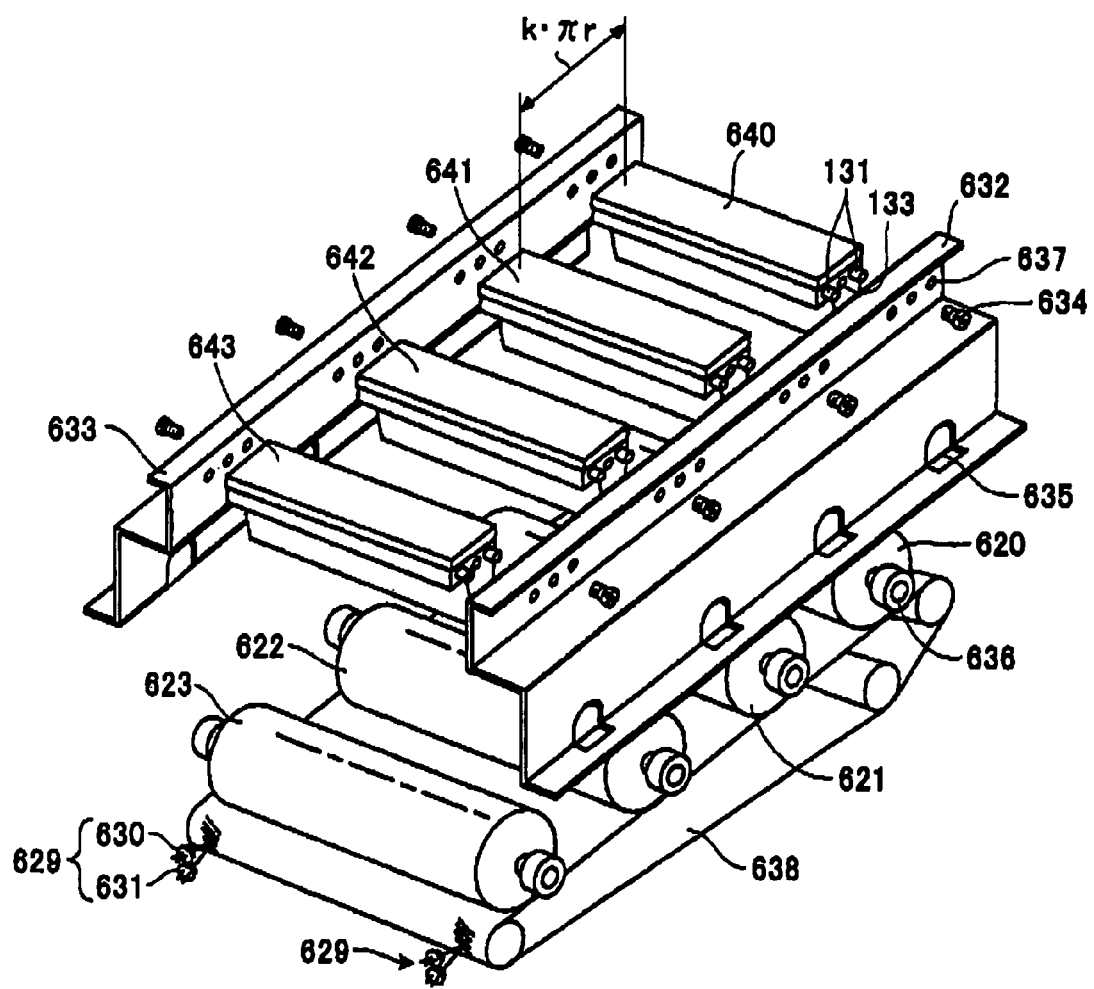
FIG. 17 is an isometric view of alignment of photosensitive drums in an image forming apparatus that includes the optical scanning devices of FIG. 13.

FIG. 17 is an isometric view of alignment of photosensitive drums. The frame 102 and the housing 106 are preferably made from glass fiber reinforced plastic, aluminum die cast or like. As shown in FIG. 13, on both side surfaces of the housing 106, a pair of positioning pins and screw holes is formed. In FIG. 17, side panels 632, 633 are made of sheet metal and are aligned to extend along a primary scanning direction. Each of side panels 632, 633 has grooves 635 engaging bearings of photosensitive drums 620-623 for supporting and aligning photosensitive drums 620-623. According to an embodiment of the present invention, a pitch of the photosensitive drums is equal to a circumference of the photosensitive drums 620-623 multiplied by a natural number, or k·πr, where r is the diameter of the drums and k is natural number. Positioning pins 131 of the optical scanning devices 640-643 are engaged in positioning holes 637 and the side surfaces of the housing are attached to the side panels 632, 633 as the optical scanning devices bridging both side panels 632, 633. Screws fix the optical scanning device 640-643 to the side panels 632, 633.

FIG. 18 is an explanatory view showing adjustment of line images from two adjacent optical scanning devices. According to an embodiment of the present invention, each difference at recording start position is adjusted to zero. Adjustment of a difference of recording position D between two adjacent optical scanning devices is explained below. At first, a recording start timing of scanning line is adjusted by line pitch p. Described in more detail, the timing is shifted in each k multiplied by a period of scanning T determined in synchronization detection signal in reading image data, where k is a natural number and chosen so that L−k·p has the nearest value to zero. Next, rest of the difference is adjusted by p/n in each T/n, where n is a natural number and chosen so that L−(k+1/n)·p has the nearest value to zero. These procedures make two line image, recorded at adjacent areas on a transfer belt 638, connect.

FIG. 19 are graphs showing intensity distribution of beam spots in a secondary scanning direction, voltage distributions of electrostatic latent image formed by beams, and a plane and a cross sectional view corresponding to one pixel dot, with a leftmost circle showing a beam from a first light source and a rightmost circle showing a beam from a second light source. The horizontal direction corresponds to a secondary scanning direction in FIGS. 19A and 19B. Beam spots close to one another form a voltage distribution having one peak. If each spot has a same intensity, the voltage distribution has a center at a center of two beam spots, as shown in FIG. 19A. A difference in two beams spots intensities results in a shifting of the center toward a beam spots having a higher intensity, as shown in FIG. 19B. A portion on the photosensitive drum 620-623 having a higher voltage than an exposure bias voltage attracts charged toner, and the toner attaches on the photosensitive drum 620-623 and forms a dot. Balancing each beam intensity results in a dot having a same diameter d0 at the center positions. Therefore, a center of a latent image can be moved along each line by changing a ratio of beam spot intensities. This arrangement results in a line having a same width as well as a line scanned with tilt pitch p by scanning portions of the line. Thus, the scanning line tilt can be adjusted without mechanical adjustment structure.

Figure 20:
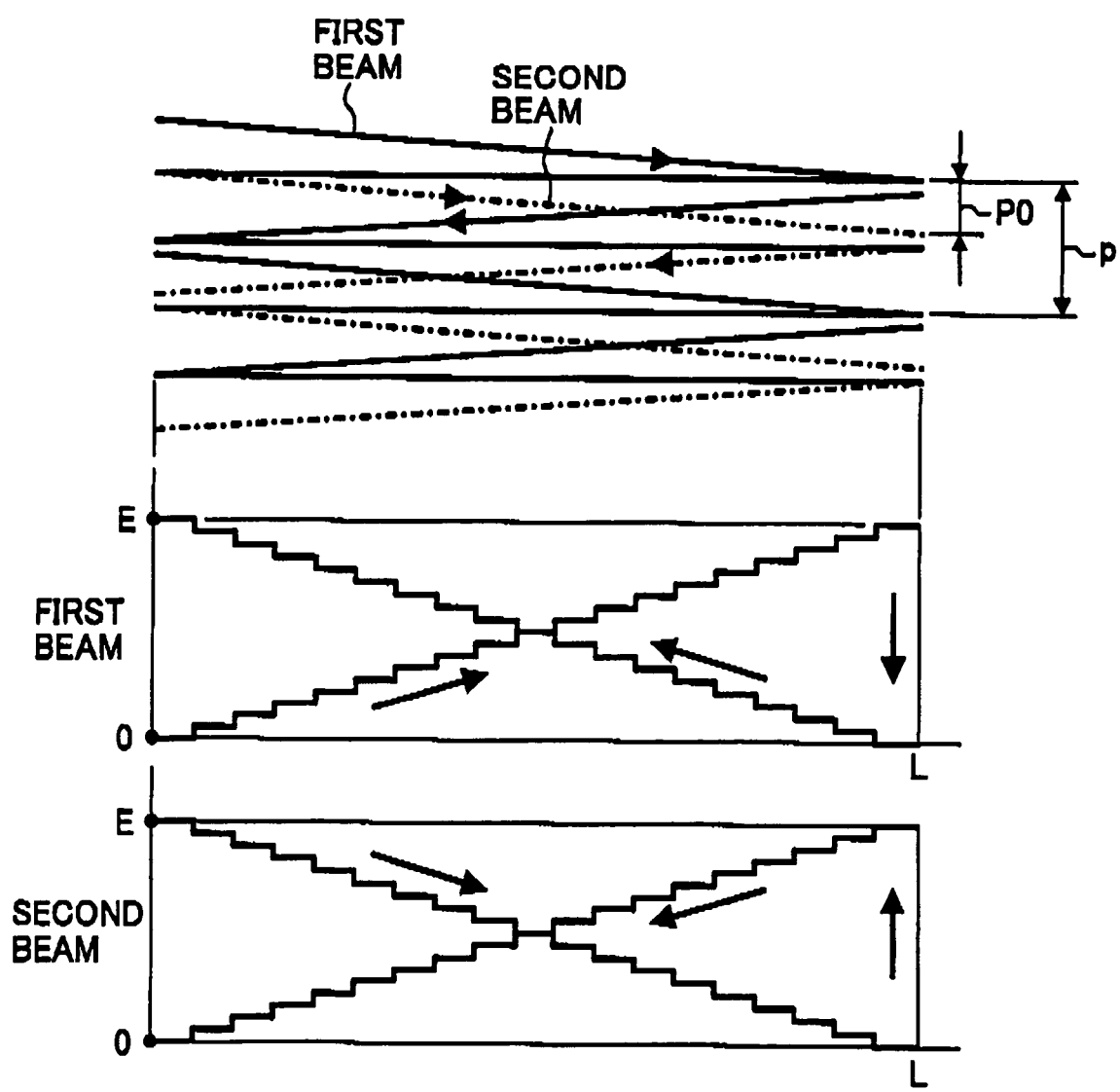
FIG. 20 is an explanatory view showing adjustment of recorded lines for scanning lines.

FIG. 20 is an explanatory view showing adjustment of recorded lines for scanning lines. Line tilt adjustment mount Δ0 is determined by detecting relative deviations from color criteria with resist shift detectors. The resist shift detector includes a light emitting diode 630 and a PIN photo-diode 631, and is disposed at each end of transfer belt 638. The PIN photo-diode 631 receives a light beam reflected from a detection pattern formed on the transfer belt 638 by toner, as shown in FIG. 17, the light beam having been emitted from the light emitting diode 630. A first and a second beam pitch P are adjusted as below, on the basis of a detected result of the resist shift detector 629, $$P = L \cdot \tan\Delta\theta$$

where Δθ is line tilt adjustment mount and L is scan width. At a start point of scanning, the light mount of the second beam is set to the maximum mount, and the light mount of the first beam is set to zero. The light mount of the first beam increases one toner at a time, and the light mount of the second beam decreases one toner at a time, from the start to the end point of scanning. The sum of the light mount of both light beam is set to constant at each point in a scanning direction. Thus, a locus of the latent image center is formed right up to the scanning line. The next line is formed in the same manner, and each line is aligned parallel and at a same tilt on the transfer belt.

Light intensity is described as beam intensity multiplied by an emitting period. Therefore, formation of the latent image as described above can also be done by varying the beam intensity, and/or varying pulse width of beam.

According to an embodiment of the present invention, however, beam intensity is varied stepwise. Additionally, the resist shift detector 629 can detect tilt shift between each color and resist shift (parallel shift). These shifts can be adjusted by adopting adjustment of line image joint in scanning device described above.

Figure 21:
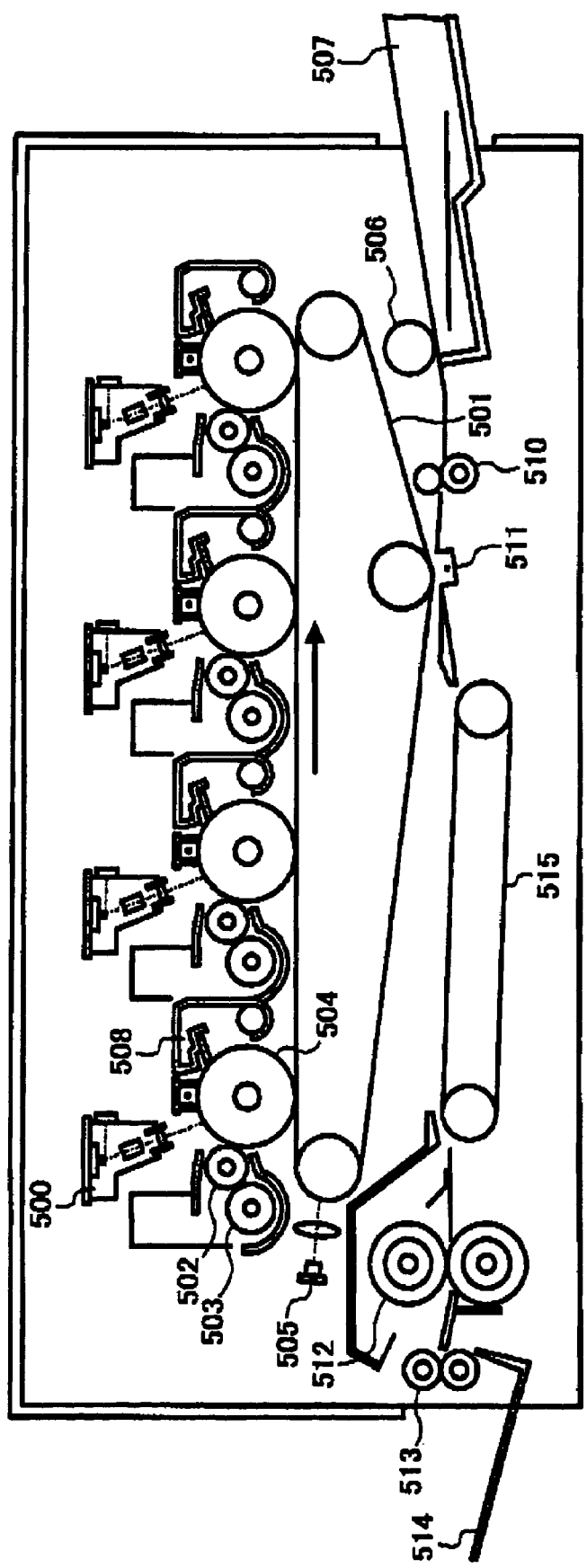
FIG. 21 is a cross sectional view of an image forming apparatus including the optical scanning devices of FIG. 13.

FIG. 21 is a cross sectional view of an image forming apparatus including optical scanning devices. An optical scanning device, as an image holding body, 500 according to the above-described configuration and an photosensitive drum 504 are positioned for forming each color image of four colors, as yellow, magenta, cyan, and black. Each color image is formed serially with rotation of a transfer belt, as an intermediate transfer body, 501, in a tandem image forming method, in the color laser printer. Each optical scanning device 500, corresponding to the optical scanning devices 640-643 in FIG. 17 and having the oscillating mirror module described above, is set to emit light beam downwardly, toward the optical scanning device, as shown in FIG. 12. The transfer belt 501, as transfer means, is supported by a driving roller and two driven roller. Each photosensitive drum 504 is aligned at even intervals in a moving direction of the transfer belt 501. Provided around each photosensitive drum 504 is a developing roller 502 that forms a visible image by attaching charged toner to an electrostatic latent image recorded by the optical scanning device 500, a toner hopper 503 storing the toner, and a cleaning case 508 scraping and storing residual toner on the photosensitive drum 504 after the toner image is transferred to the transfer belt 501. Each color image is formed on the transfer belt 501 as latent image by each optical scanning device 500. A start time for forming each image is triggered and shifted in a secondary scanning direction by a signal generated by a sensor 505, corresponding with the registration shift detector 629 in FIG. 17, detecting a resist mark formed on the edge of the transfer belt 501. A visible image is formed by attaching charged toner to an electrostatic latent image in a developing unit, the images successively superimposed on one another. A paper sheet is supplied from a paper-feeding tray 507 by a paper-feeding roller 506, and fed in timing with fourth image forming by a registration roller 510. Four color toner images formed on the transfer belt 501 is transferred to the paper simultaneously in the transfer unit 511. The paper having toner images is conveyed to a fixing unit by a conveyer belt 515 and fixed the toner images by the fixing roller 512. Then, the paper sheet is ejected onto a paper ejection tray.

Each optical scanning device 500 forms one line by connecting the scanning lines of each optical scanning modules, and performs printing by dividing all dots whose total number is L into three groups of dots 1 through L1, dots L1+1 through L2, and dots L2+1 through L and allocating the three groups of the dots to an image from its starting end. According to an embodiment of the present invention, the number of allocated dots (for example, L1) to each group is different in each color so that the joints of the scanning lines of one color are prevented from being formed on the joints of the scanning of another color in the same one line.

Image data is divided by three in a primary scanning direction as described above, stored into a bitmap memory in a recording control unit on each optical scanning device, raster-expanded on each oscillating mirror module, and stored in a buffer as line data. Stored line data is configured to be read by each synchronization detection signal and recorded individually. Registrations at a beginning of the recording are adjusted by setting the timings as described below.

As described above, according to an embodiment of the present invention, varying applied voltage gains results in oscillation angles of the oscillating mirrors being within in predetermined band and being driven at a common frequency, even if resonance frequencies of the oscillating mirrors are different. Changes in temperature vary spring constants of the torsion bars and shift resonance bands equally. When driving frequencies are adjusted to account for frequency shift, applying a common driving frequency and making scanning frequencies of the oscillating mirror modules equal brings the lines into registration with one another.

Figure 22:
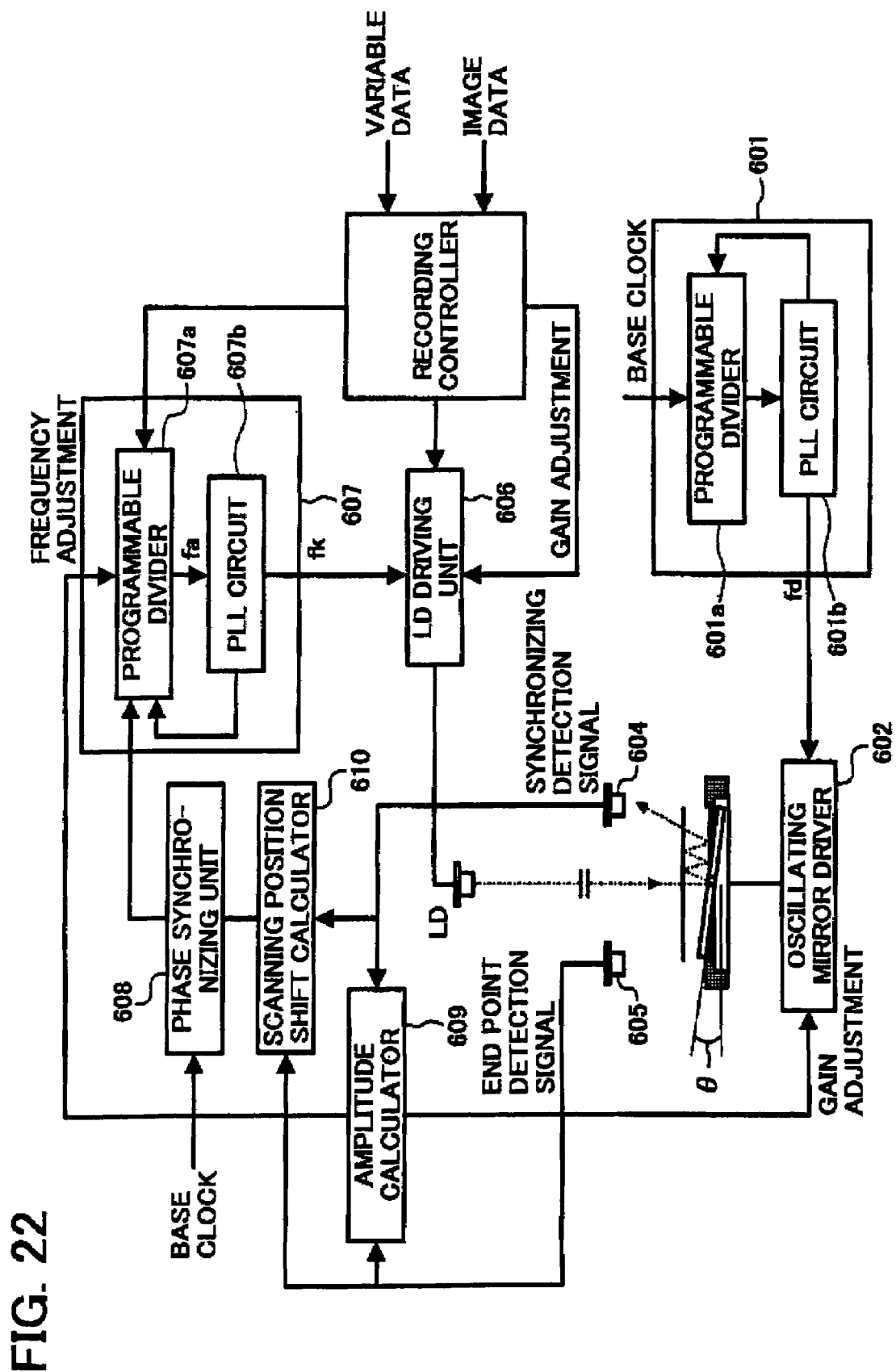
FIG. 22 is a block view of a control system driving the semiconductor laser device and the oscillating mirror of FIGS. 1A-1C and FIG. 14.

FIG. 22 is a block view of a control system driving semiconductor laser device and oscillating mirror. A programmable divider 601a in a driving pulse generator 601 divides base clock in and generates pulse train so that voltage pulses are applied at timings harmonizing amplitudes of the oscillating mirrors. A PLL (phase-locked loop) circuit 602 applies the pulses to oscillating mirror module driving units 602 so that the oscillating mirror modules have a predetermined phase delay δ between the oscillating mirror modules. The voltage pulses are applied to the electrodes of the oscillating mirror modules. If the phase delay δ is adjusted so that $$\delta=(1/fd)\cdot((\Delta y/p)-n)$$

where p is a scanning line pitch, Δy is a registration shift and n is a natural number satisfying (Δy/p)−n<1, displacement at the joint is equal to the scanning line pitch multiplied by an integer. In this condition, the registration shift Δy is eliminated by shifting a timing to start recording by n cycles of the oscillating mirror, in other words, n scanning lines, and a high quality image having no displacement at the joint is formed.

Figure 23:
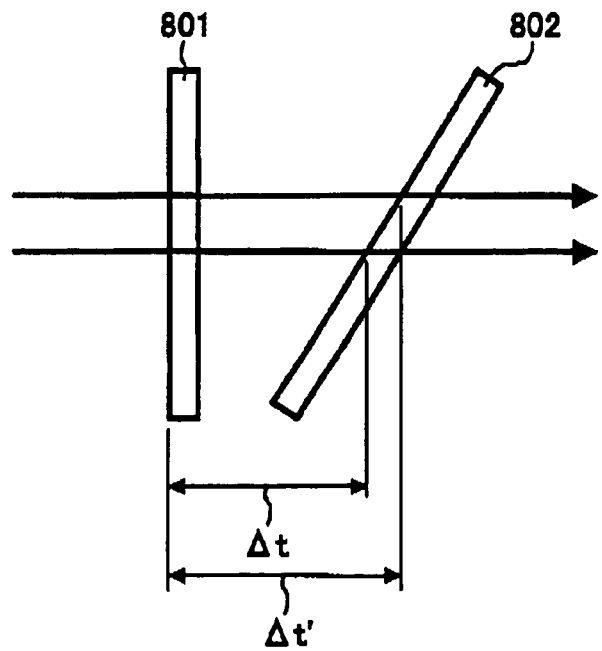
FIG. 23 is a side view of a synchronization detection sensor and an end point detection sensor of FIG. 22.

According to an embodiment of the present invention, synchronization detection sensor 604 and end point detection sensor 605 are disposed on a print circuit board. However, detection surfaces are set to have a same light path with a scanned surface. FIG. 23 is a side view of the synchronization detection sensor 604 and the end point detection sensor 605. These detection sensors have a first photo-diode 801 disposed perpendicular to a scanning direction and a second photo-diode 802 disposed non-perpendicularly to the scanning direction. The detection sensors detect a synchronization detection signal or an end point detection signal at a light beam passing an edge of the first photo-diode 801 and detect a scanning position shift in a secondary scanning direction corresponding to a scanning position shift on a photosensitive drum by measuring a time Δt that from when the light beam travels from the first photo-diode 801 to the second photo-diode 802. The scanning position shift is prime factor of registration shift Δy. Therefore, Δy expresses the scanning position shift as $$\Delta y=(v/\tan \gamma)\cdot \Delta t$$

where γ is a tilt angle of the second photo-diode and v is scanning velocity of light beam. If the time Δt is constant, there is no scanning position shift. A scanning position shift calculator 610 monitors the time Δt and detects a scanning position shift. The result of detection can be used to adjust a phase difference between oscillating mirrors so that the time Δt corresponds a time basis Δt0.

A scanning velocity shift in a primary scanning direction can be corrected by adjusting the oscillation angle and amplitude to a predetermined value with gain adjustment of voltage pulse applied to oscillating mirrors. A gap at joint position between adjacent image areas is eliminated by varying an image width scaling factor by shifting a pixel clock in response to a driving frequency of an oscillating mirror and by synchronizing a scanning end point to a scanning start point of adjacent optical scanning device.

Driving voltage may be applied on an oscillating mirror during a period of recording image and of preparing for recording. Therefore, when power is on or a standby mode is exited, oscillating mirrors are oscillated by varying driving frequency fd from a higher frequency with the programmable divider 601a varying a dividing ratio. An amplitude calculator 609 detects an oscillating angle, amplitude θ0, by determining a time difference between synchronization detection signal from the synchronization detection sensor 604 and an end point detection signal from the end point detection sensor 605 disposed near scanning angle −θ0. A detected scanning angle of light beam θd, detected by the sensors, scanning time from image center t and driving frequency of an oscillating mirror fd are related as $$\theta d/\theta 0=\sin 2\pi \cdot fd\cdot t, \ t=T/2.$$

The oscillating angle is adjusted by varying a gain of the applied voltage pulse so that the time difference T reaches a predetermined value TO. This adjustment is executed periodically in each environment, such as during an interval between jobs. Adjustment during recording of the image results in fluctuations at a primary scanning edge of the image. Therefore the time difference T remains constant during recording of the image. Additionally, a common driving frequency and a common gain basis are used such that the oscillating mirrors have a same oscillating angle. Adjustment described above occurs in each oscillating mirror module. According to an embodiment of the present invention, the image is formed after adjustment of all three optical scanning devices.

Control of driving a semiconductor laser device is explained below. As described above, to provide a uniform line pitch of a latent image in scanning back and forth, a beam intensity or a beam pulse width should be varied.

Figure 24:
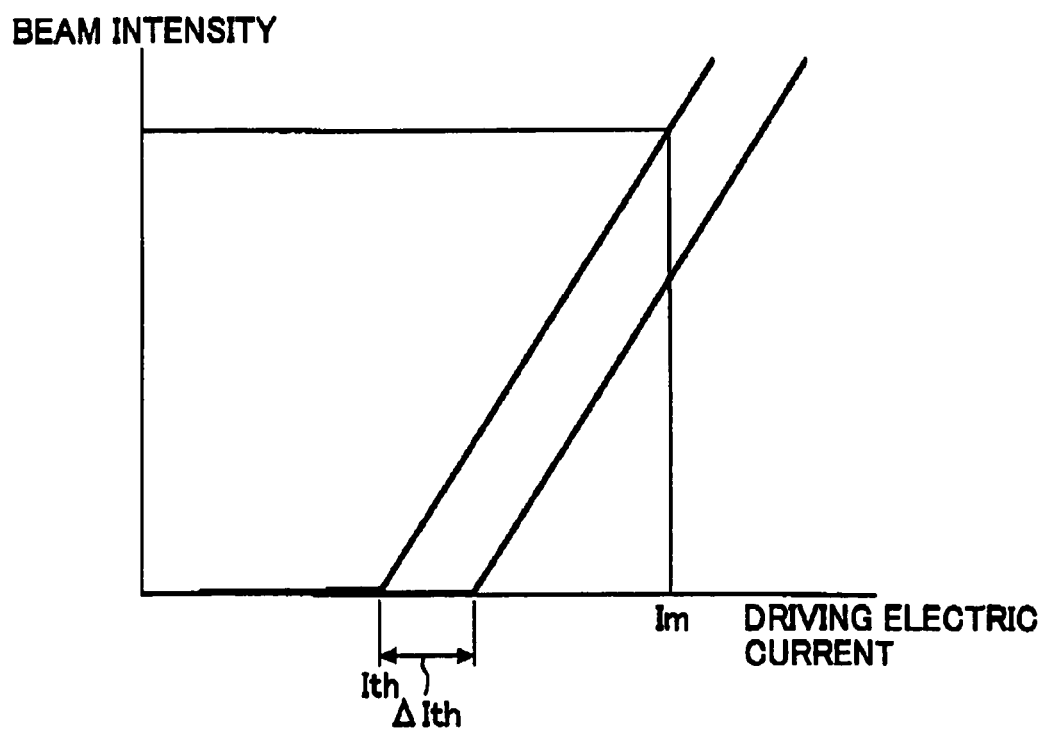
FIG. 24 is a graph showing beam intensities as a function of electric currents applied to a semiconductor laser device.

Variation of beam intensity is explained. FIG. 24 is a graph showing variations in electrostatic torques generated between electrodes as a function of swing angles of the oscillating mirror. Beam intensity increases proportionally over a threshold electric current. Therefore, an electric current difference Im−Ith, where Ith is the electric current threshold and Im is a maximum electric current, is divided by n, for example 255, and driving electric current is varied stepwise based on varying data.

As described above, electric current applied to one light source reduces gradually from Ith at a starting point in a primary scanning direction to Im at an end point, and electric current applied to another light source increases gradually from Im at a starting point in a primary scanning direction to Ith at an end point, where the synchronization detection signal is used as a trigger.

An LD (laser diode) driving unit 606 is generally under feedback control to adjust driving electric current by a monitor signal from a semiconductor laser device to stabilize a beam intensity, because varying temperatures within a case can vary Ith and Im. Unless feedback control is used, an image density is different at low temperature and high temperature, because of varying beam intensity. Therefore, according to an embodiment of the present invention, to compensate for the differences in image density, varying amount of a driving current Im', where a monitor signal has a predetermined output value, is added equally to driving electric currents as a threshold electric current bias ΔIth.

Next, variation of a beam pulse width is explained. A programmable divider 607a in a clock pulse generator 607 generates PLL base signal fa having k clocks length of pulse width obtained by dividing a base clock f0 based on varying data and counting the divided clock. The PLL circuit 607b generates a pixel clock fk by determining a phase on the base clock f0. It is understood that as a pulse width increases, the diameter of the latent image increases. Therefore, varying a pulse width stepwise along a primary scanning direction provides the ability to form a latent image having any diameter, based on a variation of the data.

As described above, application of an electric current to one light source is reduced gradually from a starting point in a primary scanning direction, where a latent image has a diameter corresponding to one pixel, to an end point, and application of electric current to another light source is increased gradually from a starting point in the primary scanning direction to an end point, where a latent image has a diameter corresponding to one pixel. In this procedure, a synchronization detection signal is used as a trigger.

Resonance oscillation of an oscillating mirror varies a scanning angle as a sine wave. Conversely, primary scanning dots should have a same pitch on the photosensitive drum. Thus, a focusing property of a scanning lens should be adjusted so that a scanning distance in each scanning angle dH/dθ is proportional to arcsinθ/θ0. The scanning angle changes at a relatively slow rate at an image center and increases in a rate of change at the edges of the image. Therefore, the scanning lens designed to distance a focus point with going from center to edge is usually used. However, such design increases a diameter of beam spot with going and limits to spread available scanning area θs to a maximum amplitude θ0.

Figure 25:
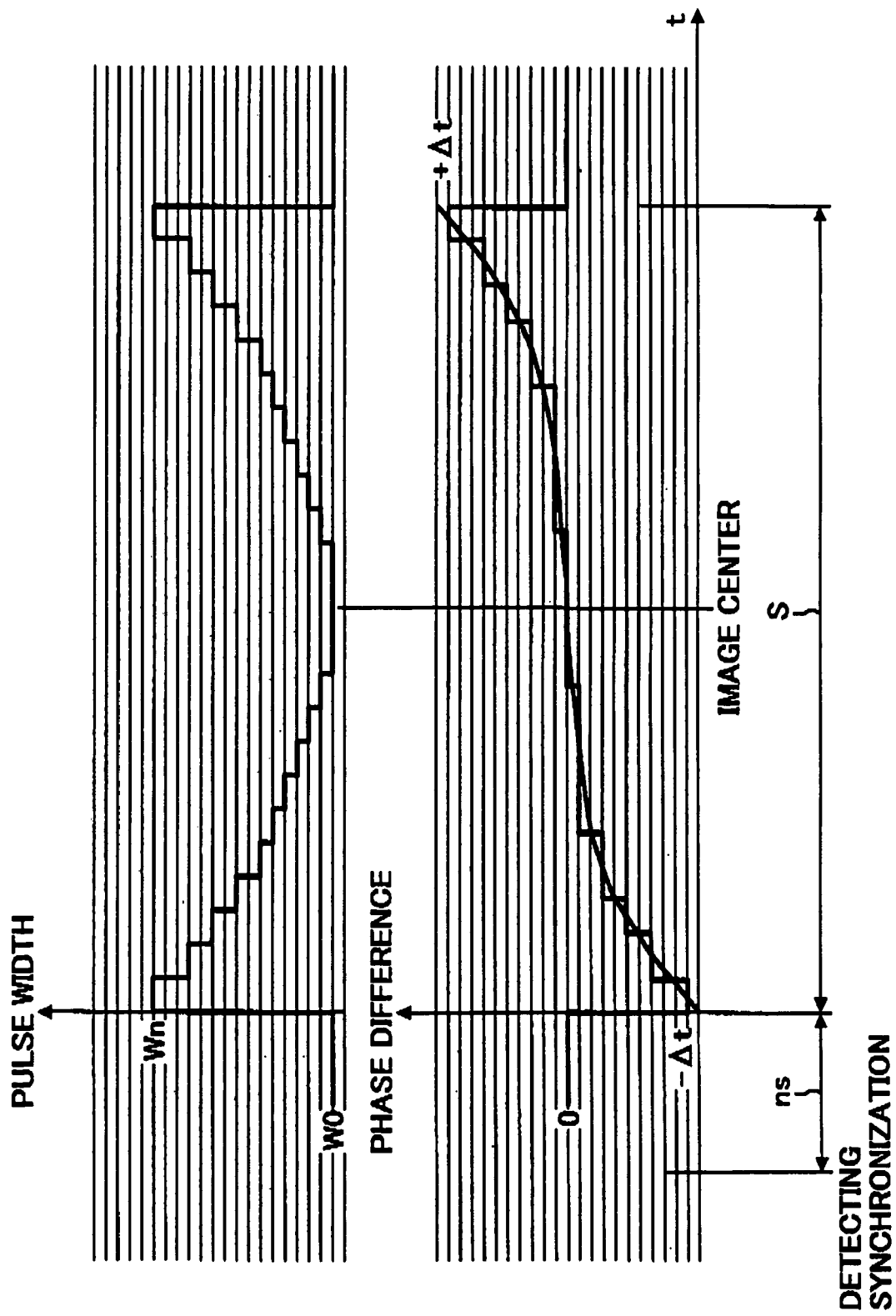
FIG. 25 is a graph showing phase differences corresponding to pixels delayed stepwise from start of scanning to end of scanning in response to varying scanning velocity out of oscillation.

To overcome these problems, according to an embodiment shown in FIG. 25, a phase difference corresponding to each pixel is delayed stepwise from a start of scanning to an end of scanning in response to varying scanning velocity out of oscillation. Concurrently, a pulse width of each pixel is shortened stepwise from the start of scanning to the center of scanning and is elongated stepwise from the center of scanning to the end of scanning, by adjusting a pixel clock fn driven by an LD driver 606. Such electric adjustment reduces a load on the lens and enhances efficiency. The adjustment can be executed easily without adding another controlling circuit because the adjustment can be accomplished by setting a pulse width and a phase difference so that each pixel dot has a same diameter, and by generating a pulse having a pulse width divided proportionally corresponding to the set pixel.

Additionally, in above embodiment, an optical scanning device uses a semiconductor laser array having two light sources. However, it can be a semiconductor device having a single light source or more than two light sources.

Figures 26A, 26B:
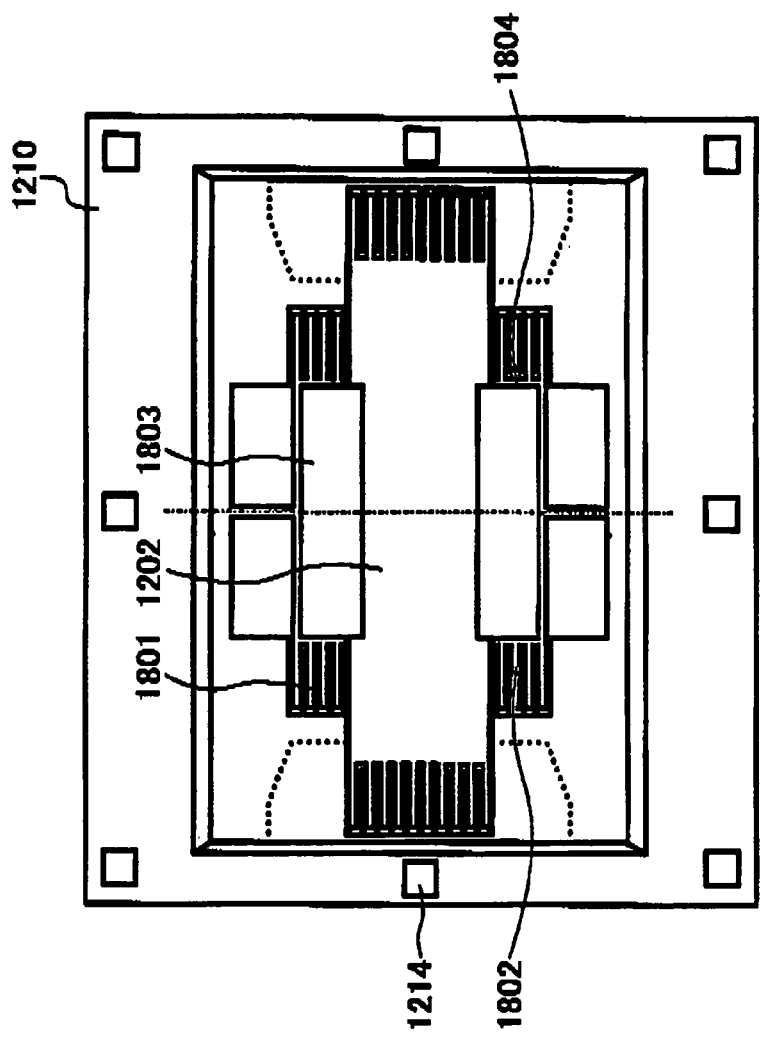
FIG. 26A is an isometric view of an oscillating mirror module provided in an optical scanning device according to another embodiment of the present invention.
FIG. 26B is a top view of an oscillating mirror of the oscillating mirror module of FIG. 26A.
Figure 26D:
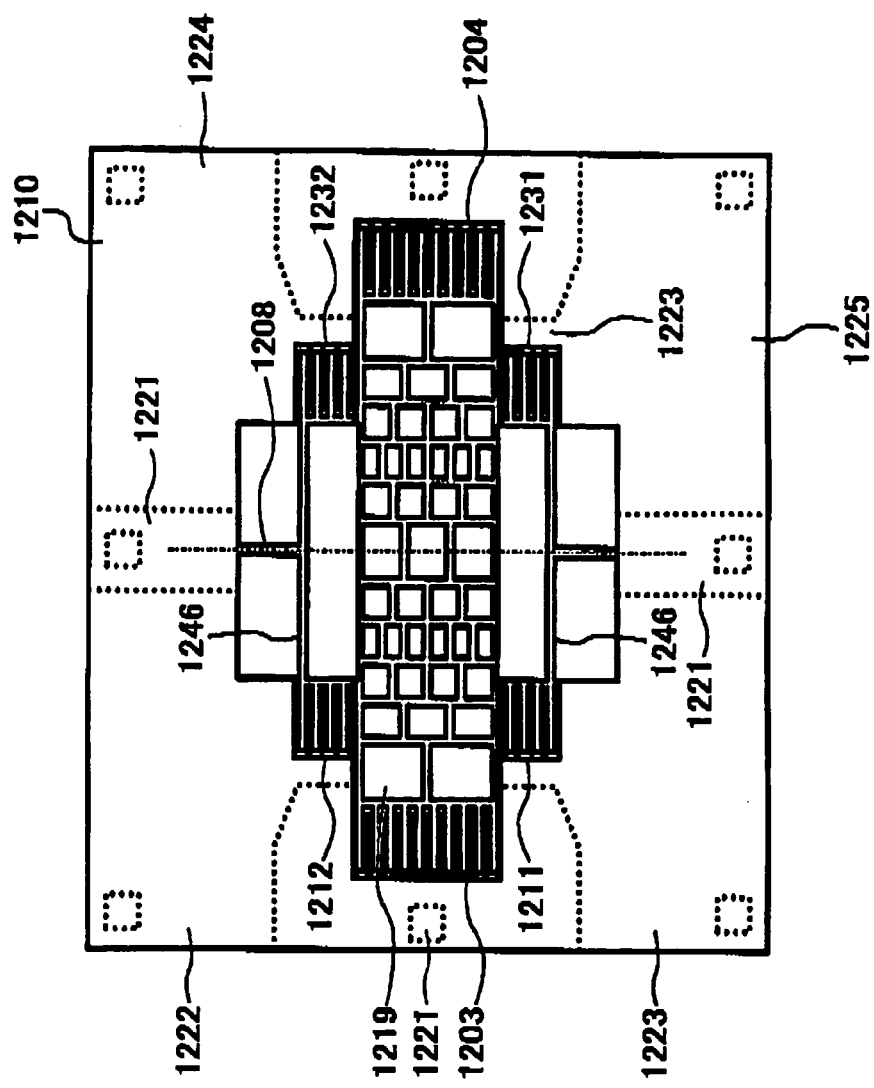
FIG. 26D is a bottom view of the oscillating mirror of the oscillating mirror module of FIG. 26A.
Figure 26C:
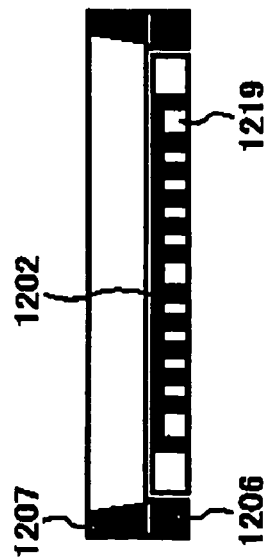
FIG. 26C is a cross sectional view of the oscillating mirror of the oscillating mirror module of FIG. 26A.

FIG. 26A is an isometric view of an oscillating mirror module provided in an optical scanning device according to another embodiment of the present invention. FIG. 26B-D are a top view, a cross sectional view and a bottom view of an oscillating mirror 1202, respectively, which are set in the oscillating mirror module form an oscillating mirror, which acts as a deflector. The first silicon substrate 1206 and the second silicon substrate 1207 are joined by an insulating layer, such as silicon oxide, disposed as an intermediate layer.

The first silicon substrate 1206 is preferable 60 μm thick. As shown in FIG. 26B, an oscillating mirror 1202 and torsion bars 1208 collinearly supporting the oscillating mirror 1202 are formed by etching through the first silicon substrate 206. The torsion bars 1208 are formed like "Y" or "T" shapes. The torsion bars 1208 have branches 1246 joined to the oscillating mirrors 1202 at two points off center from a rotation axis of the oscillating mirrors 1202. Side edge portions of the oscillating mirror 1202 extending along the torsion bars 1208 are formed of convex and concave portions arranged like comb teeth. The convex and concave portions engage with a fixed frame 1210 by gaps of micron order. The oscillating mirror 1202 has a reflective surface includes a metal layer preferably formed by sputtered a metal, such as gold, on its surface. A first movable electrode and a second movable electrode are formed on convex and concave portions of both edges of the oscillating mirror 202. The first movable electrode 1203A and the second movable electrode 1203A have a same electric potential. A first fixed electrode 1203B and a second fixed electrode 1204B are formed on convex and concave portions, opposite to a first movable electrode 1203A and a second movable electrode 1204A, of the fixed frame 1210 by etching both sides of the fixed frame 1210 to the insulating layer, which acts as an etch-stop layer, around the electrodes and separated one another. On convex and concave portions of the torsion bar 1208, a third movable electrode 1801, a forth movable electrode 1802, a fifth movable electrode 1803 and a sixth movable electrode 1804 are formed. The oscillating mirror 1202, the torsion bars 1208, torsion bar bases 1221 and islands 1222-1225 are separated by a separating trench gap of about 5 μm.

The second substrate 1207 is preferably 254 μm thick. As shown in FIG. 26C, convex and concave portions arranged like comb teeth on the inner periphery as a third fixed electrode 1211 and a fourth fixed electrode 1212 and a fifth fixed electrode 1231 and a sixth fixed electrode 1232 island separated from the fixed frame 1210 are formed by etching a center portion of the second substrate 1207. The convex and concave portions of the second substrate 1207 overlap and correspond to the convex and concave portions of the fixed frame 1210. According to an embodiment of the present invention, voltage pulses applied to the first fixed electrode 1203 and the second fixed electrode 1204 have a same phase.

The voltage pulses are applied to the third fixed electrode 1211 and the fourth fixed electrode 1212, and the fifth fixed electrode 1231 and the sixth fixed electrode 1232 in a same phase to provide a larger swing angle than an angle provided by the first fixed electrode 1203 and the second fixed electrode 1204.

Figure 27:
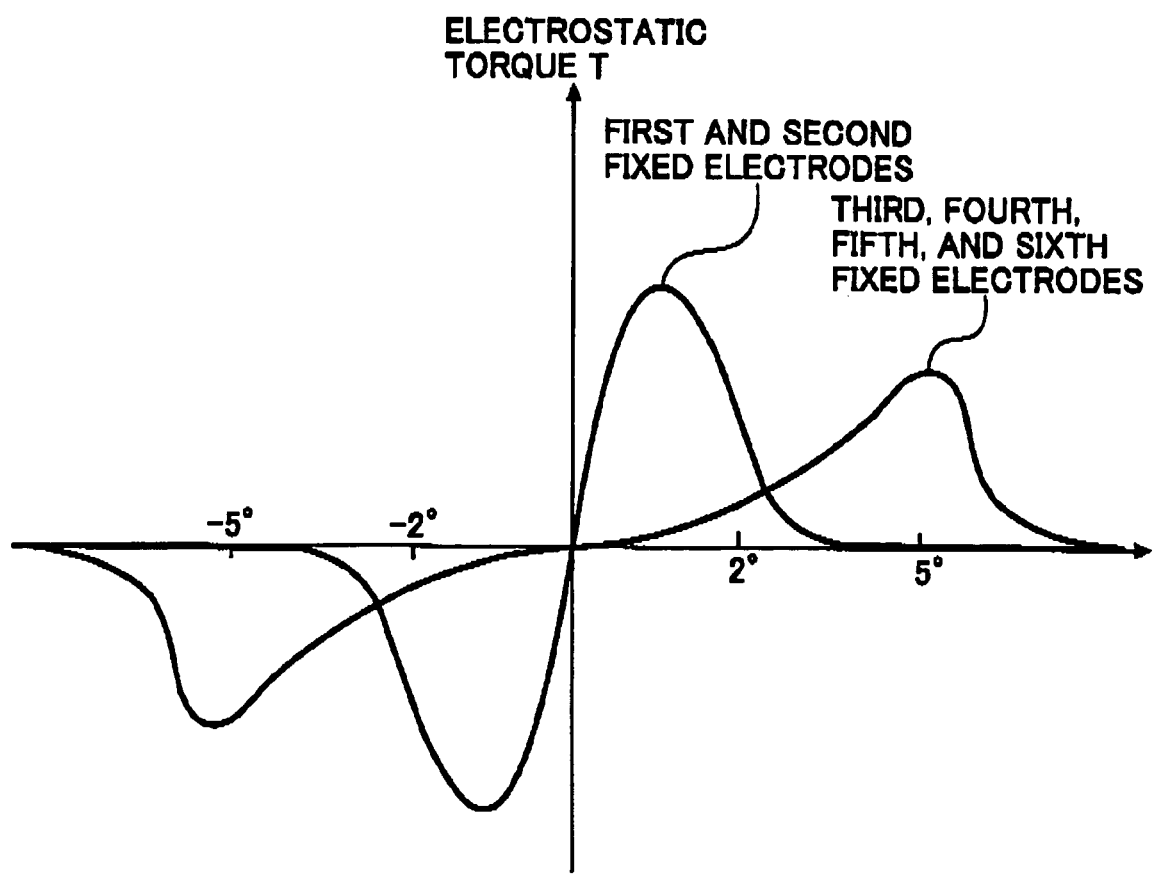
FIG. 27 is a graph showing variations in electrostatic torques generated between electrodes as a function of swing angles of the oscillating mirrors of FIG. 26A-26C.

FIG. 27 is a graph showing variations in electrostatic torques generated between electrodes as a function of swing angles of the oscillating mirror 1202. Since the distribution electrostatic torque changes based on whether the fixed electrodes are located in front or behind the oscillating mirror 1202 along the rotation axis, voltage pulses are applied based on an oscillation timing of the oscillating mirror 1202. An overlap area is provided in swing angle generated by electrostatic torque. The third fixed electrode 1211 and the fourth fixed electrode 1212, and the fifth fixed electrode 1231 and the sixth fixed electrode 1232 are aligned to optimize distribution of electrostatic torque for gaining torque in whole range from the oscillating mirror 1202 in horizontal condition, whose swing angle is 0, to almost maximum swing angle θ.

Figure 28A:
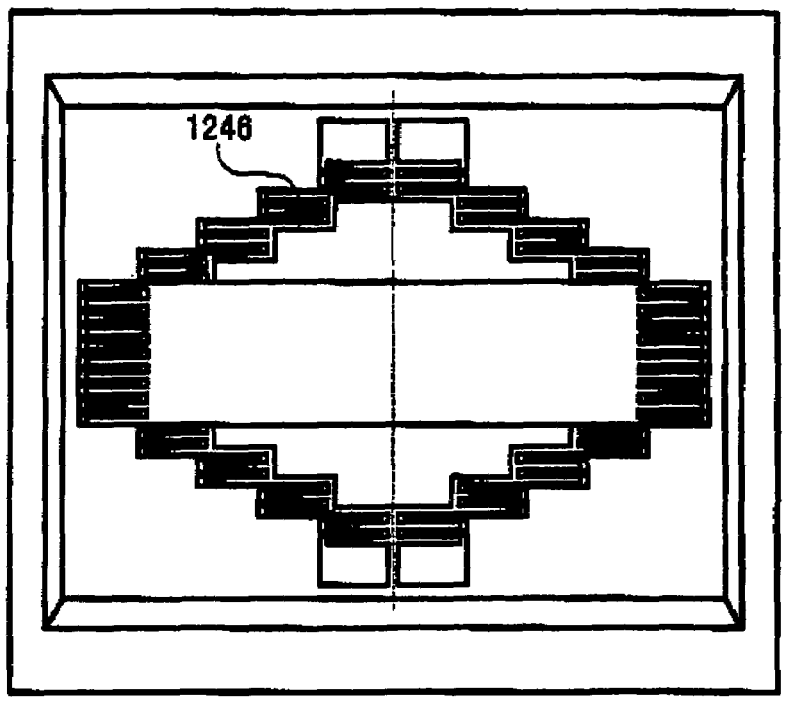
FIG. 28A is a top view of another embodiment of an oscillating mirror of the oscillating mirror module of FIG. 26A.
Figure 28B:
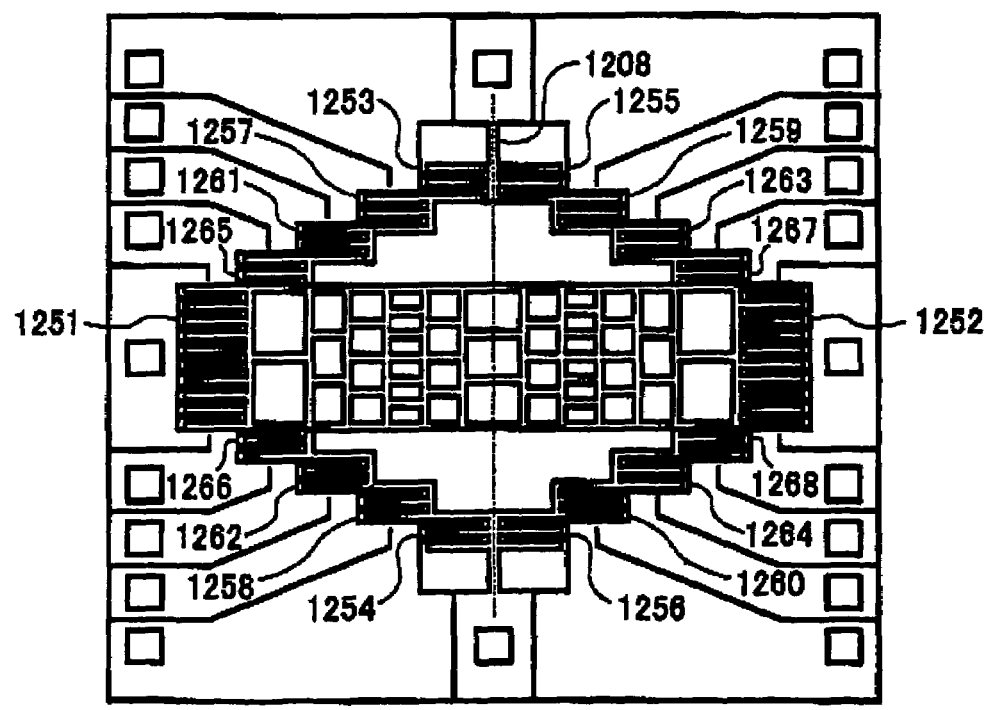
FIG. 28B is a bottom view of another embodiment of an oscillating mirror of the oscillating mirror module of FIG. 26A.

According to the embodiment described above, the fixed electrodes are disposed near both ends of the oscillating mirror 1202 and comparably near the rotation axis. Providing more electrodes along the branches 1246 of the torsion bars 1208 results in an increase in uniform electrostatic torques in whole range of movement and a greater swing angle. FIGS. 28A and 28B show top and bottom views of such an embodiment. According to this embodiment, the branches 1246 have step-like shapes. The branches can have liner shapes, as shown in 28C. Restated, expansion of the swing angle may result in the inability to gain additional rotation torque. Therefore, to gain rotation torque over the whole range of movement, optimizing the number and positions of electrodes may be performed.

Figure 29:
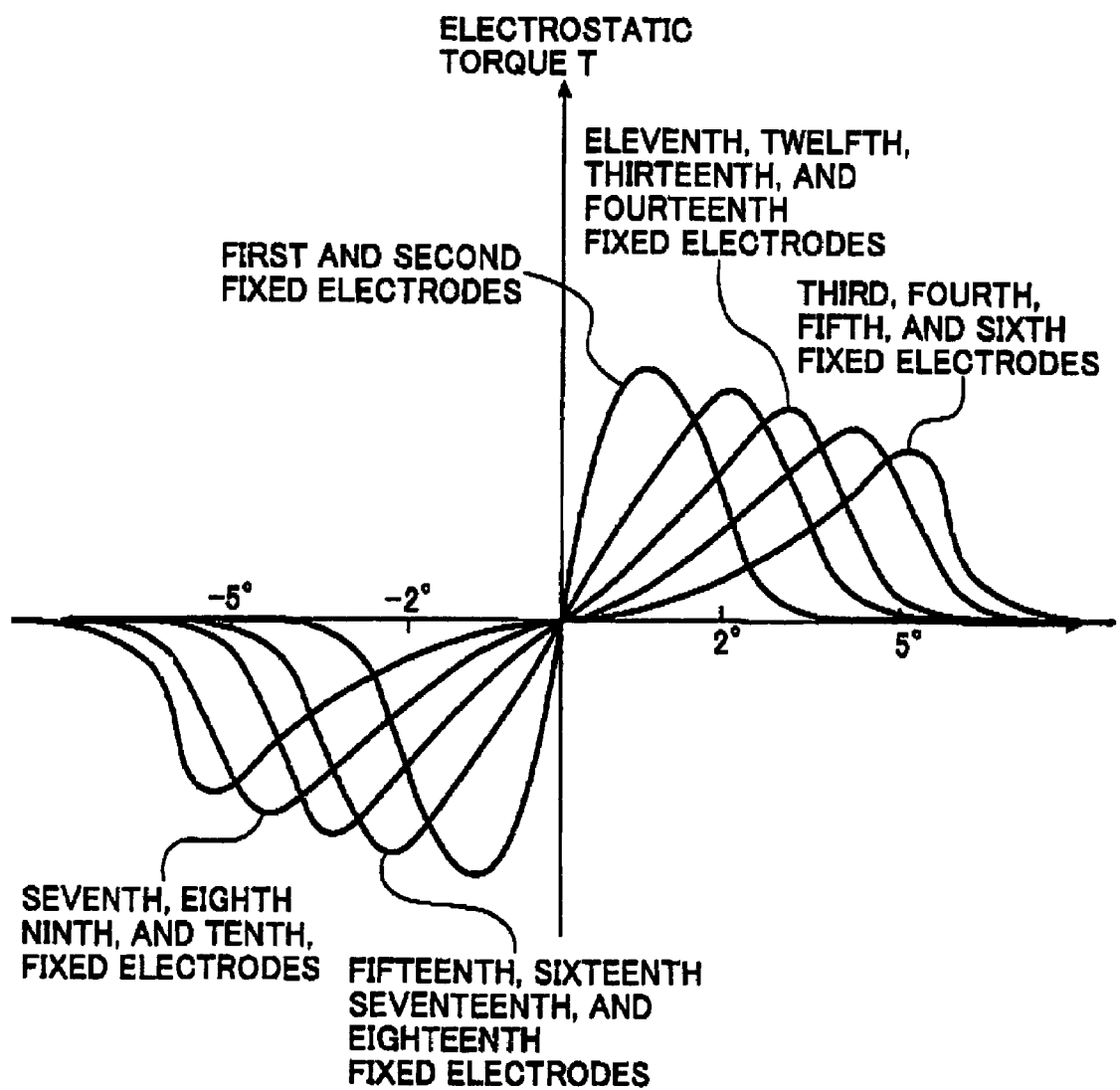
FIG. 29 is a graph showing variations in electrostatic torques generated between electrodes as a function of swing angles of the oscillating mirror of FIG. 28A-28B.

FIG. 29 is a graph showing electrostatic torques generated between electrodes as a function of swing angles of the oscillating mirror shown in FIGS. 28A and 28B. To swing the oscillating mirrors from the maximum angle to horizontal angle, the following can be performed:

Appling a voltage to a third fixed electrode 1253, a fourth fixed electrode 1254, a fifth fixed electrode 1255 and a sixth fixed electrode 1256;

Appling a voltage to a seventh fixed electrode 1657, a eighth fixed electrode 1258, a ninth fixed electrode 1259 and a tenth fixed electrode 1260;

Appling a voltage to a eleventh fixed electrode 1261, a twelfth fixed electrode 1262, a thirteenth fixed electrode 1263, a fourteenth fixed electrode 1264;

Appling a fifteenth fixed electrode 1265, a sixteenth fixed electrode 1266, a seventeenth fixed electrode 1267 and a eighteenth fixed electrode 1268; and Appling a first fixed electrode 1251 and second fixed electrode 1252.

For reverse oscillation of the oscillating mirror, voltages are applied in the reverse order.

Figure 30A:
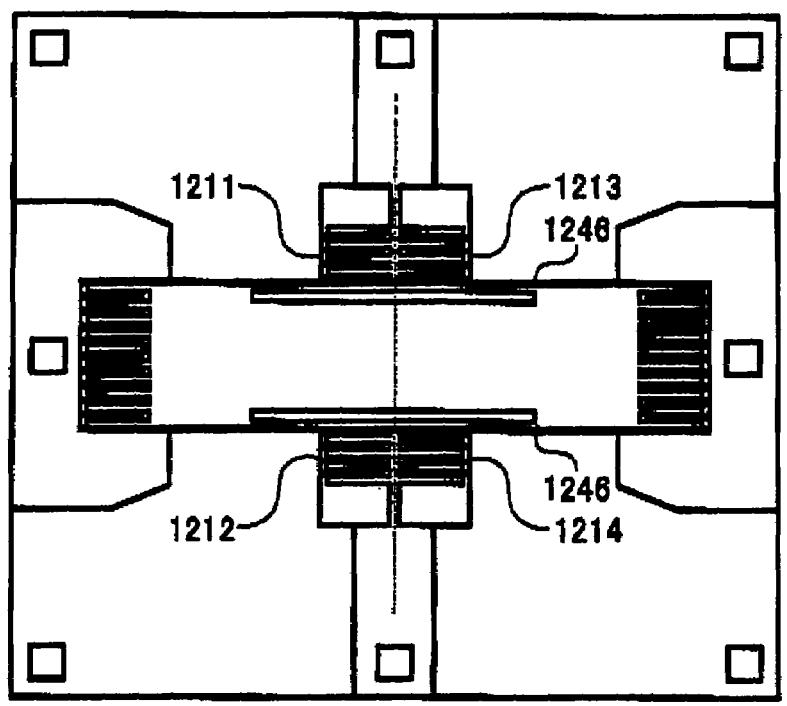
FIG. 30A is a top view of another embodiment of an oscillating mirror of the oscillating mirror module of FIG. 26A.
Figure 30B:
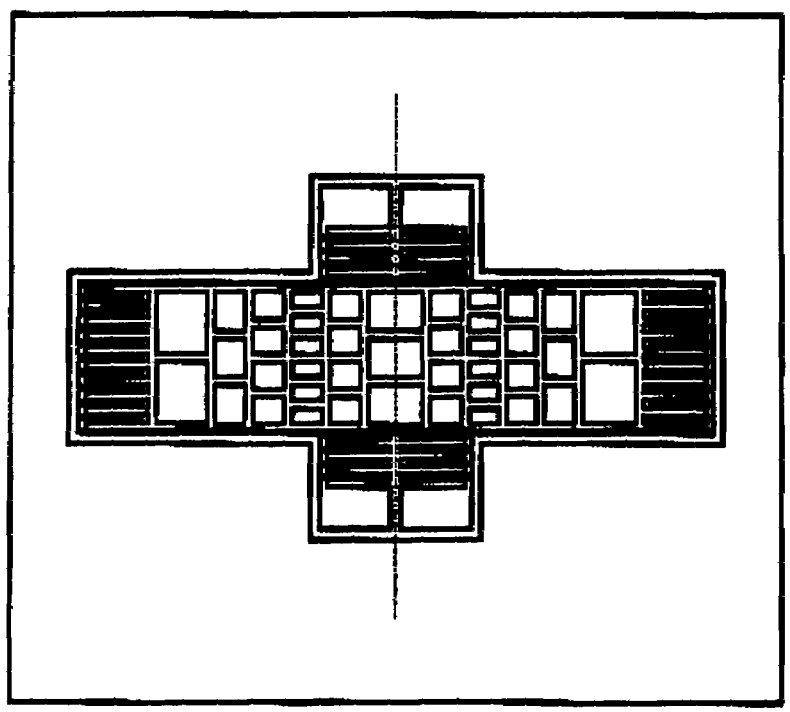
FIG. 30B is a bottom view of another embodiment of an oscillating mirror of the oscillating mirror module of FIG. 26A.

FIGS. 30A and 30B show top and bottom views of another embodiment of an oscillating mirror, respectively. A third movable electrode, a forth movable electrode, a fifth movable electrode and a sixth fixed electrode are formed on a torsion bar. Branches of the torsion bar are formed on the movable mirror. Voltage pulsed are applied on a first fixed electrode and a second fixed electrode, and on a third fixed electrode and forth fixed electrode serially in each range able to generate electrostatic torque, and oscillate the oscillating mirror.

Figure 31:
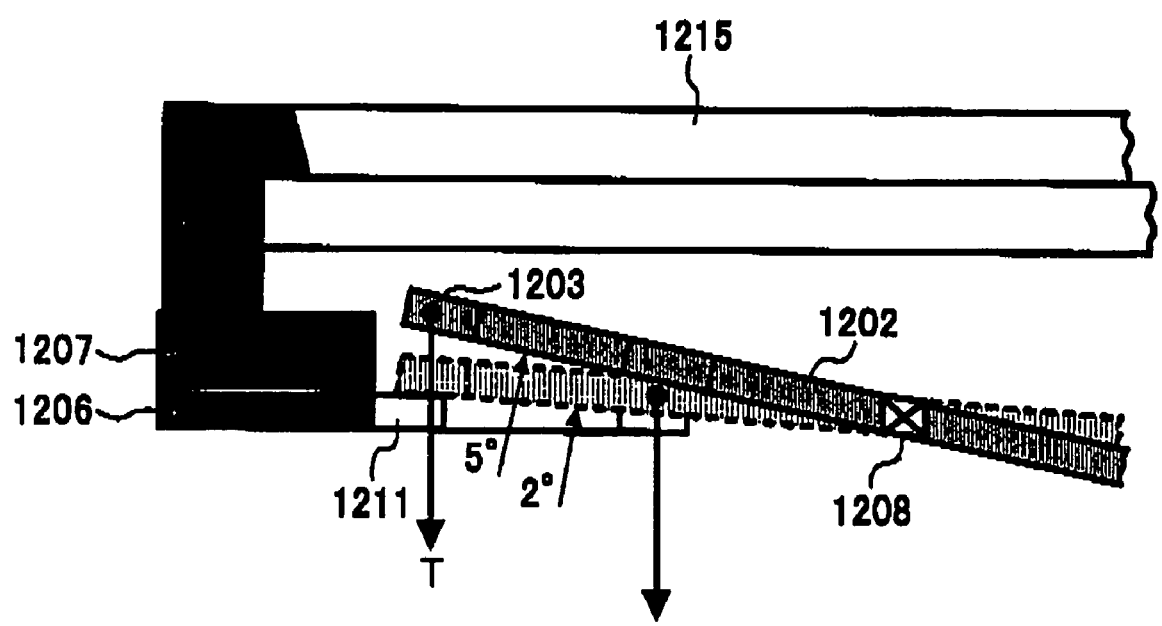
FIG. 31 is a cross sectional view of electrodes of the oscillating mirror module of FIG. 26B-26D.

FIG. 31 shows a cross sectional view of the electrodes. In FIG. 31, electrostatic torque applied in a counterclockwise direction has a positive value. The oscillating mirror 1202 tilts slightly from a horizontal position in an initial condition because the oscillating mirror 1202 is formed by opening one side of the joined silicon substrate. At this orientation, applying voltage pulses to the first fixed electrode 1211 and the second fixed electrode 212 generates electrostatic force. The electrostatic force torques the torsion bar 1208 and rotates the oscillating mirror 1202 back to a horizontal position. When the voltage pulse is off, the force of torsion bar 1208 rotates the oscillating mirror 1202 back to the initial position. However, inertial forces rotate the mirror 1202 beyond the horizontal position. Subsequently, the oscillating mirror returns to the initial position. If a voltage pulse is applied to the first fixed mirror 1203 and the second fixed mirror 1202 before the oscillating mirror 1202 returns to the initial position and generates positive or negative electrostatic force continuously, the oscillating mirror rotates back and forth. If the inertia moment of the oscillating mirror 1202 and a length of the torsion bar 1208 are set as in range of first order resonance mode near a desired scanning frequency and a frequency of voltage pulse is set to a resonance frequency, oscillation amplitude of the oscillating mirror 1202 is excited and encompasses an angle through which the third fixed electrode 1211 and the fourth fixed electrode 1212 which face the movable electrodes on both edge of the oscillating mirror 1202 act on the oscillating mirror 1202.

Voltage pulses are applied to the third fixed electrode 1211 and the fourth fixed electrode 1212, and the fifth fixed electrode 1231 and the sixth fixed electrode 1232 during rotation of the oscillating mirror 1202 from the maximum swing angle to just before the horizontal position. Voltage pulses are applied to the first fixed electrode 1203 and the second fixed electrode 1204. These procedures generate positive force continuously and support force of the torsion bars during movement of the oscillating mirror from the maximum swing angle θ to the horizontal angle 0. Therefore, even if the resonance frequency shifts, the swing angle is controlled the third fixed electrode 1211 and the fourth fixed electrode 1212. The conditions are expresses as:

$\theta 1 = \arcsin((t0)/L0)$, $\theta 2 = \arcsin((t0)/L)$, $-\theta 0 < \alpha 1 < \theta 0$, and $\theta 0 < \alpha 2 < \theta$ and $-\theta < \alpha 2 < -\theta 0$, where t0 is the thickness of the first substrate, 60 μm, 2L0 is the width of the oscillating mirror 202, 4 mm, 2L is the width of the third fixed electrode 1211, the fourth fixed electrode 1212, the fifth fixed electrode 1231 and the sixth fixed electrode 1232, 2 mm, θ0 is the maximum swing angle of the oscillating mirror 1202, α1 is the angle at which voltage pulses are applied to the first and second fixed electrode 203, 204, and α2 is the angle at which voltage pulses are applied to the third fixed electrode 1211, the fourth fixed electrode 1212, the fifth fixed electrode 1231 and the sixth fixed electrode 1232.

Figure 32:
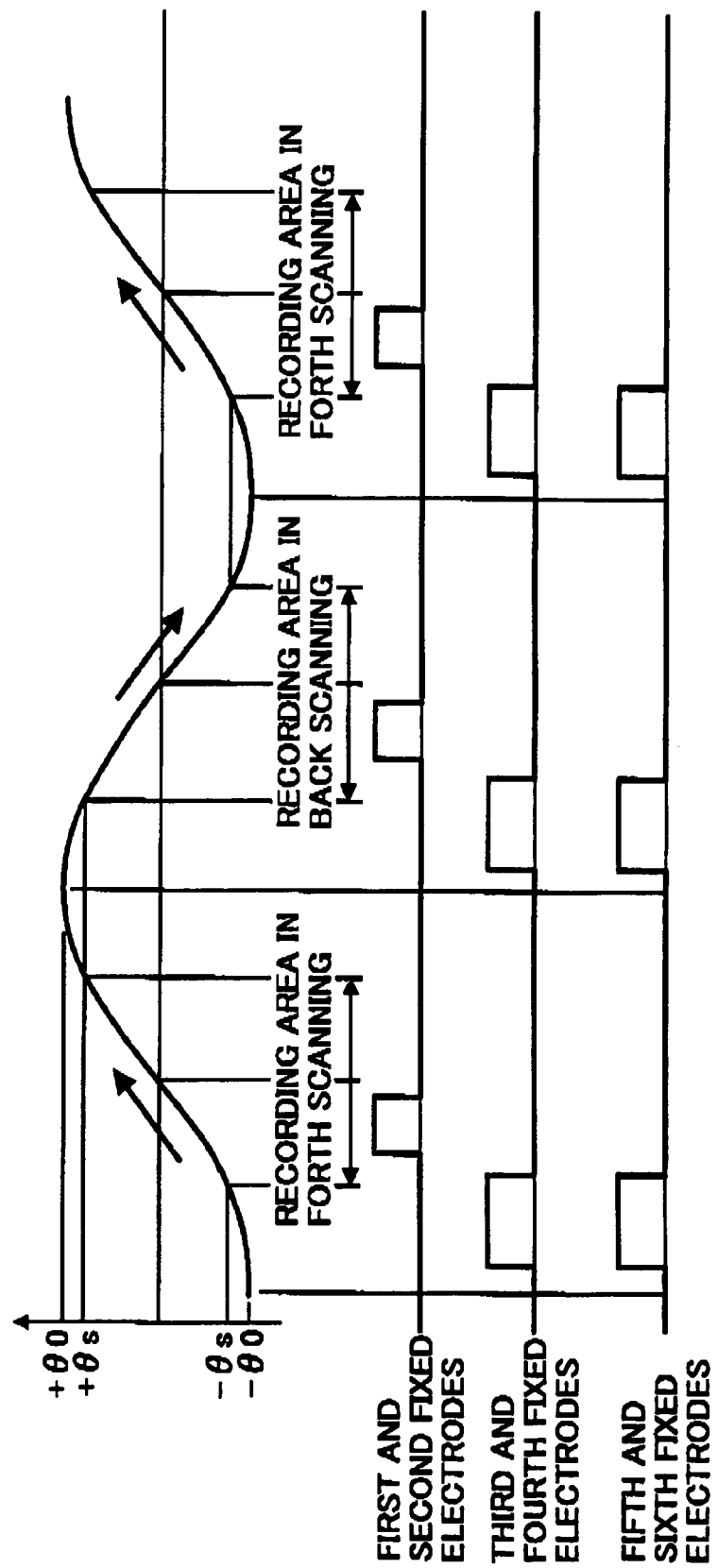
FIG. 32 is a chart showing application of voltage pulses to fixed electrodes as a function of amplitudes of the oscillating mirror of FIGS. 26B-26D.

FIG. 32 is a chart showing application of voltage pulses to the fixed electrode as a function of amplitudes of the oscillating mirror 1202. According to an embodiment of the present invention, recording is performed during one of scanning back and forth. Phases of voltage pulses applied to the fixed electrodes are adjusted such that electrostatic torques effectively control the amplitude of the swing. Additionally, as will be described below, the width of voltage pulse, called duty, applied to the first fixed electrode 1203 and the second fixed electrode 1204 is adjusted such that the amplitude achieves the desired maximum amplitude by detecting the amplitude out of measuring scanning time of light beam at start and end point of scanning.

Figure 33:
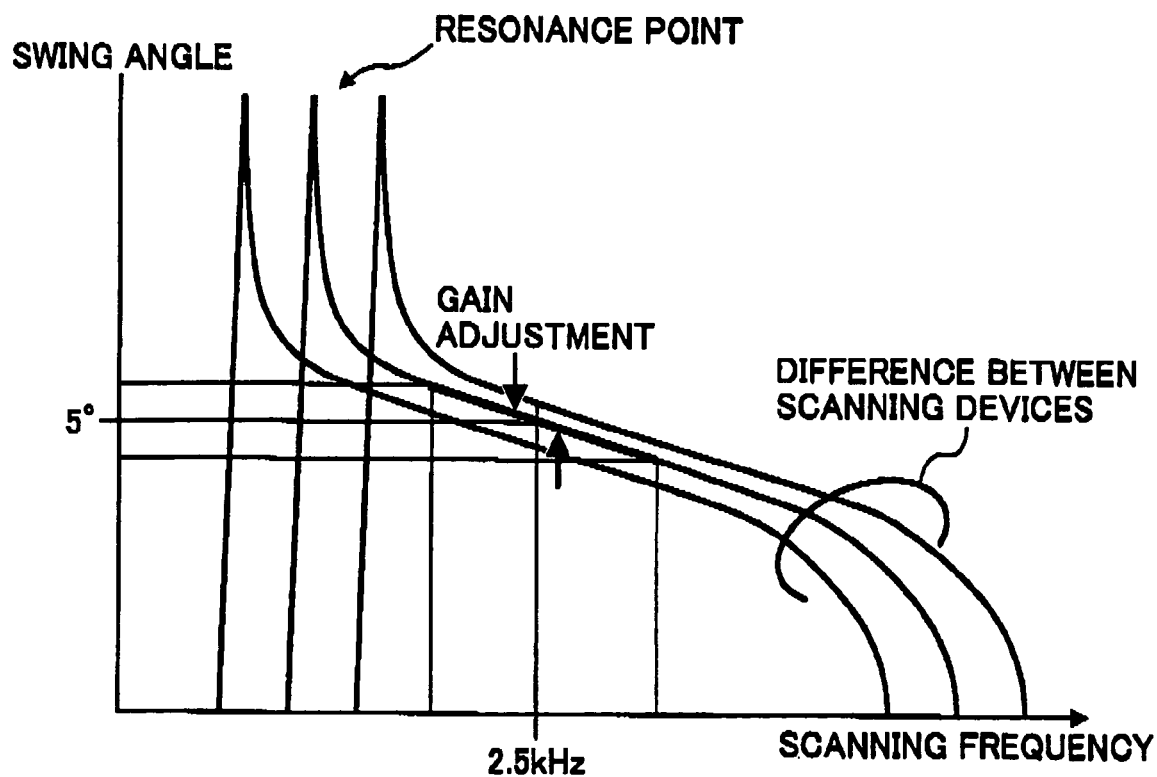
FIG. 33 is a graph showing swing angle responses of the oscillating mirrors as a function of driving frequencies.

FIG. 33 is a graph showing swing angle responses of the oscillating mirror module as a function of drive frequencies. At a point of scanning frequency corresponding with a resonance frequency, the swing angle is a maximum, but the response varies rapidly. Therefore, it may be somewhat unstable with time that a scanning frequency applied on a fixed electrode at an oscillating mirror driver is adjust to a resonance frequency, since a resonance frequency may vary in response with temperature or other factors.

As described above, a plurality of oscillating mirrors should be driven by a same common scanning frequency. According to an embodiment of the present invention, a drive frequency is set near proper resonance frequency of an oscillating unit including an oscillating mirror and torsion bars, and just beyond the resonance frequency. For example, the scanning frequency is set to 2.5 kHz for a resonance frequency of 2 kHz. The maximum swing angle is adjusted ±5° by gain of applied voltage. In this case, on account of fluctuation of resonance frequency caused by imperfection in the oscillating mirror and temperature, it is desirable to gradually adjust the frequency to compensate for these fluctuations. For example, if fluctuations due to production error are 300 Hz and fluctuations due to temperature are 3 Hz, it is desirable to adjust the frequency to over 2.303 Hz.

The inertia moment I, the spring constant K and the resonance frequency f are expressed as:

$$I = (4ab\rho d/3) \cdot a^2,$$
$$K = (G/2L) \cdot (cd(c^2 + d^2)/12), \text{ and}$$
$$f = (1/2\pi) \cdot (K/I)^{1/2} = (1/2\pi) \cdot (Gcd(c^2 + d^2)/24LI)^{1/2}$$

where the dimensions of oscillating mirror are 2a×2b×d, the length and width of torsion bar are L and c, and the density and material constant of silicon are ρ and G. Here, the swing angle θ is proportional to the length of torsion bar L and expressed as $$\theta = A/If^2$$

where A is a constant. Therefore, the swing angle θ is inversely proportional to the inertia moment I. It is necessary to reduce the inertia moment for increasing the resonance frequency f, or the swing angle θ is reduced. Consequently, according to an embodiment of the present invention, the oscillating mirror 1202 is relieved for reducing inertia moment to 1/5 by etching the opposite side of reflection surface 219 to whose thickness is under d/10 except for ribs. These parameters effecting to inertia moment and dimension error of a torsion bar 1208 can be factors to generate fluctuation of resonance frequency.

Conversely, electrostatic force between electrodes is described as $$F = \in HV^2/2\delta$$

where $\in$, H, V, δ are the air permittivity, the electrode length, the applied voltage and the distance between electrodes, respectively. The swing angle θ is also expressed as $$\theta = B \cdot F/I$$

where B is a constant. The greater the electrode length H, the larger the swing angle θ. And the comb-like electrode receives 2n times driving torque for the number of comb teeth n.

The air viscosity resistance is expressed as $$P = C \cdot \eta v^2 \cdot E^3$$

where v, E, η, C are the oscillating mirror velocity, the area, the air density and a constant, respectively. The viscosity resistance η is applied opposite the rotation direction of the oscillating mirror 1202. Therefore, it is desirable to dispose the oscillating mirror 1202 in an airtight vacuum case. According to an embodiment of the present invention, as shown in FIGS. 26A-26D, the oscillating mirror substrate including the first substrate 1206 and the second substrates 1207 is joined to ceramic plate 1213, which has a holed in a center area, and is attached on CAN package base 1241, which is set its reflection surface up and its rotation axis corresponding to a line connecting a pair of V trenches 1233 formed on outer edges of the base.

According to an embodiment of the present invention, a scanning line is recorded on a photosensitive drum slantingly so that the end of scanning line delays a little bit in a rotating direction of the photosensitive drum. In other words, matrix angle of each image area is slanted in setting image data for preventing shift of scanning pitch.

A lead terminal 1216 is formed and penetrates the base 1241. Electrode pads are formed on upper surface of the second substrate 1207 by etching insulating layer at islands 1224, 1225 and filling metallic paste into a gap. The electrode pads and tops of the lead terminals 1216 are connected by wire bonding. A bump 1243 of the CAN package base is covered by a cap 1242. The bump 1243 and the cap 1242 are connected via sealing material in vacuum condition for air pressure in the cap less than 1 torr. A non-evaporation type getter can be packaged in a cap and activated by heat from outside after sealing. Light beam are transmitted via a transparent window 1245 joined on inner surface at upper aperture of the cap 1242.

According to an embodiment of the present invention, facing mirrors 1215 are integrated on upper surface of the second substrate 1207 and face the oscillating mirror 1202 in a direction perpendicular to the torsion bars 1208. The facing mirrors 1215 are preferably made by depositing metal on plastic. The facing mirrors 1215 are aligned on a pair of surfaces sandwiching a slit and slanted 9° and 26.3° to surfaces of the substrates, respectively, such that an angle of 144.7° is between the pair of facing mirrors 1215. Bottom surfaces of the facing mirrors 1215 are formed in a direction parallel to the oscillating mirror 1202 and joined on a frame portion of the second substrate 1207. The second substrate 1207 has positioning holes 1217 on both sides made by etching. Positioning pins 1240 projected from lower surface of the facing mirror are inserted into the positioning holes 1217 for precisely aligning the facing mirror in a direction perpendicular to the rotation axis.

Figure 34A:
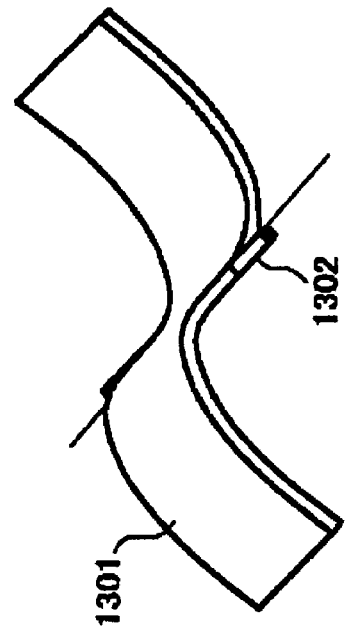
FIG. 34A is an explanatory view showing bending stresses in a conventional oscillating mirror of a conventional oscillating mirror module.
Figure 34B:
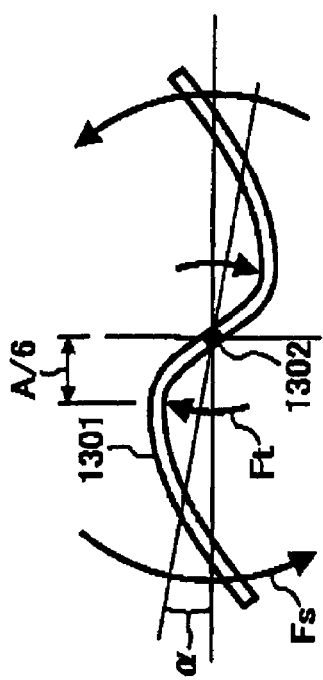
FIG. 34B is an isometric view of the oscillating mirror of FIG. 9A.

Previously, in these oscillating mirror modules, torsion bars are formed so that the torsion bars 1302 are along rotation axis of the oscillating mirror 1301 and connected to points on rotation axis directly, as shown in FIGS. 34A-34C, magnified its wave shape from its exact shape. As described above, inertial forces Fs of the oscillating mirror 1301 vary depending on a distance from the rotation axis and is exerted in a direction opposite that of the torsion bars 1302, in other words, torsion force Ft affecting a portion of the mirror around the rotation axis. Therefore, a distribution of bending stresses is generated, which has a peak at an intermediate point between the rotation axis of the oscillating mirror and the edge of the oscillating mirror, such that the oscillating mirror has a shape of a sine wave. For example, in an oscillating mirror having width A, a point about A/6 from its rotation axis has maximum displacement. A surface accuracy is about 0.5 μm in PV.

Figure 28C:
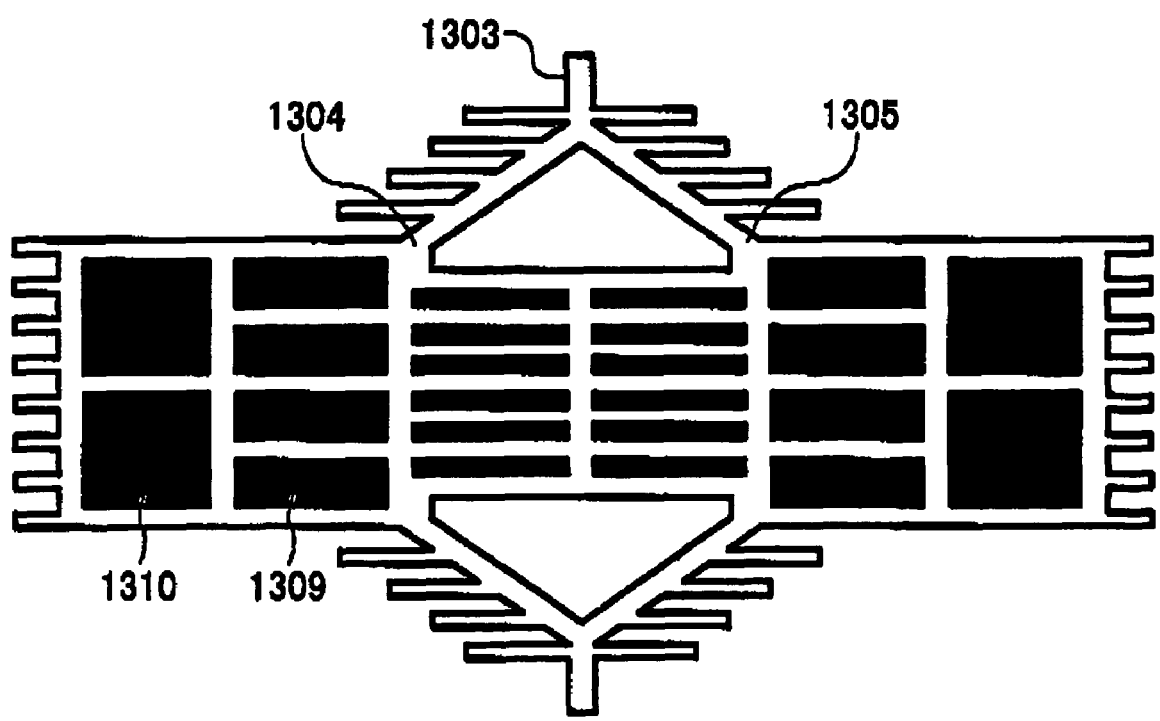
FIG. 28C is a top view of another embodiment of an oscillating mirror of the oscillating mirror module of FIG. 26A.

Conversely, according to an embodiment of the present invention, shown as FIG. 28C, a torsion bar 1303 is formed as a "Y" shape and is joined to an oscillating mirror 1301 at both ends 1304, 1305 of the branches 1307. The branches and a trunk of the torsion bar have the same width. A joint point near the edge of the oscillating mirror 1306 makes the torsion force Ft out of the torsion bar 1303 disperse, makes the bending stress on the mirror reduce and make flatness better. The shape of torsion bar can be a step-like shape, as shown in FIGS. 28A and 28B, or more simply a "Y" shape, as shown in FIG. 28C.

Figure 35:
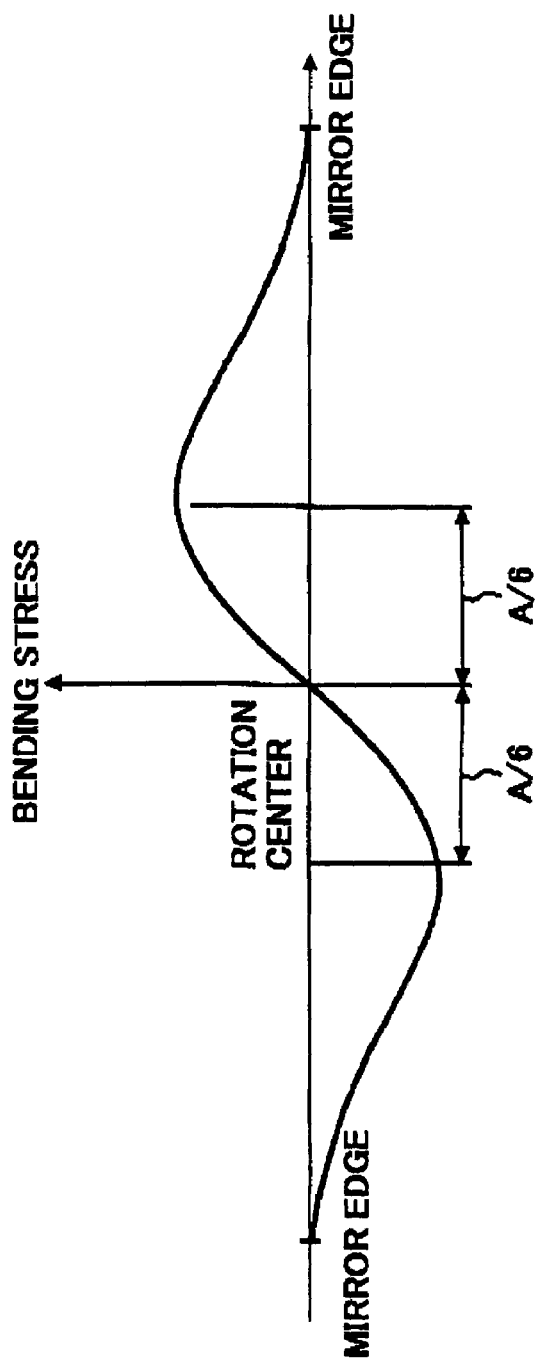
FIG. 35 is a graph showing distributions of bending stresses of the oscillating mirror of FIG. 34A.

FIG. 35 shows a distribution of bending stress in an oscillating mirror. Relieved areas 1310 of an oscillating mirror preferably have small areas at large bending stress areas and large areas at small bending stress areas to resist bending stresses and provide a balance between the rigidity and the inertia force F2. FIG. 28C shows an example of oscillating mirror having such structure. The number of ribs 1309 formed on the opposite side of reflection surface in a direction perpendicular to the rotation axis varies from center to edge of the oscillating mirror 1202. The number of the ribs 1309 in an area away about one sixth of the mirror width from the rotation axis is larger than in neighborhood of the rotation axis and peripheral area of the oscillating mirror, because of lower bending stresses in these areas. Such relieved structure can have pits or relieved portions having a same area, different depths, and/or other arrangements.

Figure 36:
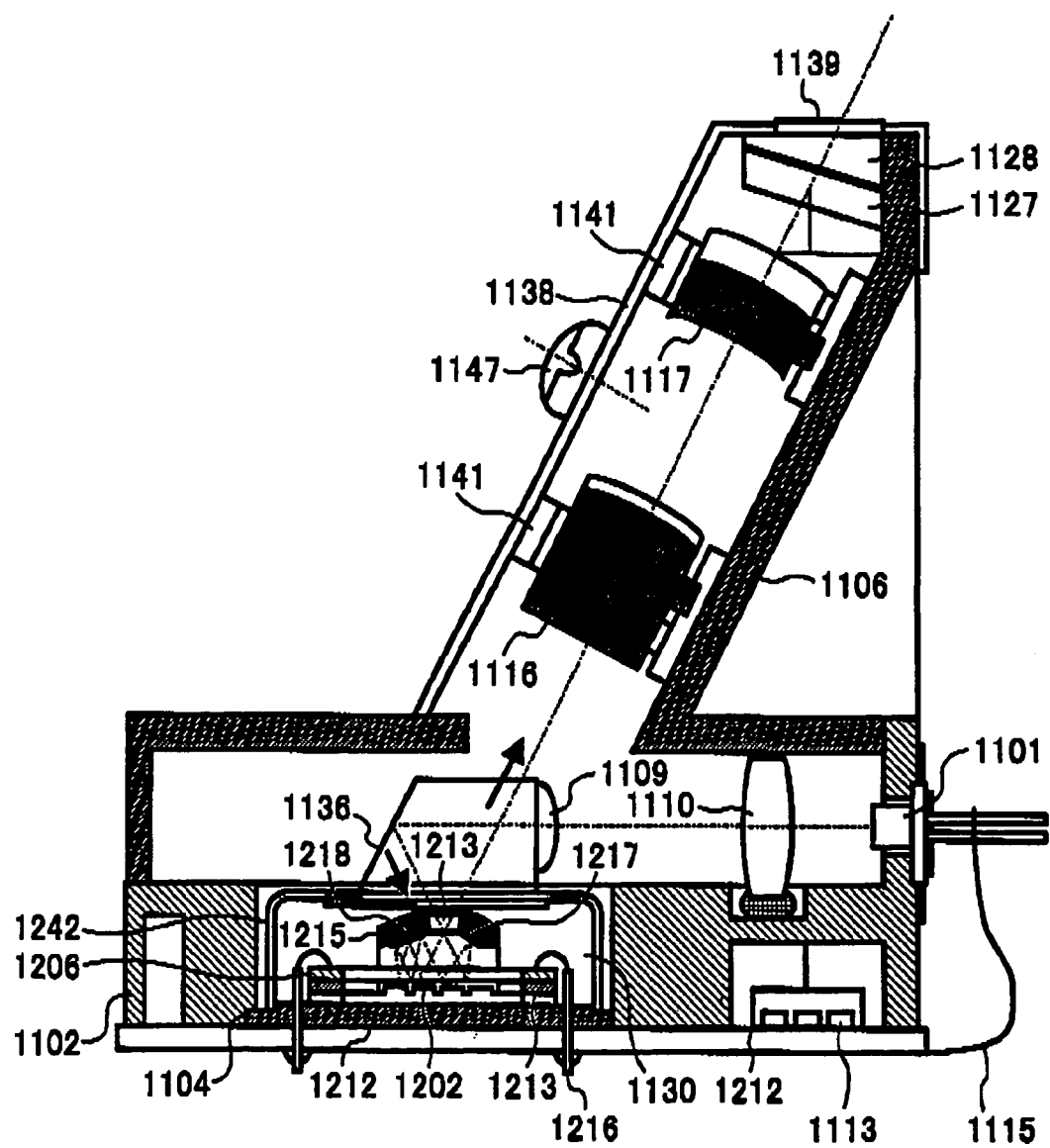
FIG. 36 is a cross sectional view in a secondary scanning direction of an optical scanning device using the oscillating mirror module of FIG. 26A.

FIG. 36 shows a cross sectional view in a secondary scanning direction of optical scanning device. Light beam emitted by a semiconductor laser device 1101 are received in an oscillating mirror module 1130 via a coupling lens, a prism 1136 and the transparent window 1245 in the upper portion of the cap 1242, as described in detail below. The light beam incident on the oscillating mirror 1202 at a given angle (at 20°, for example) through the slit of facing mirror 1215 is reflected from a first reflection surface 1217 of the facing mirror 1215 to be reflected again from the second reflection surface 202 of the facing mirror 1215 over the slit. The light beam is reflected a plurality of times (three times, for example) between the oscillating mirror 1202 and the facing mirror 1215 with its reflection point moving in a secondary or sub scanning direction. Thereafter, the light beam is emitted through the slit.

Thus, by repeating reflection a plurality of times, a greater scanning angle can be obtained with a smaller swing angle of the oscillating mirror 1202. A scanning angle θ is given by $$\theta = 2N\alpha$$

where N is the number of reflections on the oscillating mirror 100 and α is a swing angle. According to an embodiment of the present invention, the number of reflections N is five and a is five degrees, respectively. Therefore, maximum scanning angle is 50°. The optical scanning device in this embodiment uses 35° in the maximum scanning angle for recording image. By using resonance, the oscillating mirror 1202 is permitted to oscillate with a minute applied voltage and reduced heat generation. However, as the recording rate becomes higher, the stiffness of the torsion bars 1108 increases, so that the swing angle a is prevented from being obtained. Therefore, the scanning angle is enlarged by providing the facing mirrors 1215 so that a necessary and sufficient scanning angle may be obtained irrespective of the recording rate. Aligning the reflection surfaces 1217, 1218 of the facing mirror in opposite tilt angles changes incidence angles of light beam in a secondary scanning direction to plus and minus at each incidence, in other words, sorts direction of light beam between right and left angle. It minimizes curving scan line out of slanted incidence on scanned surface, brings a rotation position of beam in a plane perpendicular to the beam axis back at an emitting point and prevents degradation of focusing ability.

Figure 37:
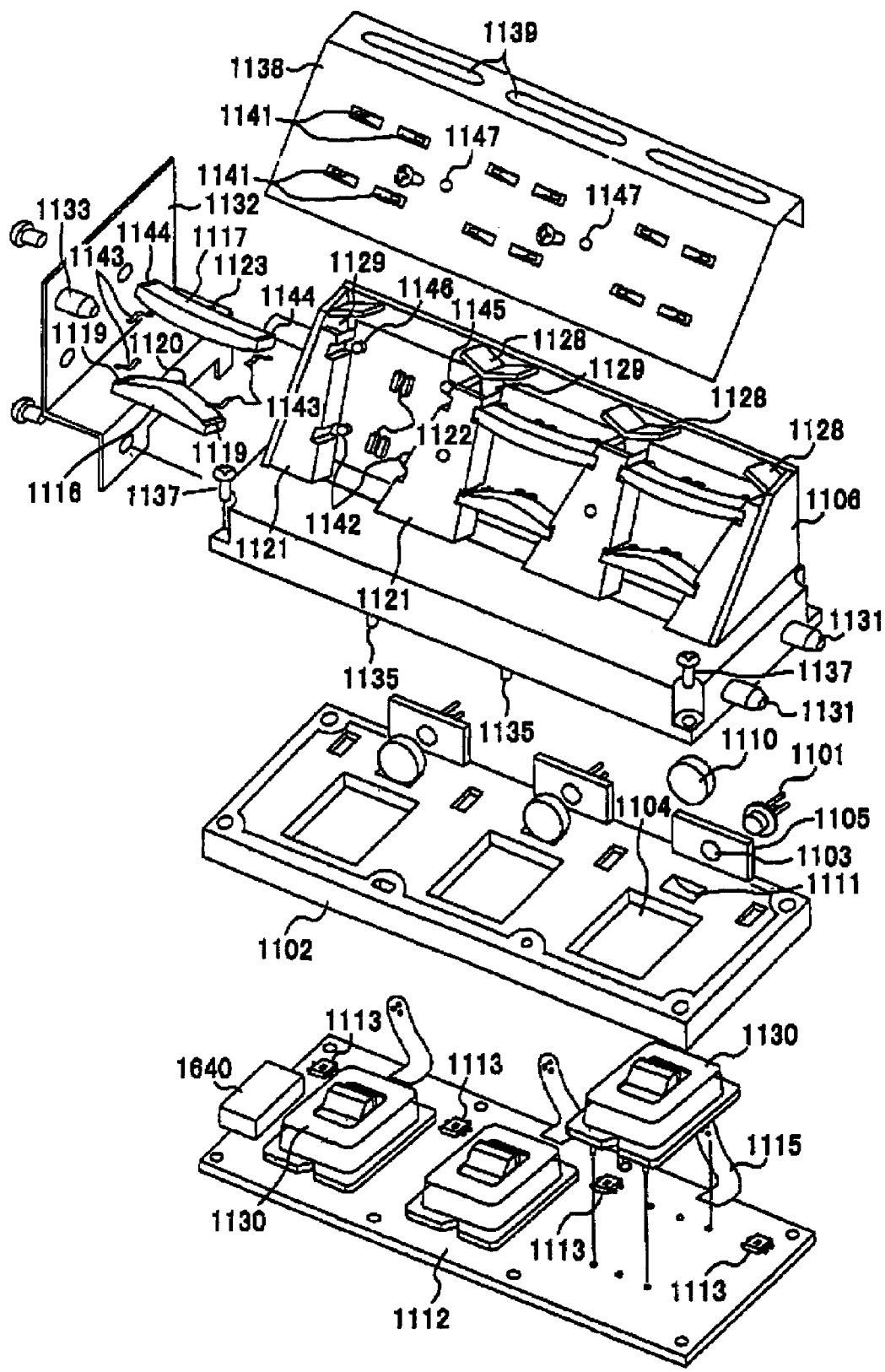
FIG. 37 is an isometric view of the optical scanning device of FIG. 36.
Figure 38:
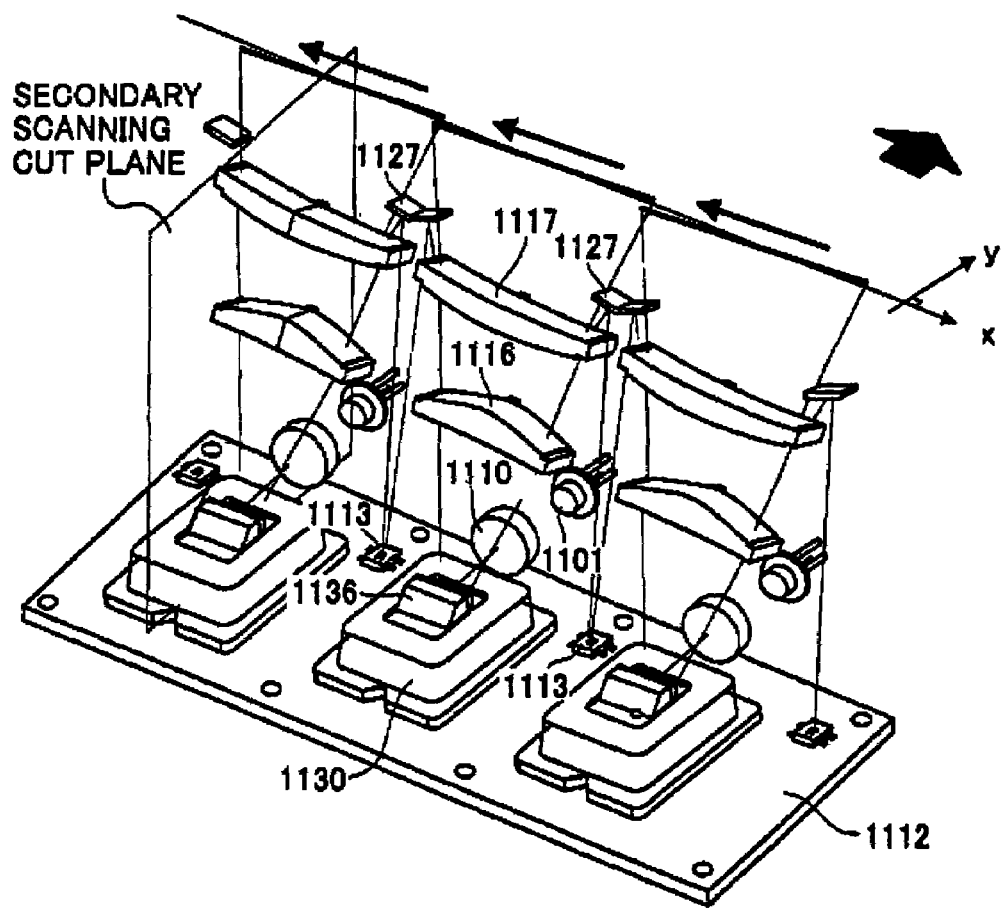
FIG. 38 is an isometric view of alignment of optical devices of the optical scanning device of FIG. 37.

FIG. 37 shows an isometric view of an optical scanning device according to an embodiment of the present invention. FIG. 38 shows alignment of optical devices in the optical scanning device shown in FIG. 37. The semiconductor laser device 1101, as a light source, includes two light sources disposed at a pitch of 50 μm in a secondary scanning direction as monolithic. The semiconductor laser device 1101 engages in a stepped through hole 1103 in a wall 1105 standing on a frame portion 1102. A fringe of the device 101 contacts on a step of the hole 1103 for positioning and is pressed by retainer plate 1107 for fixing, as shown detail in FIG. 39.

Figure 39:
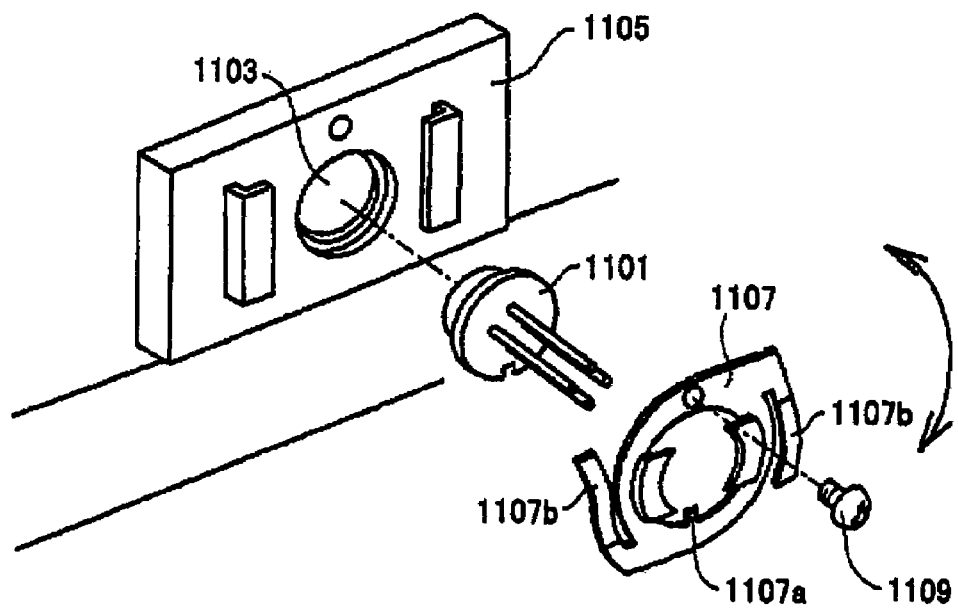
FIG. 39 is an isometric view of alignment relative to the semiconductor laser device of the optical scanning device of FIG. 37.

FIG. 39 shows alignment around the semiconductor laser device 1101. The retainer plate 1107 has a projection 1107a engaging to a cutout of the fringe of the semiconductor laser device 1101 for setting a relative rotate position between the retainer plate 1107 and the semiconductor laser device 1101. The retainer plate is rotated to engage a pair of blade spring, formed by cutting peripheral portions of the retainer plate 1107b, to peaked projections 1105b and fixes the semiconductor laser device 1101 with screw 1109. An alignment direction of light source is adjusted to slant a certain degree from primary scanning direction. The coupling lens 1110 is set on a "U"-like dents 1111 so that its axis corresponds with a light axis of the semiconductor laser 1101 and emitted beams are in a parallel direction to one another. The coupling lens 1110 is fixed by UV-adhesive.

Incidentally, alignment of the coupling lens 1110 can also be adjusted after setting the oscillating mirror module 1130 and cylinder lens, which will be described below. Adjusting the coupling lens 1110 moderates dimension error of the oscillating mirror 1202 and position error of focusing line of the cylinder lens. All three light sources in this embodiment have the same structure.

As shown in FIG. 36, two parallel beams, emitted by the semiconductor laser device 1101 and passing through the coupling lenses 1110, incident into the prism 1136, engaged on the window of the oscillating mirror module 1130 and attached the cylinder lens 1109 having positive curvature in a secondary scanning direction on a incident surface, and are reflected downward at an angle on a slanted surface, and incident into the oscillating mirror module 1130 so that the beams are focused on a surface of the oscillating mirror 1202 in a secondary scanning direction. Then, as describe above, the beams incidents through the slit of facing mirror 1215, are reflected a number of time between the oscillating mirror 1202 and the facing mirror 1215 and are emitted through the slit.

Figure 40:
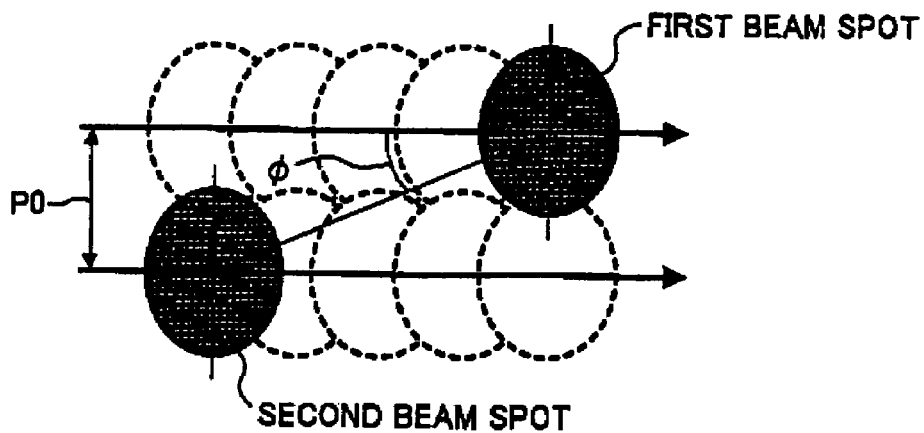
FIG. 40 is a graph showing beam spots, emitted from the optical scanning device of FIG. 37, on a scanned surface.

FIG. 40 shows alignment of beam spots on scanned surface. As described above, attaching the semiconductor laser devices 1101 in an inclined direction sets the beam spot pitch P. The beam spot P is expressed as $$P = \beta \cdot p \cdot \sin \phi$$

where β is secondary scanning magnification in whole system from a light source to scanned surface including first scanning lenses 1116 and second scanning lenses 1117, those will be described below, and p is a pitch between two light sources. The pitch P is adjusted according to a tilt compensation amount of a line formed on a transfer belt.

The oscillating mirror module 1130 is set into a stepped square hole 1104 in the frame 1102 along outer edge of the base 1241 for direction of the torsion bar corresponding with the light axis. A fringe of the oscillating mirror module 1130 contacts on a step of the hole 1104 for positioning a surface of the oscillating mirror 1202. Three oscillating mirror modules 1130 according to the above-described configuration are arranged in the primary scanning direction on a printed circuit board 1112 on which electronic components forming the driving circuits of the semiconductor laser devices 1101 and the oscillating mirrors 1202 of the oscillating mirror modules 130 are mounted. In mounting the oscillating mirror modules 1130 on the printed board 112, the frame 1102 has its bottom surface contacting the printed board 1112 with cables 1115 protruding downward from its bottom surface being inserted into corresponding through holes formed in the printed board 1112. Then, the oscillating mirror modules 1130 are positioned on the printed board 1112 with respect to one another within the clearances of the through holes, and are temporarily fixed to the printed board 1112. Thereafter, like the other electronic components, the oscillating mirror modules 1130 are soldered and fixed to the printed board 1112 at one time. The cables 1115 connected its one end to the printed board 1115 is connected to lead terminals of the semiconductor laser devices 1101.

The printed board 1112 supporting the oscillating mirror modules 1130 contacts a housing 1106 so as to close a lower opening thereof, and is held between pairs of projections 1135 formed integrally with the housing 1202. The printed board 1201 has indentations that engage the widths of the projections 1135 so that the printed board 1201 is positioned in the primary scanning direction. Further, screws fix four angles of the oscillating mirror module 1130 to the printed board through holes in the frame 1102 so that the oscillating mirror module 1102 and the printed board 1112 sandwich the frame 1102.

The housing 1106 holds first scanning lenses 1116 and second scanning lenses 1117 which are arranged and fixed in the primary scanning direction as that each scanning areas to slightly overlap one another.

The first scanning lenses 1161 have positioning projections 1120 formed on the center portion of their secondary scanning direction reference plane. The positioning projections 1120 engage concave portions 122 formed on the housing. The first scanning lenses have also pushed planes 1119 formed on their both edges of both optical surfaces. The pushed planes 1119 engage grooves 1121 formed on the housing 1106 and are pushed in an incoming surface direction by wavy blade springs 1143 to maintain positions of the first scanning lenses 1116 in a same plane perpendicular to light axis. The first scanning lenses 1116 contact pairs of projections 1142 on the housing 1106 and are supported by the plate spring 1141 formed on a cover 1138.

Conversely, the second scanning lenses also have positioning projections 1123 formed on the center portion of their secondary scanning direction reference plane. The positioning projections 1123 engage concave portions 1122 formed on the housing. The second scanning lenses also have pushed planes 1144 formed on both edges of both optical surfaces. The pushed planes 1144 engage grooves 1121 formed on the housing 1106 and are pushed in an incoming surface direction by wavy blade springs 1143 to maintain positions of the second scanning lenses 1117 in a same plane perpendicular to light axis. The second scanning lenses 1117 contact pairs of projections 1142 on the housing 1106 and are supported by the plate spring 1141 formed on the cover 1138. Screws 1147 fix the cover 1138 to the housing 1106.

PIN (p-intrinsic-n) photo diodes are used as a first through a fourth synchronization detection sensors 1113a-d. The second synchronization detector 1113b and third synchronization detection sensor 1113c are mounted in positions between the oscillating mirror modules 1130a and 1130b, and 1130b and 1130c on the printed board 1112 so as to be shared by the oscillating mirror modules 1130a and 1130b, and 130b and 130c, respectively. Mirror accepters 1128 having "V" like shapes are formed on the housing 1106 at a emitting surface side of the second scanning lenses 1117 for attaching high reflective aluminum films 1127 on them. The mirror accepters are assigned to lead light beams, reflected on the high reflective aluminum film 1127 at start and end points in scanning area, to each synchronization detection sensor 1113 through openings between scanning areas and through square hole in the frame 1102. The cover 1138 has plural holes for light beams going through.

Figure 41:
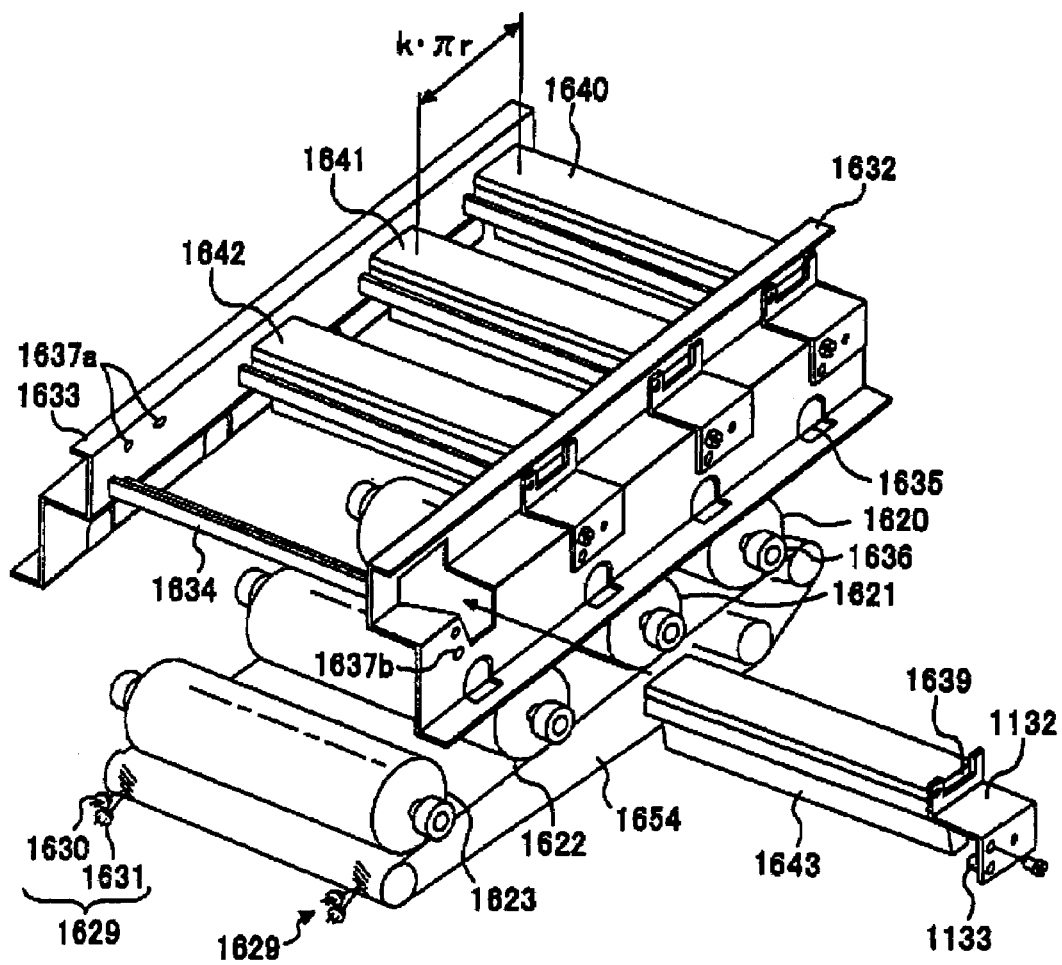
FIG. 41 is an isometric view of alignment of photosensitive drums in an image forming apparatus that includes the optical scanning devices of FIG. 37.

FIG. 41 shows alignment of photosensitive drums. The frame 1102 and the housing 1106 are made from glass fiber reinforced plastic, aluminum die cast, or the like. As shown in FIG. 37, on one surface of the housing 1106, a pair of positioning pins 1131 are formed. And on another surface of the housing 1106, a bent plate 1132 is joined by screws. In FIG. 41, side panels 1632, 1633 are made of sheet metal and are aligned against to a primary scanning direction. Each side panels 1632, 1633 has grooves 1635 joining with bearings of photosensitive drums 1620-1623 for supporting and aligning photosensitive drums 1620-1623. The optical scanning devices 1640 1643 are slotted along guide panels 1634 from the side panel 1632 as upside-down and right side-left position in FIG. 37. The optical scanning devices 1640-1643 engage its positioning pins 1131 into positioning holes 1637a on the side plate 1633 and positioning pins 1133 formed on the bent plate 1132 into positioning holes 1637b on the another side plate 1632. Screws fix the optical scanning device 1640-1643 to the side panels 1632, 1633. In such a case, if the positioning hole 1637b is a long hole, an angle between a long direction of the housing 1106 and an axis of the photosensitive body can be adjusted, and a tilt angle of a scanning line can be adjusted. Cables are connected to connectors 1650 on the printed circuit board 1112 through grooves 1639 on the bent plate 1132 after inserting the optical scanning device 640-643.

FIG. 42 shows adjustment of joints between line images out of adjacent two optical scanning devices. According to an embodiment of the present invention, each difference at record start position is adjusted to zero. For example, a difference of recording position D between two adjacent optical scanning devices is explained below. The goal of adjustment is to set D to be equal zero. At first, a record start timing of scanning line is adjusted by line pitch p. The timing is shifted by k times a period of scanning T with a predetermined synchronization detection signal in reading image data, where k is a natural number chosen so that L−k·p has the nearest value to zero. Next, the difference is adjusted by p/n in each T/n, where n is a natural number chosen so that L−(k+1/n)·p has the nearest value to zero. These procedures make two line image, recorded at adjacent areas on a transfer belt 1638, align with one another.

FIGS. 43A and 43B shows intensity distribution of each beam spot in a secondary scanning direction, voltage distribution of electrostatic latent image formed by each beam, and a plane and a cross sectional view corresponding to one pixel dot, where a left circle shows a beam from the first light source and a right circle show a beam from the second light source. A horizontal direction is corresponding to a secondary scanning direction in FIG. 43A-B. Beam spots close to one another form a voltage distribution having one peak. If each spot has a same intensity, the voltage distribution has a center at mean of two beam spots as shown in FIG. 43A. A difference of two beams spots intensity makes the center shift to a beam spots having higher intensity as shown in FIG. 43B. A portion on the photosensitive drum 1620-1623 having higher voltage than exposure bias voltage attracts charged toner, and the toner attaches on the photosensitive drum 1620-1623 and forms a dot. Balancing each beam intensity makes a dot have a same diameter d0 at any center position. Therefore, a center of a latent image can be moved over each line intermediate by changing a ratio of each beam spot intensity. As a result, a line having a same width as well as a line scanned with tilt pitch p from scanning line is provided by one line. Thus, scanning line tilt can be adjusted without mechanical adjustment of the structure.

Figure 44:
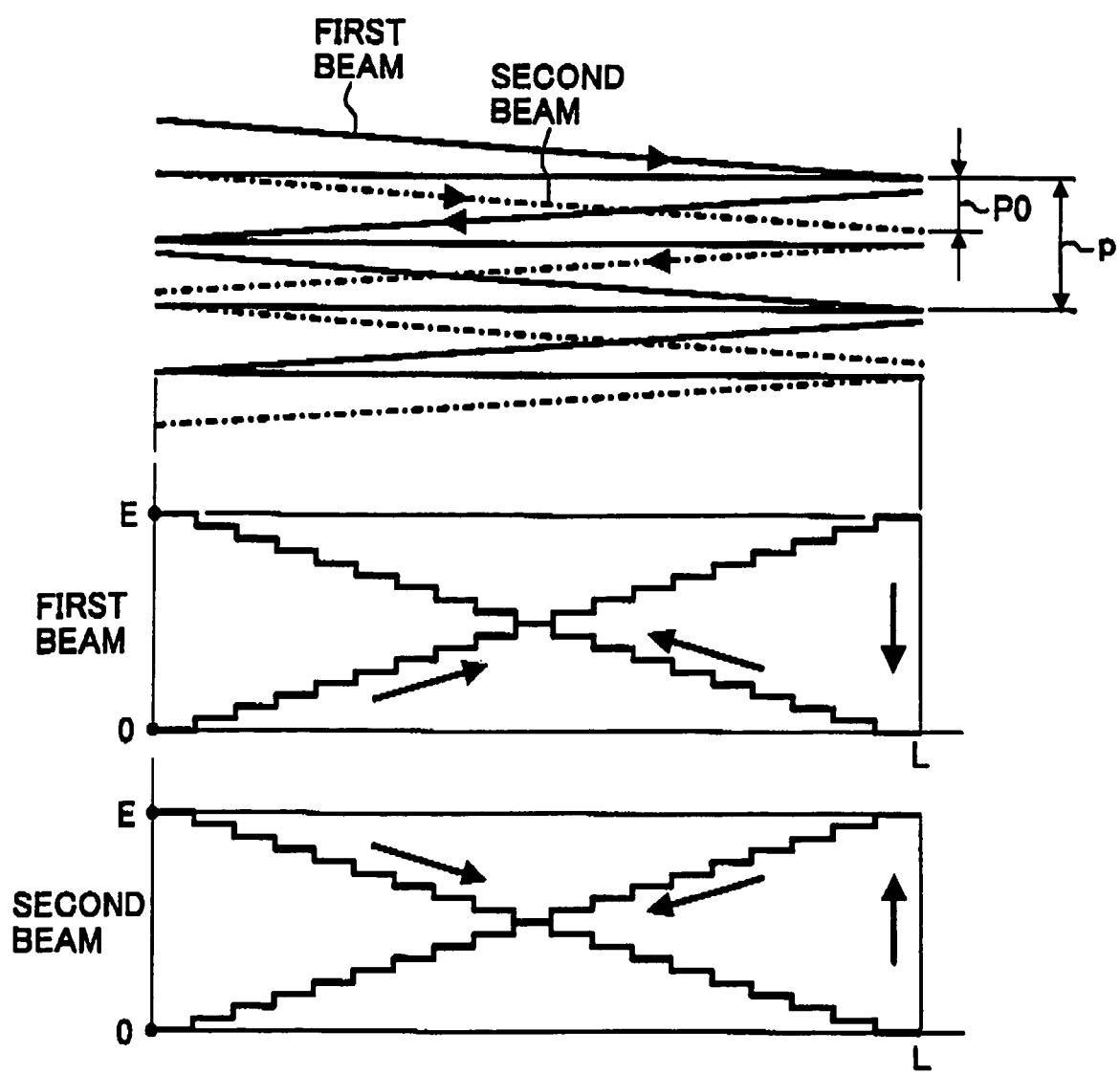
FIG. 44 is an explanatory view showing adjustment of recorded lines for scanning lines.

FIG. 44 shows an example of adjusting recorded lines for scanning lines. Line tilt adjustment mount $\Delta\theta$ is detected as a relative deviation from color criteria by resist shift detectors. The resist shift detector includes a light emitting diode 1630 and a PIN photo-diode 1631, disposed at each end of transfer belt 638. The PIN photo-diode 1631 receives light beam reflected on detection pattern, formed on the transfer belt 1638 by toner as shown in FIG. 41, the light beam emitted from the light emitting diode 1630. A first and a second beam pitch P are adjusted as below, on the basis of a detected result of the resist shift detector 1629, $$P = L \cdot \tan \Delta\theta$$

where $\Delta\theta$ is line tilt adjustment mount and L is scan width. At a start point of scanning, the light mount of the second beam is set to the maximum mount, and the light mount of the first beam is set to zero. At the end point of scanning, the light mount of the first beam is set to increase monotonically, and the light mount of the second beam is set to decrease monotonically. Sum of the light mount of both light beam is set to constant at each point in a scanning direction. Thus, the locus of the latent image center is formed right-side up relative to the scanning line when scanning from left to right, and left-side down when scanning from right to left. A next line is formed in a similar manner, and each line is aligned parallel and has a same tilt on the transfer belt.

Light intensity is described as beam intensity multiplied by an emitting period. Therefore, to form latent image as described above can be formed by varying beam intensity, and varying pulse width of beam.

According to an embodiment of the present invention, however, beam intensity is varied stepwise. Additionally, the resist shift detector 1629 can detect tilt shift between each color and resist shift (parallel shift). These shifts can be adjusted by adopting adjustment of line image joint in scanning device described above.

Figure 45:
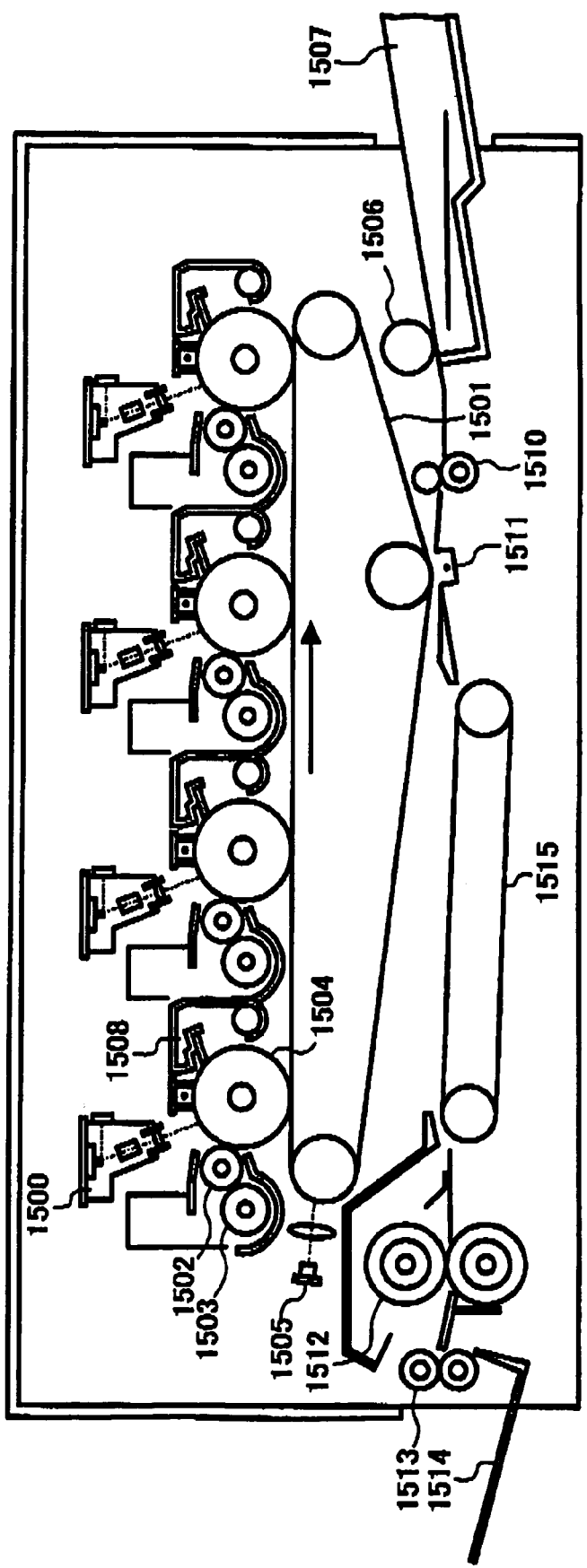
FIG. 45 is a cross sectional view of an image forming apparatus including the optical scanning devices of FIG. 37.

FIG. 45 shows a cross sectional view of an image forming apparatus including the optical scanning devices of the present invention. An optical scanning device, as an image holding body, 1500 according to the above-described configuration and a photosensitive drum 1504 are positioned for forming each color image of four colors, as yellow, magenta, cyan, and black. Each color image is formed serially with rotation of a transfer belt, as an intermediate transfer body, 1501, in a tandem image forming method, in the color laser printer. Each optical scanning device 1500, corresponding to the optical scanning devices 1640-1643 in FIG. 41 and having oscillating mirror module described above, emits light beams downwardly, as the optical scanning device in FIG. 37 is disposed upside-down. The transfer belt 1501, as transfer means, is supported by a driving roller and two driven roller. Each photosensitive drum 1504 is aligned at even intervals in a moving direction of the transfer belt 501. Provided around each photosensitive drum 1504 is a developing roller 1502 that forms a visible image by attaching charged toner to an electrostatic latent image recorded by the optical scanning device 500, a toner hopper 1503 storing the toner, and a cleaning case 1508 scraping and storing residual toner on the photosensitive drum 1504 after the toner image is transferred to the transfer belt 1501. Each color image is formed on the transfer belt 1501 as latent image by each optical scanning device 1500. A start timing of forming each image is triggered and shifted in a secondary scanning direction by a signal generated by a sensor 1505, corresponding to the registration shift detector 1629 in FIG. 41, detecting a resist mark formed on the edge of the transfer belt 1501. A visible image is formed by attaching charged toner to an electrostatic latent image in developing unit and successively superimposing the images on top of each other. A paper sheet is supplied from a paper-feeding tray 1507 by a paper-feeding roller 1506, and fed in timing with fourth image forming by a registration roller 1510. Four color toner images formed on the transfer belt 1501 is transferred to the paper simultaneously in the transfer unit 1511. The paper having toner images is conveyed to a fixing unit by a conveyer belt 1515 and fixed the toner images by the fixing roller 1512. Then, the paper sheet is ejected onto a paper ejection tray.

Each optical scanning device 1500 forms one line by connecting the scanning lines of each optical scanning modules, and performs printing by dividing all dots whose total number is L into three groups of dots 1 through L1, dots L1+1 through L2, and dots L2+1 through L and allocating the three groups of the dots to an image from its starting end. According to an embodiment of the present invention, the number of allocated dots (For example, L1) to each group is different in each color so that the joints of the scanning lines of one color are prevented from being aligned with the joints of the scanning of another color in the same one line.

Image data is divided by three in a primary scanning direction as described above, stored into a bitmap memory in a recording control unit on each optical scanning device, raster-expanded on each oscillating mirror module, and stored into a buffer as line data. Stored line data is triggered to be read by each synchronization detection signal and recorded individually. Registrations at start recording are adjusted by setting each timing as described below.

As described above, according to an embodiment of the present invention, varying applied voltage gains results in oscillation angles of the oscillating mirrors being within in predetermined band, as well as driving of the mirrors at a common frequency even if resonance frequencies of the oscillating mirrors are different. Environmental temperature varies spring constants of torsion bar and shift resonance bands equally. In a situation that driving frequencies are adjusted to accommodate a frequency shift, applying a common driving frequency and making scanning frequencies of the oscillating mirror modules be same bring registration of each line in a whole area.

Figure 46:
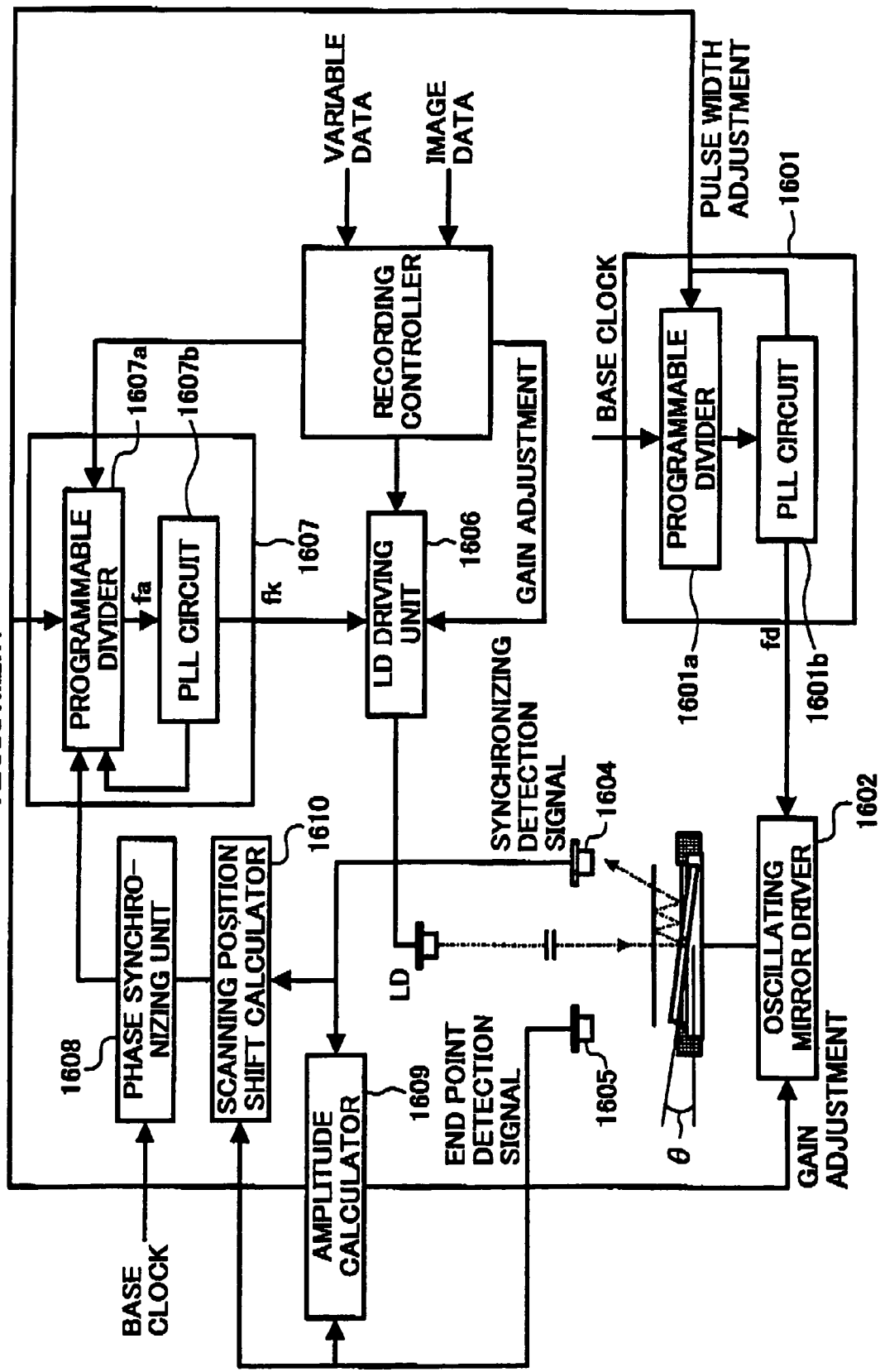
FIG. 46 is a block view of a control system driving the semiconductor laser device and the oscillating mirror of FIGS. 26A-26D and FIG. 38.
Figure 47:
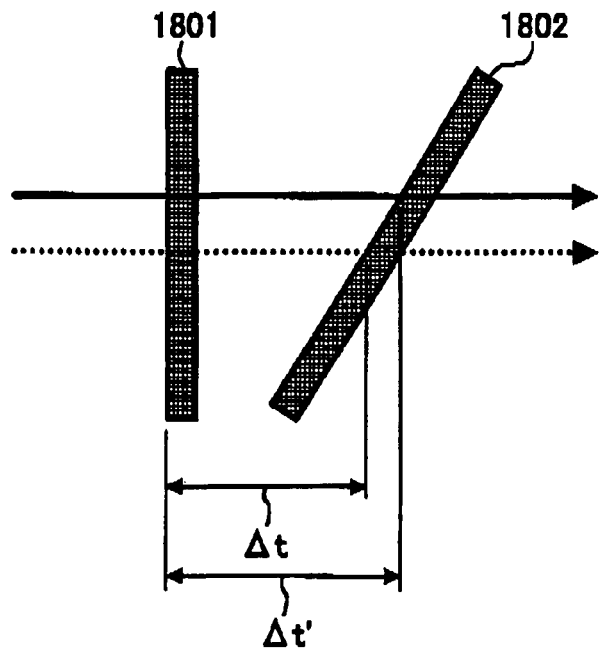
FIG. 47 is a side view of a synchronization detection sensor and an end point detection sensor of FIG. 46.

FIG. 46 shows a block view of a control system driving semiconductor laser device and oscillating mirror. A programmable divider 1601a in a driving pulse generator 1601 divides base clock in and generates pulse train so that voltage pulses are applied at timings harmonizing amplitudes of the oscillating mirrors. A PLL (phase-locked loop) circuit 1602 applies the pulses to oscillating mirror module driving units 1602 so that the oscillating mirror modules have a predetermined phase delay δ between the oscillating mirror modules. Then the voltage pulses are applied to the electrodes of the oscillating mirror modules. If the phase delay δ is adjusted so that $$\delta=(1/fd)\cdot((\Delta y/p)-n)$$

where p is a scanning line pitch, Δy is a registration shift and n is a natural number satisfying (Δy/p)−n<1, displacement at joint is the scanning line pitch multiplied by an integer. In this condition, registration shift Δy is eliminated by shifting a timing to start recording by n cycles of the oscillating mirror, in other words, n scanning lines, and a high quality image having no displacement at a joint is formed.

According to an embodiment of the present invention, synchronization detection sensor 1604 and end point detection sensor 1605 are set on a print circuit board. However, detection surfaces are set to have a same light path with a scanned surface. FIG. 23 shows an embodiment of a detail structure of the synchronization detection sensor 1604 and the end point detection sensor 1605. These detection sensors have a first photo-diode 1801 set perpendicular to a scanning direction and a second photo-diode 1802 set not perpendicular to the scanning direction. The detection sensors detect synchronization detection signal or end point detection signal at light beam passing an edge of the first photo-diode 1801 and detect a scanning position shift in a secondary scanning direction corresponding to a scanning position shift on a photosensitive drum by measuring a time Δt that light beam goes from the first photo-diode 1801 to the second photo-diode 1802. The scanning position shift is prime factor of registration shift Δy. Therefore Δy expresses the scanning position shift is described as $$\Delta y=(v/\tan\gamma)\cdot\Delta t$$

where γ is a tilt angle of the second photo-diode and v is scanning velocity of light beam. If the time Δt is constant, there is no scanning position shift. A scanning position shift calculator 1610 monitors the time Δt and detects a scanning position shift. The result of detection can be used to adjust a phase difference between oscillating mirrors so that the time Δt corresponds a time basis Δt0.

A scanning velocity shift in a primary scanning direction can be corrected by adjusting and oscillation angle, amplitude, to a predetermined value with gain adjustment of voltage pulse applied to oscillating mirrors. A gap at joint position between adjacent image areas is eliminated by varying an image width scaling factor with shifting a pixel clock in response to a driving frequency of an oscillating mirror and corresponding a scanning end point to a scanning start point of adjacent optical scanning device.

Driving voltage may or may not be applied on an oscillating mirror except during an image recording period during a period in which image recording if prepared. Therefore, when power is on or waking up from standby, oscillating mirrors are excited by varying driving frequency fd from higher frequency with the programmable divider 1601*a* varying a dividing ratio. An amplitude calculator 1609 detects an oscillating angle, amplitude, θ0, out of a time difference between synchronization detection signal from the synchronization detection sensor 1604 and an end point detection signal from the end point detection sensor 1605 set near scanning angle −θ0. A detected scanning angle of light beam θd, detected by the sensors, scanning time from image center t and driving frequency of an oscillating mirror fd have a relationship as $$\theta d/\theta 0=\sin 2\pi\cdot fd\cdot t, \text{ and}$$

$$t=T/2.$$

The oscillating angle is adjusted by varying a gain of applying voltage pulse so that the time difference T reaches a predetermined value T0. This adjustment is executed periodically in each environment, such as an interval between jobs. Adjustment during recording image gives fluctuation to a primary scanning edge of image. Therefore the time difference T is kept as constant value during recording image. Additionally, a common driving frequency and a common gain basis are used to make oscillating mirrors have a same oscillating angle according to an embodiment of the present invention. Adjustment described above is preceded in each oscillating mirror module. According to an embodiment of the present invention, the image is formed after adjustment of all three optical scanning devices.

Control of driving a semiconductor laser device is explained below. As described above, to uniform line pitch of a latent image in scanning back and forth needs to vary a beam intensity or a beam pulse width.

Figure 48:
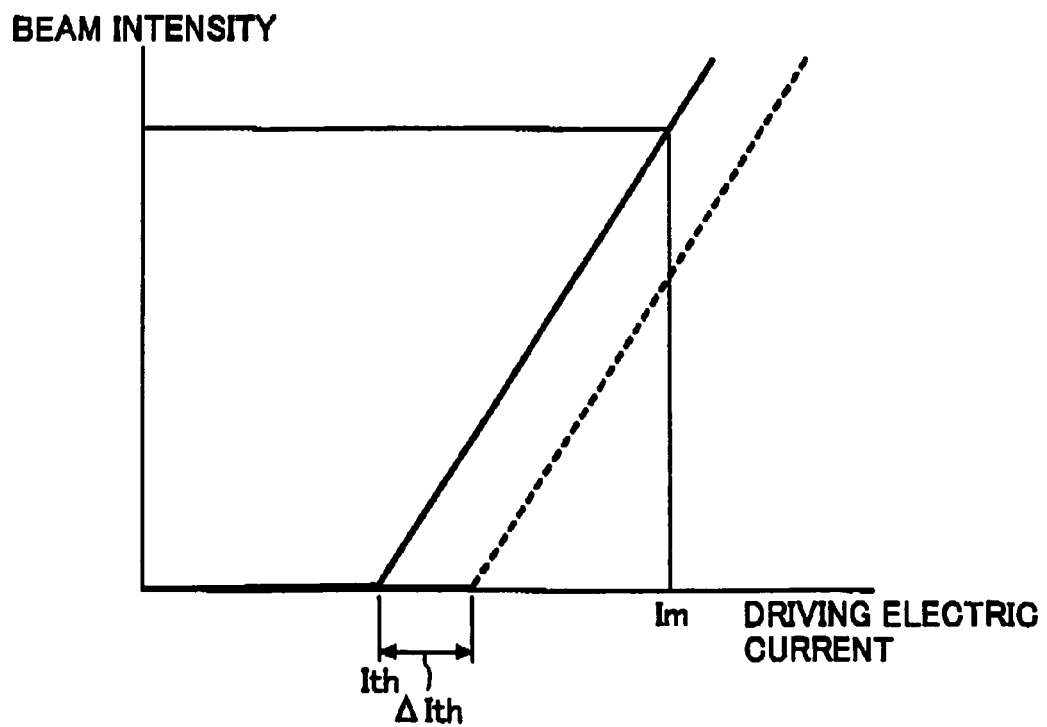
FIG. 48 is a graph showing beam intensities as a function of electric currents applied to a semiconductor laser device.

Variation of beam intensity is explained. FIG. 48 shows a beam intensity in response to an electric current applied to a semiconductor laser device. Beam intensity increases proportionally over a threshold electric current. Therefore, an electric current difference Im−Ith, where Ith is the electric current threshold and Im is a maximum electric current, is divided by n, for example 255, and driving electric current is varied stepwise based on varying data.

An LD (laser diode) driving unit 1606 is generally under feedback control adjusting driving electric current by a monitor signal from a semiconductor laser device for stabilizing a beam intensity. It is because varying temperature in a case varies Ith and Im. Unless such feedback control, an image density is different between in low temperature and in high temperature, because of varying beam intensity. Therefore, according to an embodiment of the present invention, to compensate for differences in image density, varying mount of a driving current Im', where a monitor signal has a predetermined output value, is added equally to driving electric currents as a threshold electric current bias ΔIth.

Variation of a beam pulse width is explained. A programmable divider 1607*a* in a clock pulse generator 1607 generates PLL base signal fa having k clocks length of pulse width by dividing a base clock f0 based on varying data and counting a divided clock. The PLL circuit 1607*b* generates a pixel clock fk by choosing a phase on the base clock f0. The longer the pulse width, the larger a diameter of the latent image. Therefore, varying a pulse width stepwise along a primary scanning direction can provide a latent image having any diameter based on varying data.

As described above, applied electric current to one light source is gradually reduced from a starting point in a primary scanning direction, where a latent image has a diameter corresponding to one pixel, to an end point, and applied electric current to another light source increases gradually from an starting point in a primary scanning direction to an end point, where a latent image has a diameter corresponding to one pixel. In this procedure, a synchronization detection signal is used as a trigger.

Resonance oscillation of an oscillating mirror vary scanning angle as a sine wave. Conversely, primary scanning dots should have a same pitch on a photosensitive drum. Thus, focusing property of scanning lens should be adjusted so that scanning distance in each scanning angle dH/dθ is proportional to arcsinθ/θ0, in other words, a change in the scanning angle is relatively slow an image center and accelerates toward the edges. Therefore, a scanning lens designed to have a predetermined focus point between the center and the edge is usually used. However, such design makes a diameter of beam spot increase and limits the available scanning area θs to a maximum amplitude θ0.

Figure 49:
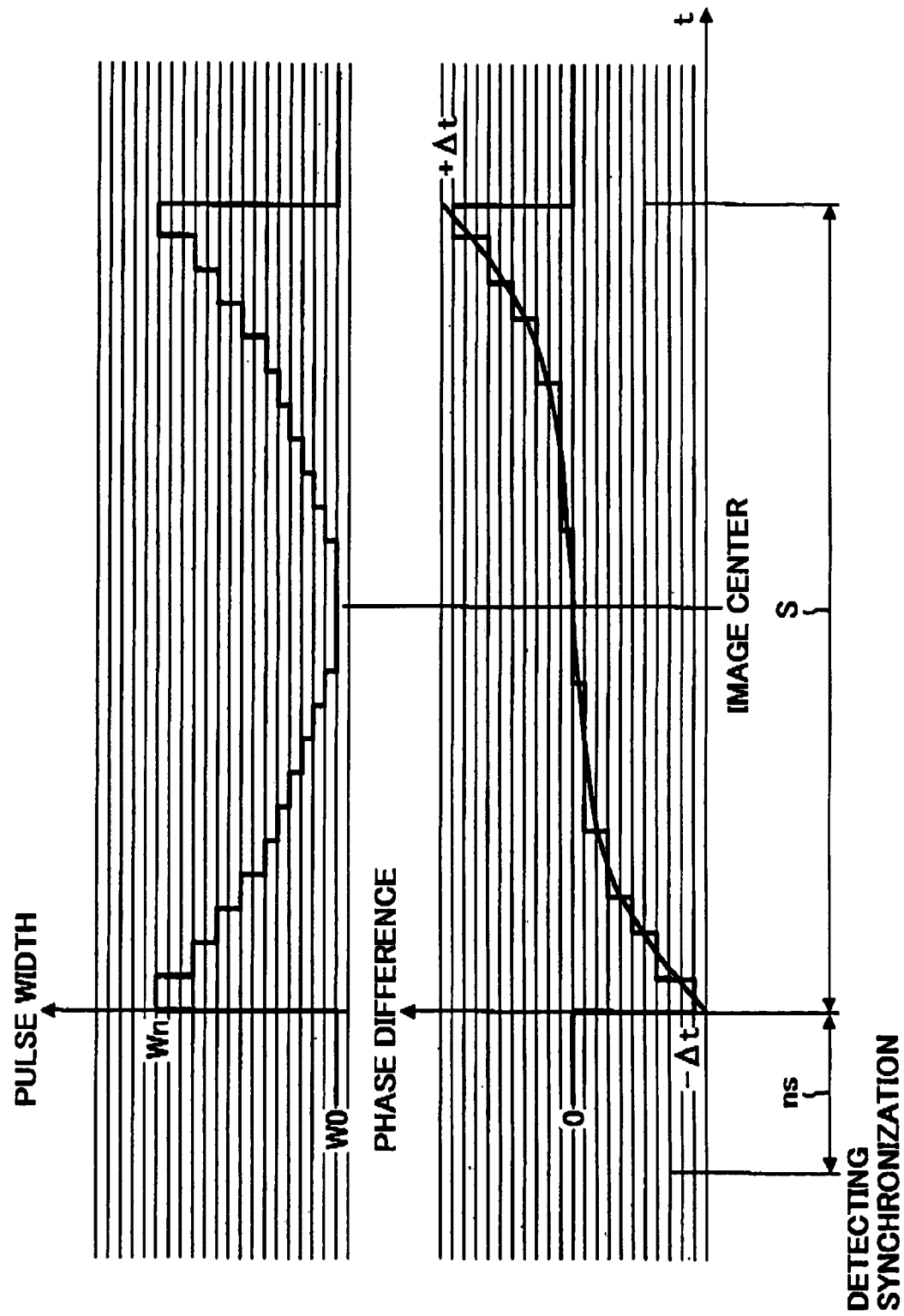
FIG. 49 is a graph showing phase differences corresponding to pixels delayed stepwise from start of scanning to end of scanning in response to varying scanning velocity out of oscillation.

To overcome these problem, according to an embodiment shown in FIG. 49, a phase difference corresponding to each pixel is delayed stepwise from start of scanning to end of scanning in response to varying scanning velocity out of oscillation. Concurrently, a pulse width of each pixel is shortened stepwise from start of scanning to center of scanning and elongated stepwise from center of scanning to end of scanning by adjustment of a pixel clock fin applied to LD driver 1606. Such electric adjustment reduces the load on the lens and enhances efficiency. Such adjustment can be executed easily without adding another controlling circuit because the adjustment sets a pulse width and a phase difference so that each pixel dot has a same diameter, and generates a pulse having a pulse width divided proportionally to correspond to the set pixel.

Additionally, in above embodiment, an optical scanning device uses a semiconductor laser array having two light sources. However, the semiconductor device can have a single light source, or can have more than two light sources.

An oscillating mirror described above can be disposed in an optical scanning device, and can be disposed in an optical scanning type display device and a laser radar mounted on a car. Additionally, an optical scanning device including the oscillating mirror can be used as a light recording device in an image forming apparatus, such as a digital copier, a printer, a plotter, and a telecopier. Such image forming apparatus can be small and needs little power.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with one another and/or substituted for one another within the scope of this disclosure and appended claims.

The present invention thus also includes a computer-based product which may be hosted on a storage medium and include instructions which can be used to program a microprocessor to perform a process in accordance with the present invention. This storage medium can include any type of media including floppy disks, optical disks, CD-ROMs, magneto-optical disks, ROMs, RAMs, EPROMs, EEPROMs, flash memory, magnetic or optical cards, or any type of media suitable for storing electronic instructions.

This patent specification is based on Japanese patent application no. 2004-010972 filed on Jan. 19, 2004, and no. 2004-166960 filed on Jun. 4, 2004, the entire contents of which are incorporated by reference herein.

What is claimed is:

1. A module configured to deflect light in an image forming apparatus, comprising:
 a mirror;
 a support supporting the mirror and defining a rotational axis of the mirror, wherein the support comprises a plurality of branch portions each joined to the mirror at points off-center from the rotational axis of the mirror; and
 a controller configured to apply electronic pulses to at least one driving device to oscillate the mirror in the module around the rotational axis at a scanning frequency different than a resonance frequency of the mirror,
 wherein a back surface of the mirror includes a first relieved area at a first bending stress location and with a second relieved area at a second bending stress location, wherein the first relieved area is smaller than the second relieved area, and a stress at the first bending stress location is greater than a stress at the second bending stress location.

2. The module according to claim 1, wherein the at least one driving device comprises first and second driving devices disposed at first and second angles relative to the rotational axis.

3. The module according to claim 1, wherein the at least one driving device comprises first and second driving devices disposed at different distances from the rotational axis.

4. The module according to claim 1, wherein the at least one driving device comprises first and second sets of fixed electrodes.

5. The module according to claim 4, wherein the first set of fixed electrodes comprises a pair of fixed electrodes.

6. The module according to claim 5, wherein the second set of fixed electrodes comprises a pair of fixed electrodes.

7. The module according to claim 4, wherein the controller is configured to adjust a gain of the electronic pulses applied to at least one of the first and second sets of fixed electrodes.

8. The module according to claim 1, wherein the controller is configured to adjust a phase of the electronic pulses applied to at least one of the first and second sets of fixed electrodes to adjust an amplitude of the mirror.

9. The module according to claim 8, wherein the controller is configured to adjust the phase of the electronic pulses so that at least one of the first and second sets of fixed electrodes generates a torque in a direction to torque the support.

10. The module according to claim 1, further comprising: a frequency controller configured to vary a frequency at which the mirror is oscillated from the resonance frequency to a higher frequency; and a frequency setting device configured to set the scanning frequency based on a result obtained from the frequency controller.

11. The module according to claim 1, wherein the controller is configured to apply the electronic pulses during first and second time intervals to first and second driving devices of the at least one driving device.

12. The module according to claim 1, further comprising a case providing a vacuum, the mirror provided in the case.

13. The module according to claim 1, wherein the at least one driving device comprises first, second, and third driving device, and the controller configured to apply the electronic pulses to the first, second, and third driving devices based on a rotation angle of the mirror.

14. The module according to claim 1, wherein the mirror, the support and the at least one driving devices are integral with one another.

15. The module according to claim 1, wherein the mirror comprises a first substrate connected to the support and a second substrate contacting the first substrate through an insulating layer.

16. The module according to claim 15, wherein the at least one driving device comprises a first driving device disposed on the first substrate and a second driving device disposed on the second substrate.

17. A module configured to deflect light in an image forming apparatus, comprising:
 means for deflecting light;
 means for supporting the means for deflecting to rotate about a rotational axis,
 wherein the means for supporting comprises a plurality of branch portions each joined to the means for deflecting at points off-center from the rotational axis of the means for deflecting; and means for oscillating the means for deflecting in the module around the rotational axis at a scanning frequency different than a resonance frequency of the means for deflecting, wherein a back surface of the means for deflecting light includes a first relieved area at a first bending stress location and with a second relieved area at a second bending stress location, wherein the first relieved area is smaller than the second relieved area, and a stress at the first bending stress location is greater than a stress at the second bending stress location.

* * * * *